United States Patent
Han et al.

(10) Patent No.: US 10,860,273 B2
(45) Date of Patent: Dec. 8, 2020

(54) DISPLAY DEVICE AND OPERATION METHOD THEREFOR

(71) Applicant: LG ELECTRONICS INC., Seoul (KR)

(72) Inventors: Joonghee Han, Seoul (KR); Donghee Lee, Seoul (KR); Woojin Choi, Seoul (KR); Seunghyun Heo, Seoul (KR); Gahyun Chloe Sun, Seoul (KR); Sangrok Lee, Seoul (KR); Hyeongjin Park, Seoul (KR); Youngjae Jung, Seoul (KR); Kanghak Han, Seoul (KR); Jaeho Lee, Seoul (KR); Hojun Nam, Seoul (KR); Donguk Lee, Seoul (KR); Woojin Jeong, Seoul (KR); Seokho Jang, Seoul (KR); Changhoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/574,135

(22) PCT Filed: Sep. 8, 2015

(86) PCT No.: PCT/KR2015/009440
§ 371 (c)(1),
(2) Date: Nov. 14, 2017

(87) PCT Pub. No.: WO2016/182133
PCT Pub. Date: Nov. 17, 2016

(65) Prior Publication Data
US 2018/0129462 A1    May 10, 2018

(30) Foreign Application Priority Data

May 14, 2015 (KR) .................. 10-2015-0067470
Aug. 5, 2015 (KR) .................. 10-2015-0110779

(51) Int. Cl.
*G06F 3/14* (2006.01)
*H04N 5/445* (2011.01)
(Continued)

(52) U.S. Cl.
CPC .......... *G06F 3/1446* (2013.01); *G06F 3/1415* (2013.01); *H04N 5/445* (2013.01);
(Continued)

(58) Field of Classification Search
CPC .............................. G09G 2300/026
See application file for complete search history.

(56) References Cited

U.S. PATENT DOCUMENTS 5,764,201 A * 6/1998 Ranganathan ........ G06F 3/1423
345/3.3
8,531,395 B2 * 9/2013 Sawai .................. G06F 3/0485
345/157
(Continued)

FOREIGN PATENT DOCUMENTS

EP         2698704        2/2014
KR      1020100063644      6/2010
(Continued)

OTHER PUBLICATIONS

European Patent Office Application Serial No. 15891949.8, Search Report dated Sep. 11, 2018, 9 pages.
(Continued)

*Primary Examiner* — William Boddie
*Assistant Examiner* — Bipin Gyawali
(74) *Attorney, Agent, or Firm* — Lee, Hong, Degerman, Kang & Waimey

(57) ABSTRACT

A display device operation method according to an embodiment of the present invention comprises the steps of: outputting first content on a screen of the display device; receiving a screen link request for linking a first screen of the
(Continued)

display device and a second screen of another display device connected to the display device; and controlling the display device and another display device such that the first content is output on a merged screen in which the first screen and the second screen are merged according to the received screen link request.

15 Claims, 63 Drawing Sheets

(51) Int. Cl.
*H04N 21/436* (2011.01)
*H04N 21/4363* (2011.01)
*H04N 21/462* (2011.01)
*H04N 21/4402* (2011.01)
*H04N 21/41* (2011.01)
*H04N 21/43* (2011.01)

(52) U.S. Cl.
CPC ....... *H04N 21/4122* (2013.01); *H04N 21/436* (2013.01); *H04N 21/4307* (2013.01); *H04N 21/4363* (2013.01); *H04N 21/440263* (2013.01); *H04N 21/440272* (2013.01); *H04N 21/4621* (2013.01); *G09G 2300/026* (2013.01); *G09G 2360/04* (2013.01)

(56) References Cited

U.S. PATENT DOCUMENTS

| 8,531,399 | B2* | 9/2013 | Kabasawa ........... G06F 3/04847 345/159 |
| 2006/0001593 | A1* | 1/2006 | Baudisch .............. G06F 3/1446 345/1.1 |
| 2007/0241988 | A1* | 10/2007 | Zerphy ................. G06F 3/1431 345/1.1 |
| 2009/0205008 | A1 | 8/2009 | Wollmershauser et al. |
| 2010/0144283 | A1 | 6/2010 | Curcio et al. |
| 2014/0049447 | A1 | 2/2014 | Choi |
| 2014/0365957 | A1* | 12/2014 | Louch ................... G06F 3/0488 715/790 |
| 2015/0355791 | A1* | 12/2015 | Hidaka ................. G06F 3/1454 715/761 |
| 2018/0336841 | A1* | 11/2018 | Rathi ....................... G06F 3/14 |

FOREIGN PATENT DOCUMENTS

| KR | 1020130063196 | 6/2013 |
| KR | 1020140011857 | 1/2014 |
| KR | 1020140133354 | 11/2014 |
| KR | 1020150004633 | 1/2015 |

OTHER PUBLICATIONS

European patent application No. 15891949.8, European Office Action dated Aug. 20, 2019, 10 pages.

* cited by examiner

FIG. 5
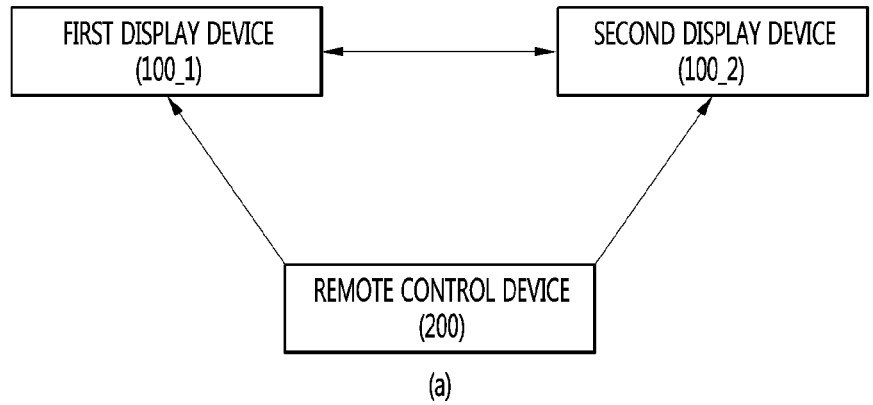
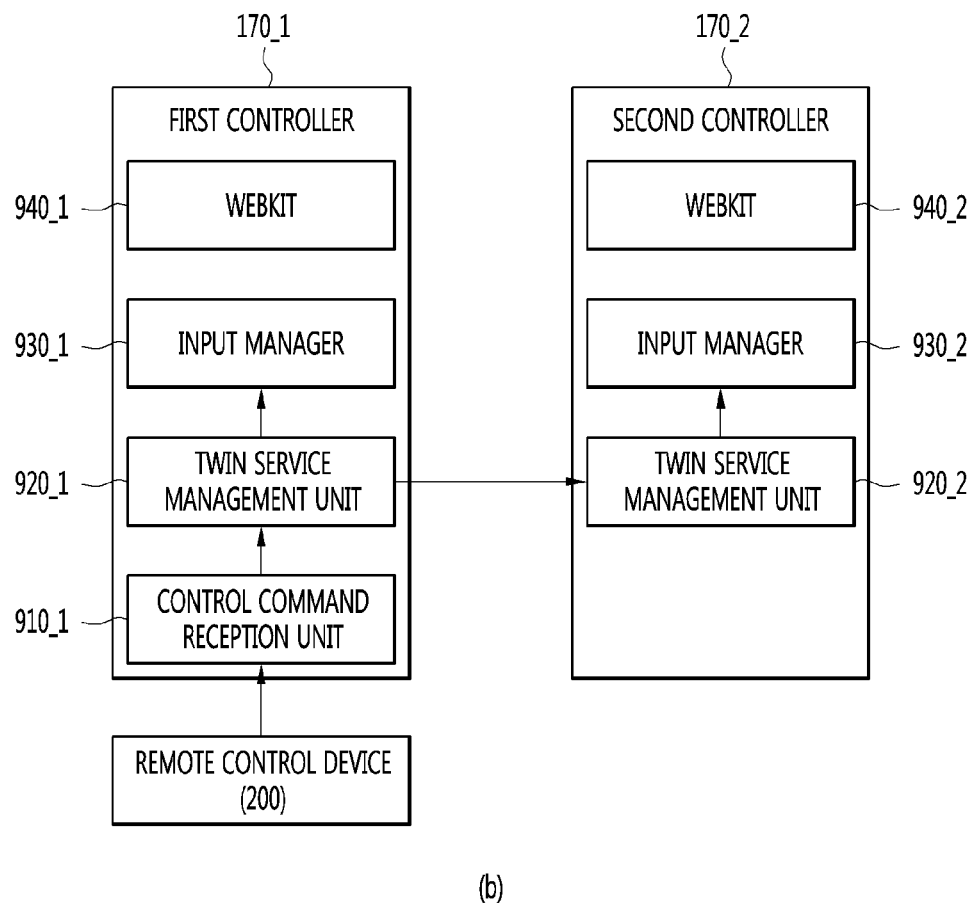

FIG. 11
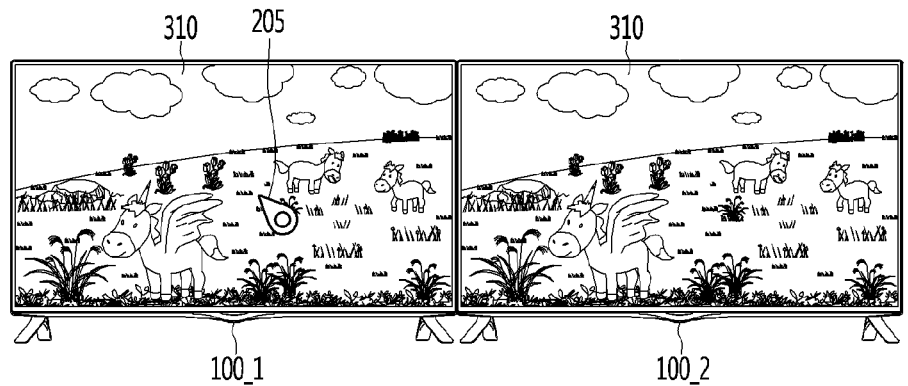
(a)
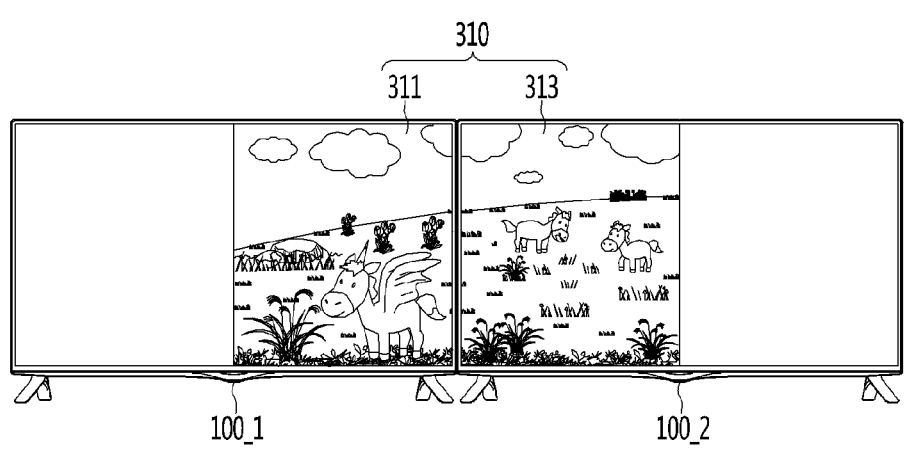
(b)

FIG. 12
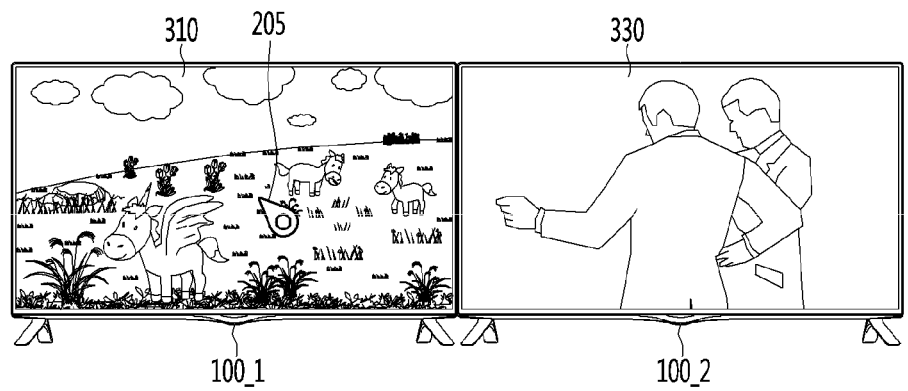
(a)
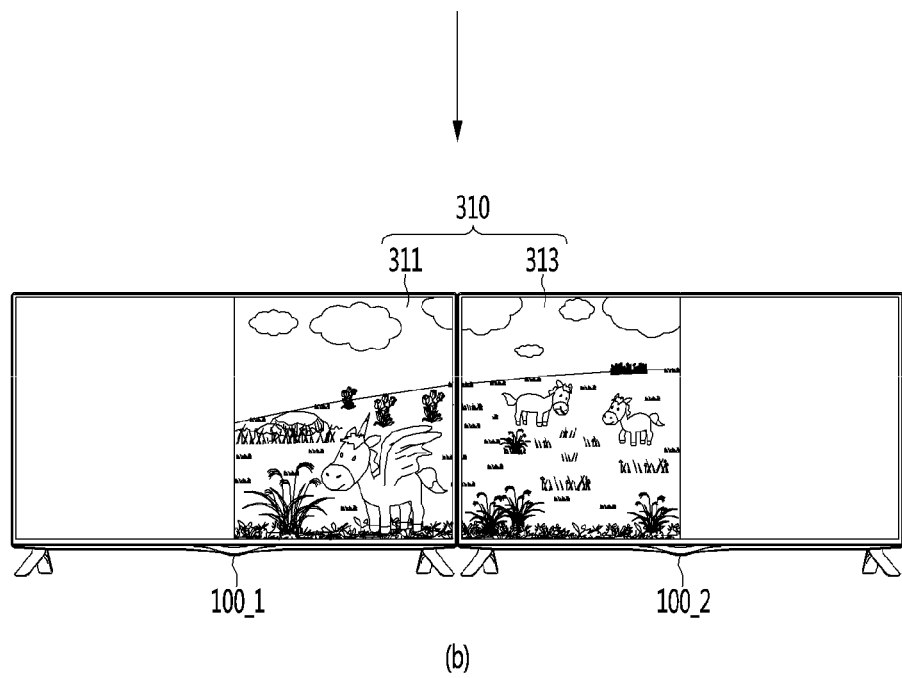
(b)

FIG. 13
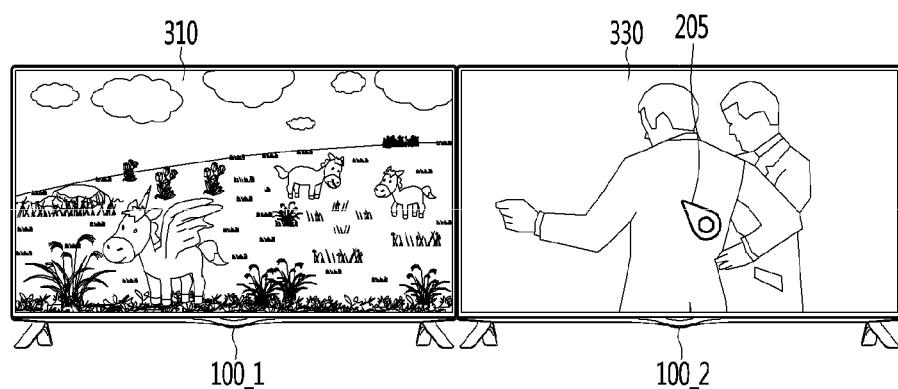
(a)
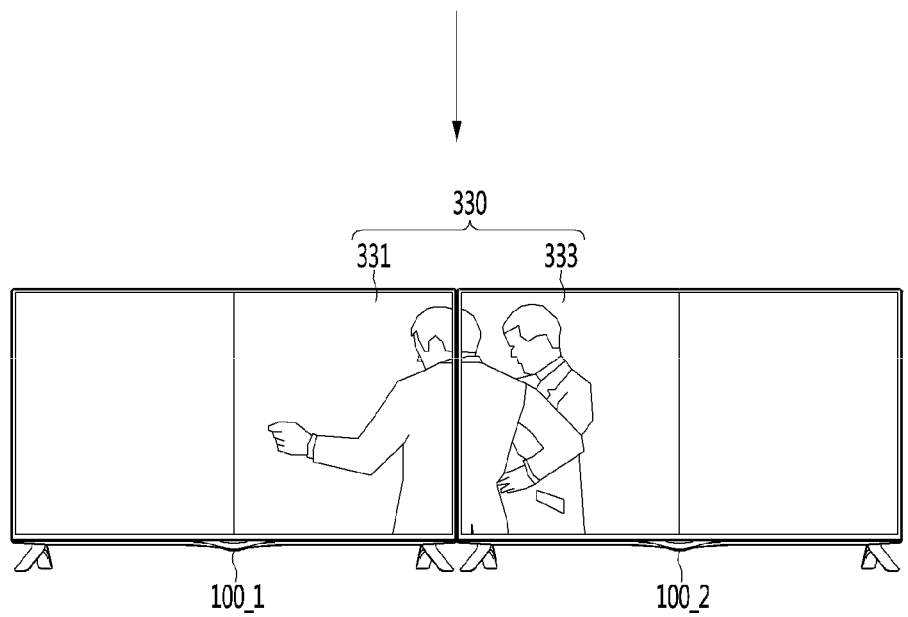
(b)

FIG. 17
| IMAGE DIVISION | FRAME IDENTIFIER INSERTION | FRAME CUT AND SCALING |
|---|---|---|
| 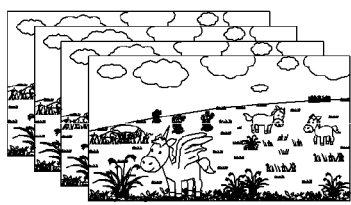 | 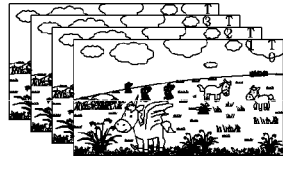 | 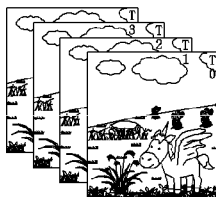 |
| (a) | (b) | (c) |
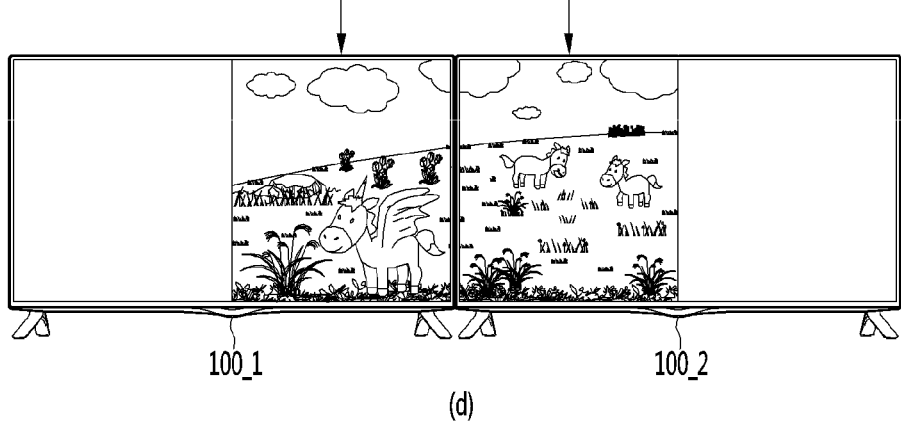
(d)

FIG. 18
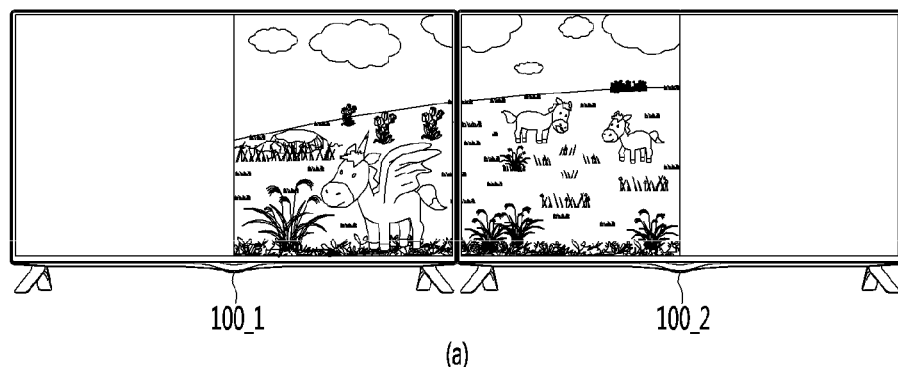
(a)
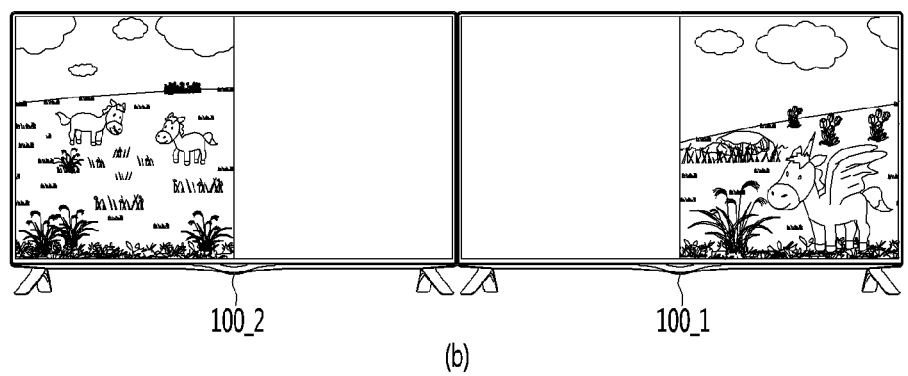
(b)

FIG. 29
<CURVED PANEL>
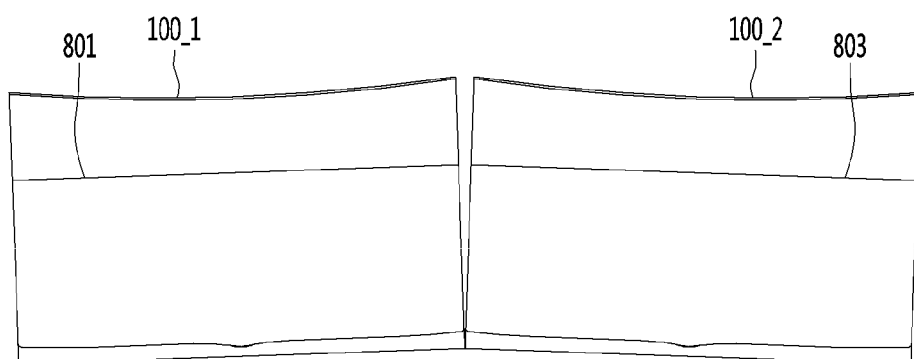
(a)
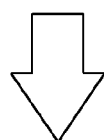
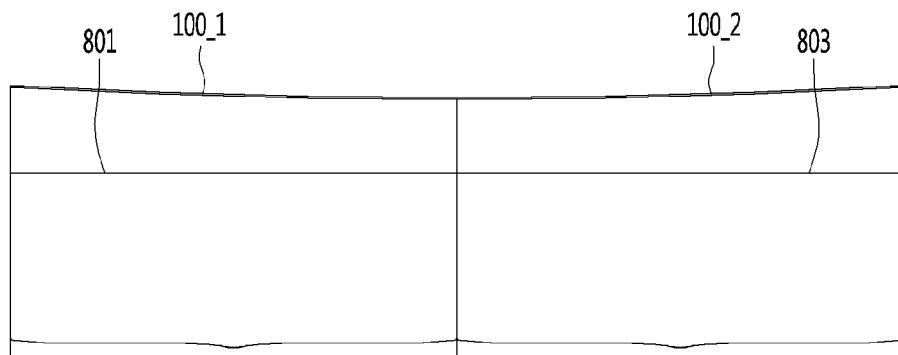
(b)

FIG. 42
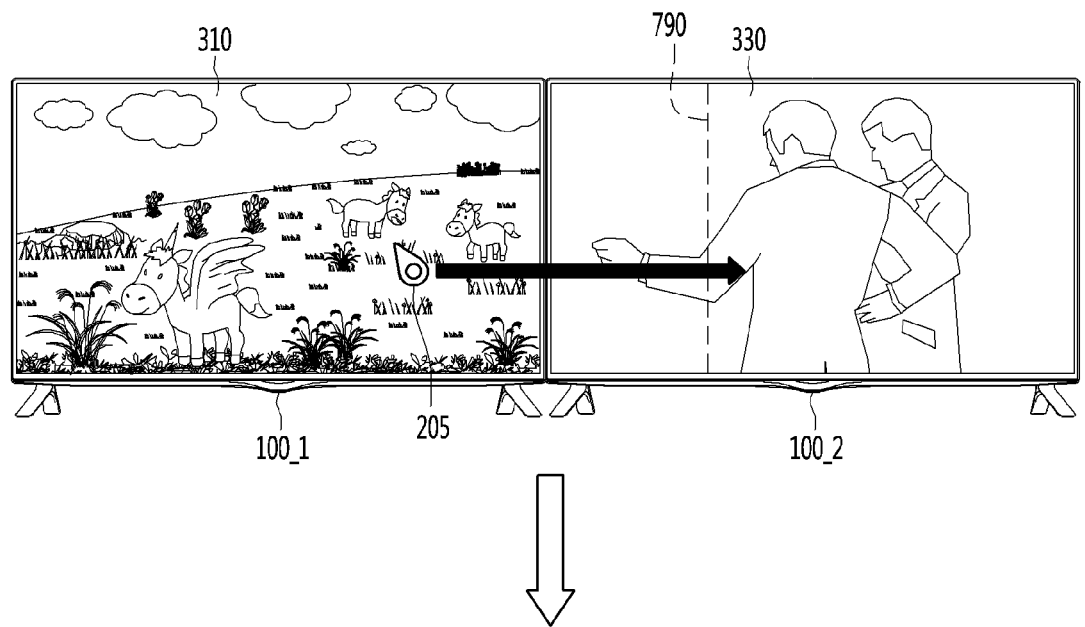
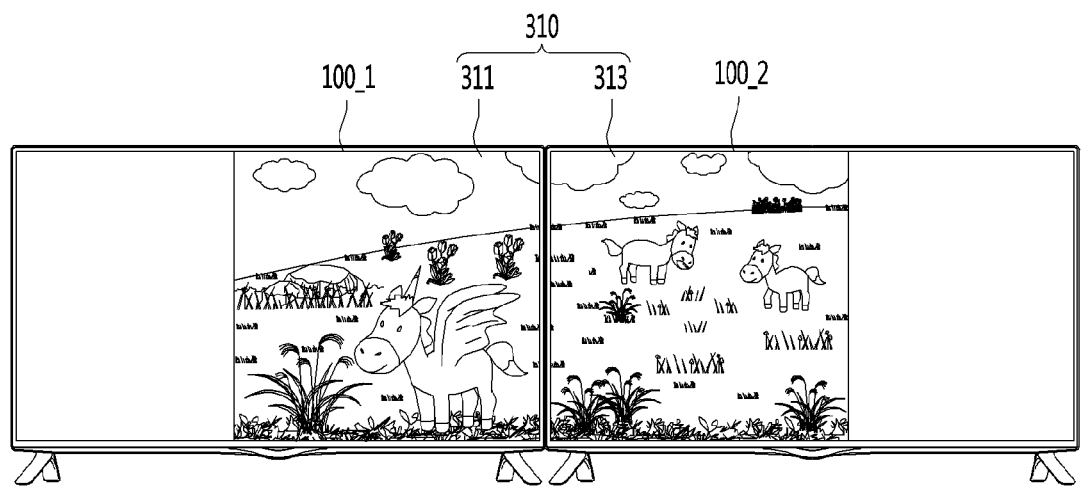

FIG. 43
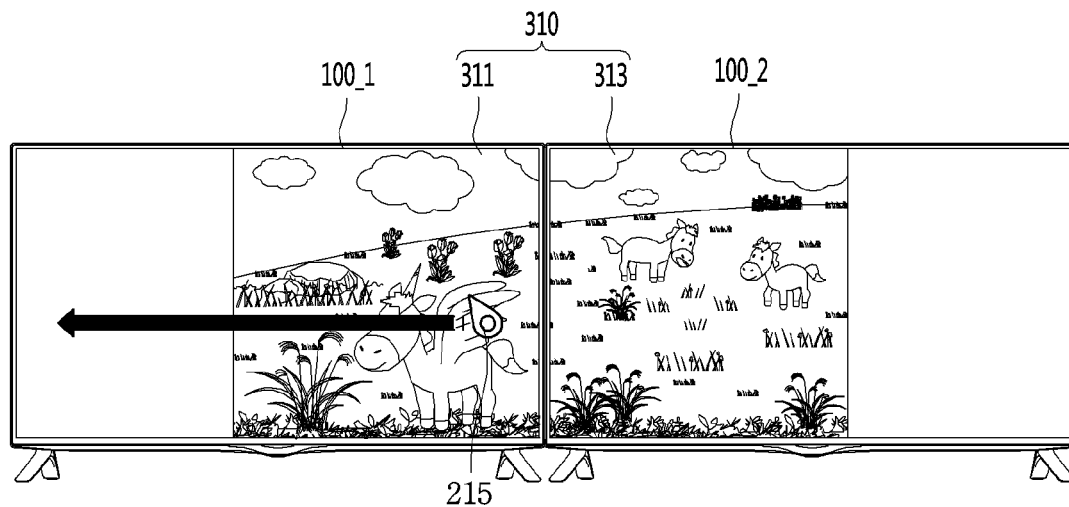
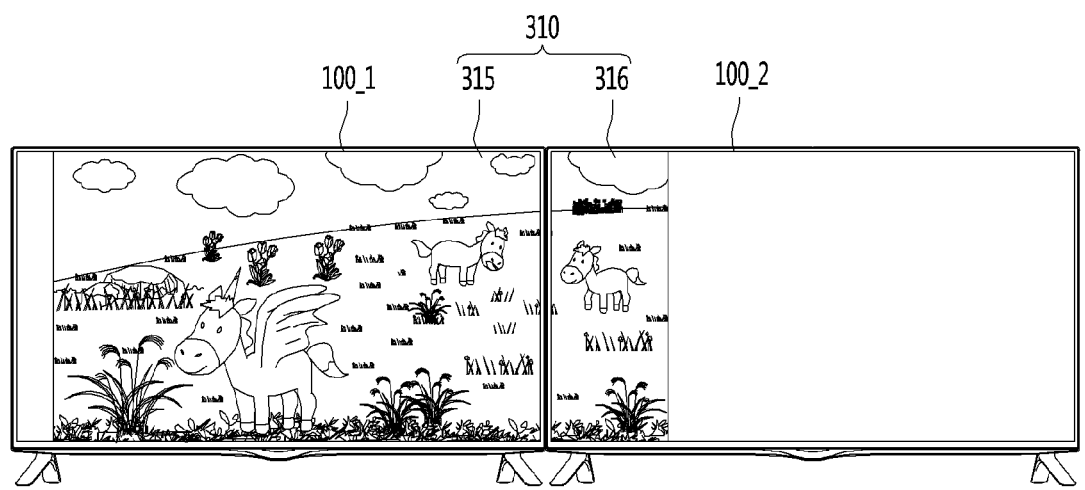

FIG. 44
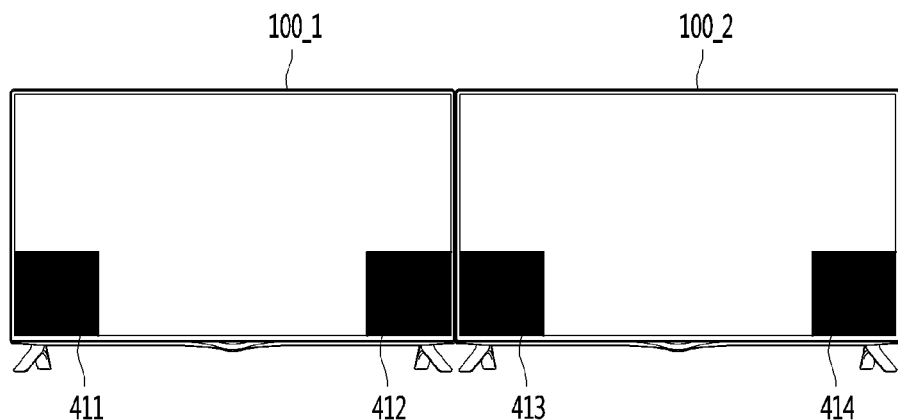
FIG. 45
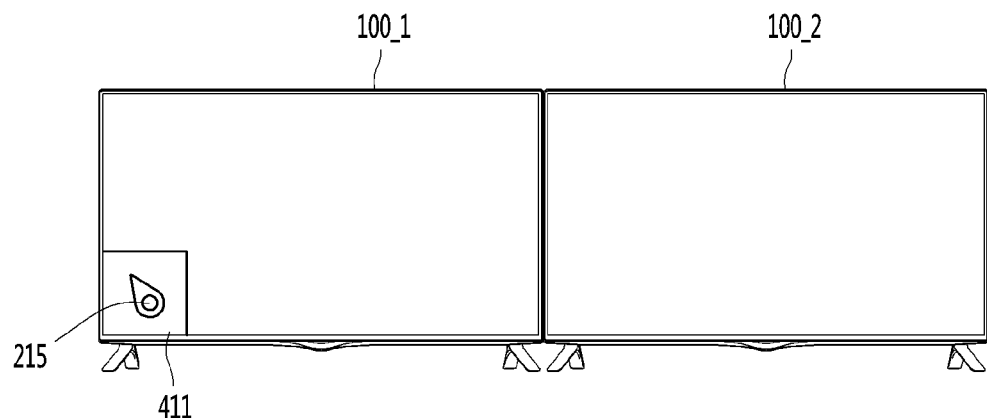
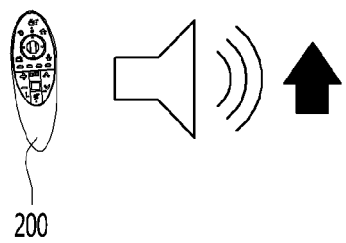

FIG. 46
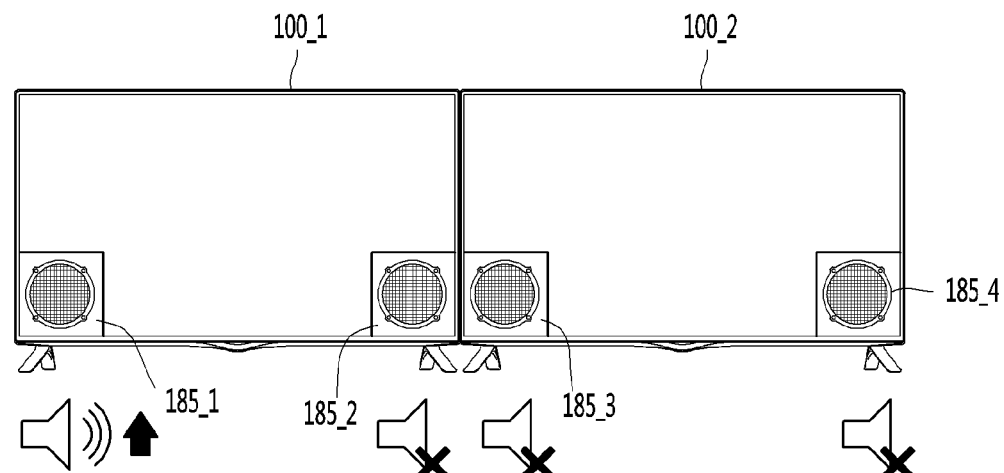
FIG. 47
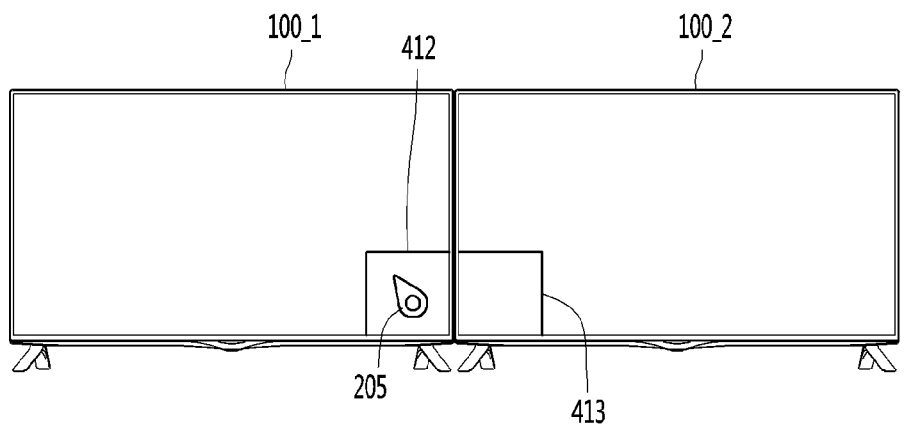
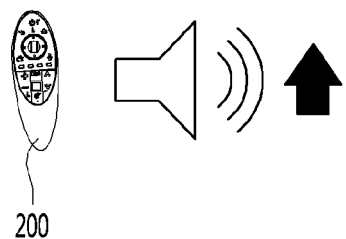

FIG. 54A
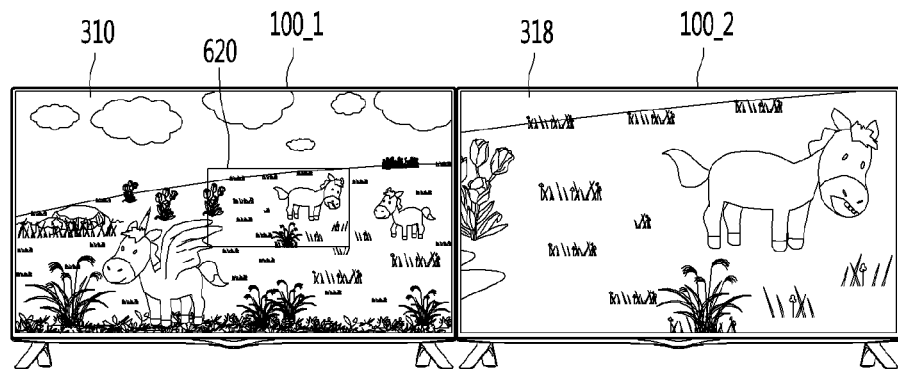
FIG. 54B
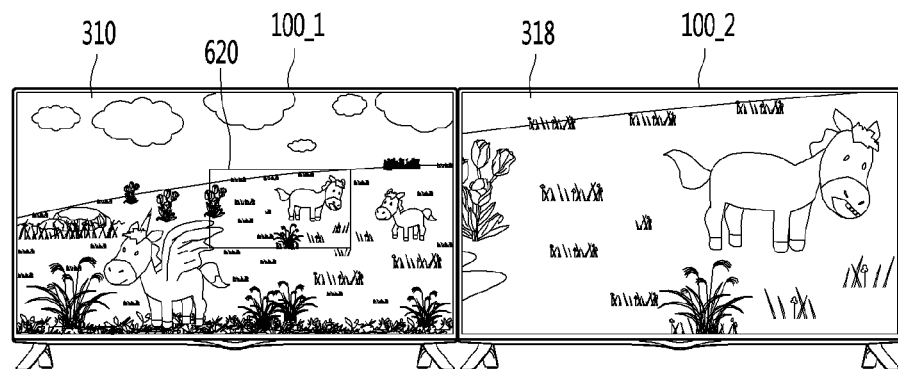
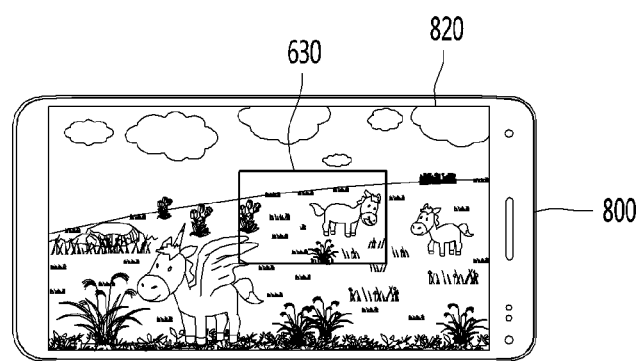

FIG. 54C
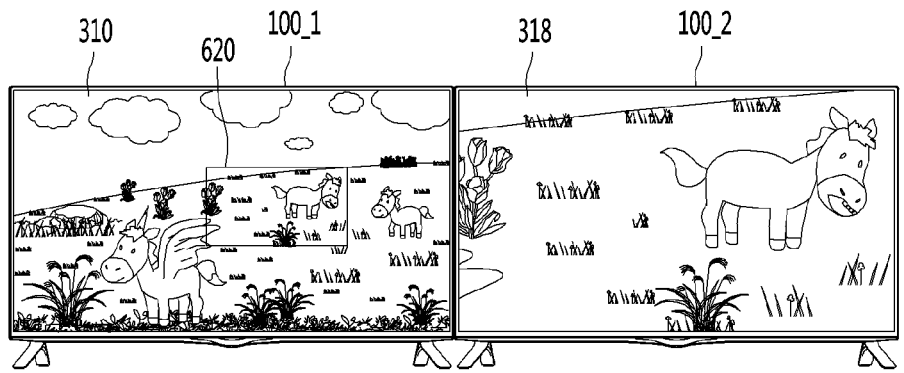
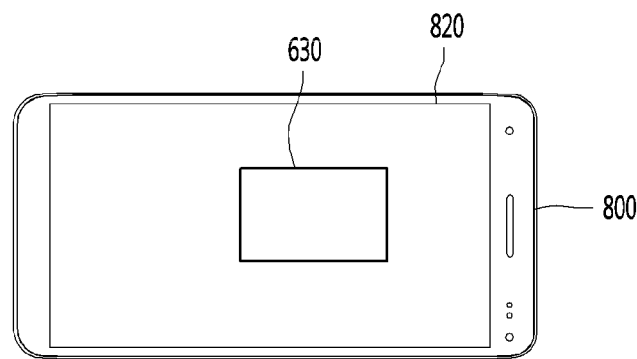
FIG. 55
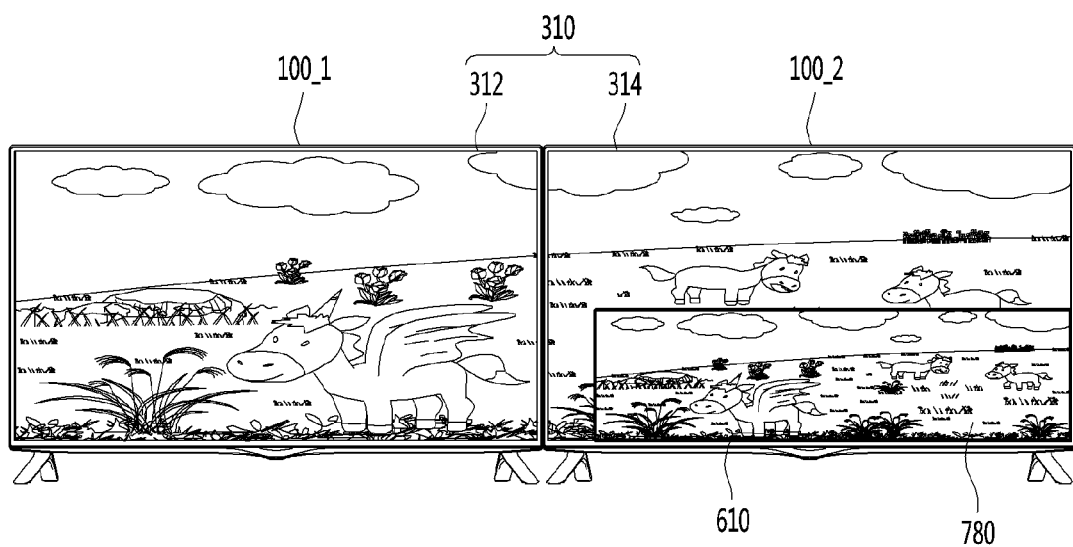

FIG. 56
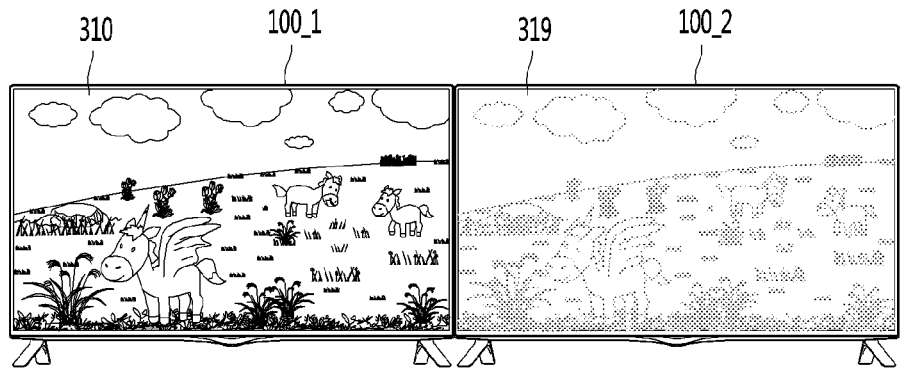
FIG. 57
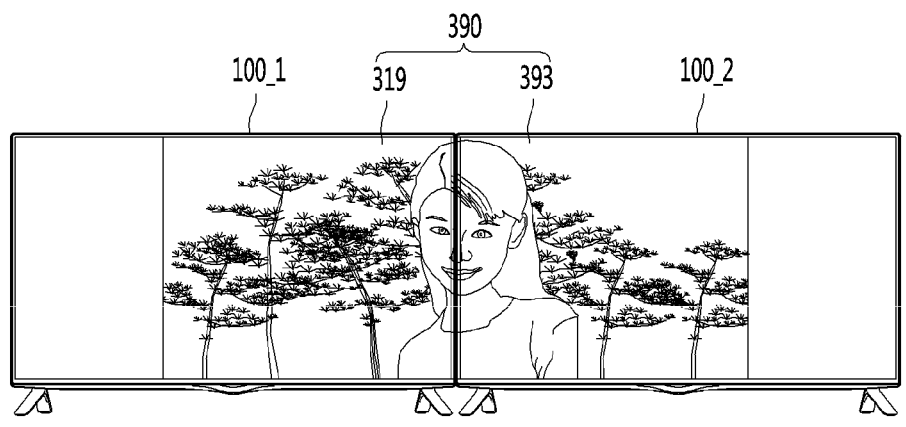
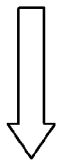
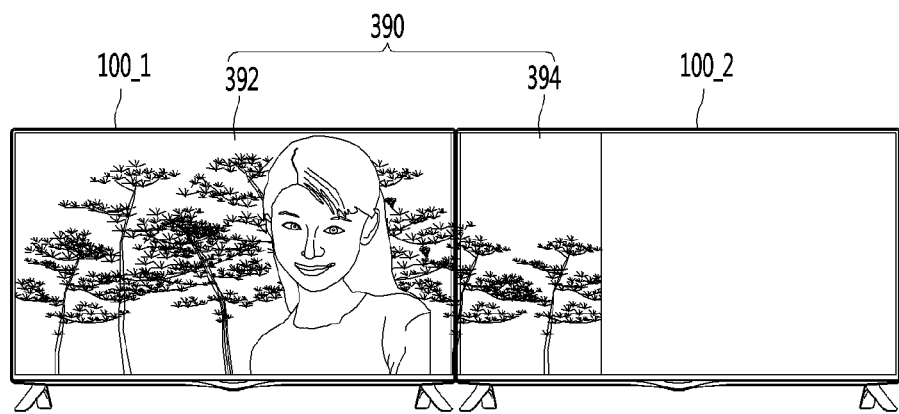

FIG. 58
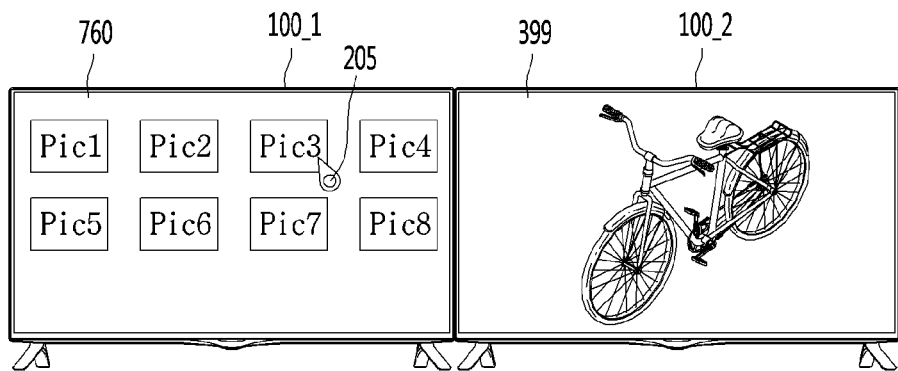
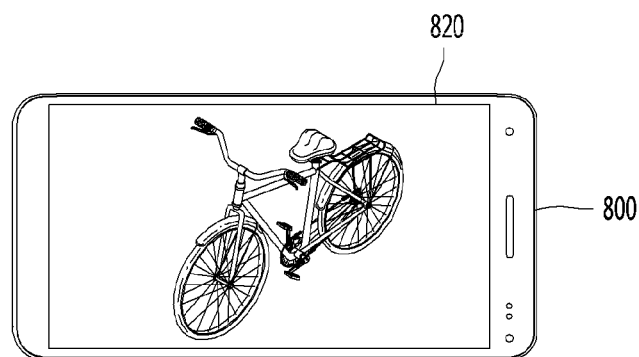
FIG. 59
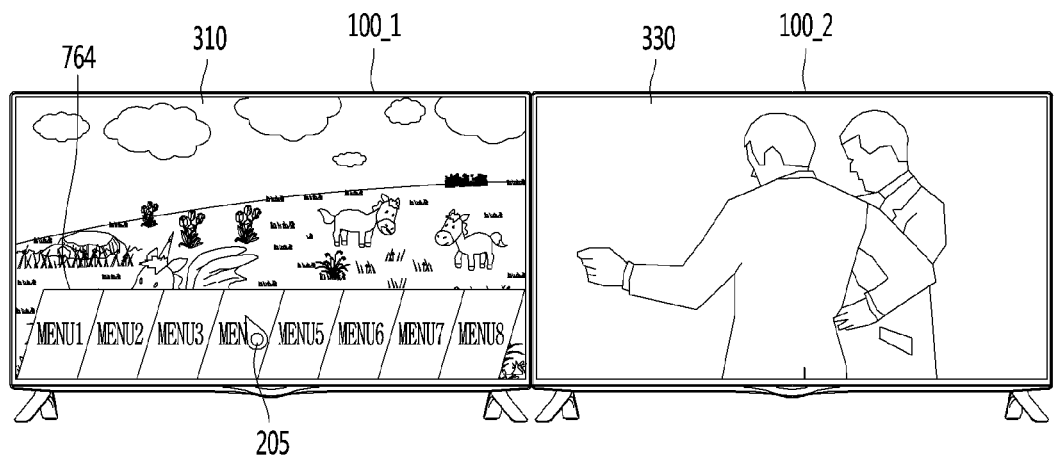

DISPLAY DEVICE AND OPERATION METHOD THEREFOR

CROSS-REFERENCE TO RELATED APPLICATIONS

This application is the National Stage filing under 35 U.S.C. 371 of International Application No. PCT/KR2015/009440, filed on Sep. 8, 2015, which claims the benefit of earlier filing date and right of priority to Korean Application Nos. 10-2015-0067470, filed on May 14, 2015 and 10-2015-0110779, filed on Aug. 5, 2015, the contents of which are all hereby incorporated by reference herein in their entirety.

TECHNICAL FIELD

The present invention relates to a display device and a method of operating the same.

BACKGROUND ART

Recently, a digital TV service using a wired or wireless communication network has come into wide use. The digital TV service may provide various services which cannot be provided by an existing analog broadcast service.

For example, an Internet protocol television (IPTV) service, which is a digital TV service, provides interactivity for enabling a user to actively select a type of a program to be viewed, a viewing time, etc. The IPTV service may provide various additional services, e.g., Internet search, home shopping, online games, etc. based on such interactivity.

DISCLOSURE

Technical Problem

An object of the present invention is to provide a display device capable of outputting an image on the linked screens of a plurality of display devices as if the image is displayed on one display device, and a method of operating the same.

Technical Solution

The object of the present invention can be achieved by providing a method of operating a display device including outputting first content on a screen of the display device, receiving a screen link request for linking a first screen of the display device to a second screen of another display device connected to the display device, and controlling the display device and the another display device such that the first content is output on a merged screen obtained by merging the first screen and the second screen according to the received screen link request.

In another aspect of the present invention, provided herein is a display device including a display unit configured to display first content and a controller configured to receive a screen link request for linking a first screen of the display unit to a second screen of another display unit provided in another display device connected to the display device and to control the display device and the another display device such that the first content is output on a merged screen obtained by merging the first screen and the second screen according to the received screen link request.

In another aspect of the present invention, provided herein is a display system including a first display device configured to output first content and a second display device connected to the first display device and configured to output second content, wherein the first display device receives a screen link request for linking a first screen of the first display device to a second screen of the second display device connected to the first display device when the first content and the second content are equal, and controls the first display device and the second display device such that the first content is output on a merged screen obtained by merging the first screen and the second screen according to the received screen link request.

Advantageous Effects

According to various embodiments of the present invention, it is possible to easily display one image on a large screen, that is, a merged screen, using a plurality of display devices.

In addition, according to the present invention, a user can easily manipulate various operations performed by linking the screens of a plurality of display devices.

According to various embodiments of the present invention, since the screens of a plurality of display devices are linked, it is possible to enable a user to feel like viewing content through one display device.

In addition, competitiveness of a large screen can be enhanced using advantages of a thin bezel and a black region of each display device.

In addition, the present invention can efficiently distribute content received from a plurality of external sources to display devices using one output device.

In addition, the present invention can output an image using one output device such that display devices display the image on a merged screen.

(a) of FIG. 5 is a diagram illustrating the configuration of a display system according to an embodiment of the present invention and (b) of FIG. 5 is a diagram illustrating the detailed configuration of a controller included in each display device.

Figure 6:
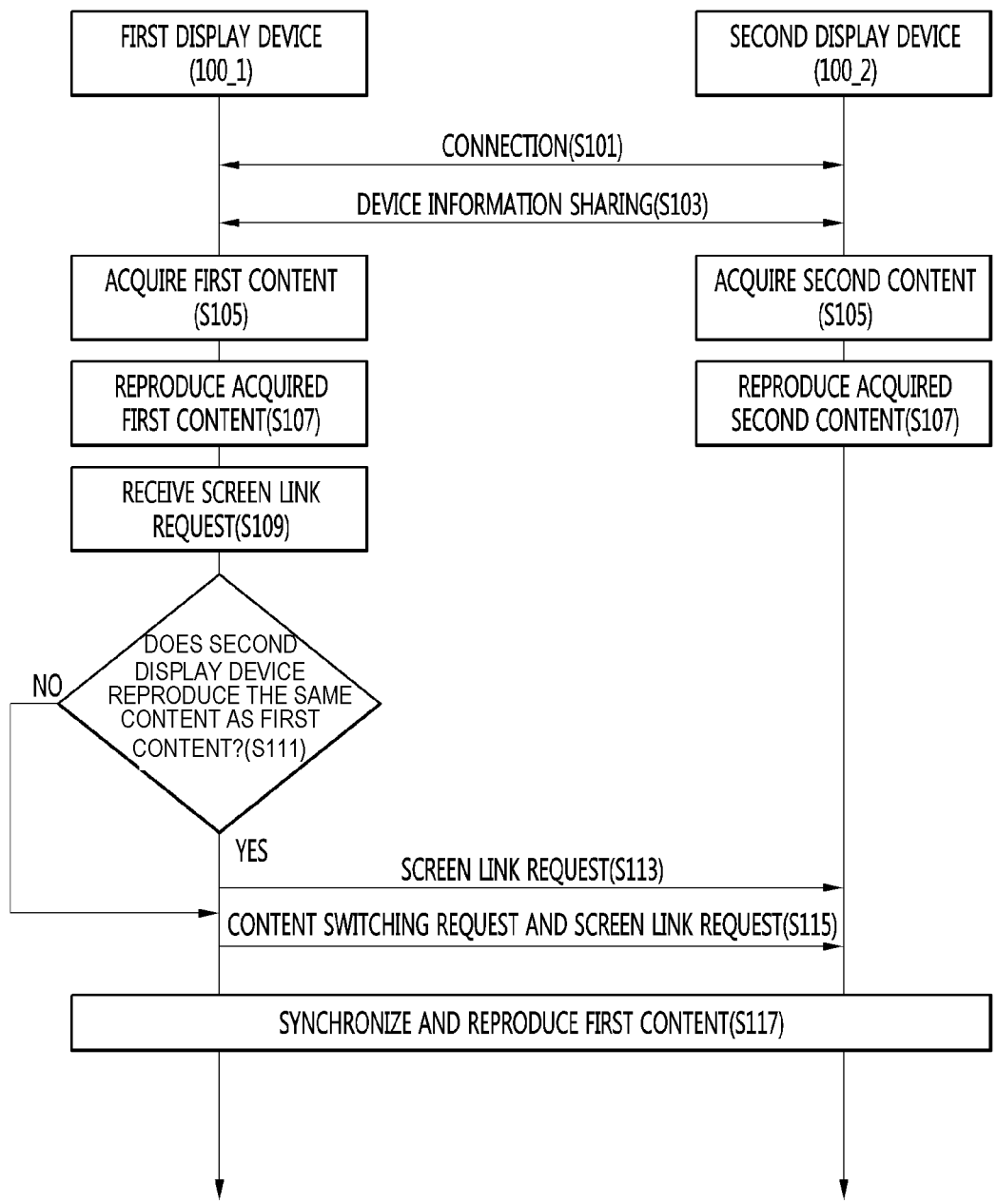

FIG. 6 is a ladder diagram illustrating a method of operating a display system according to an embodiment of the present invention.

Figure 7:
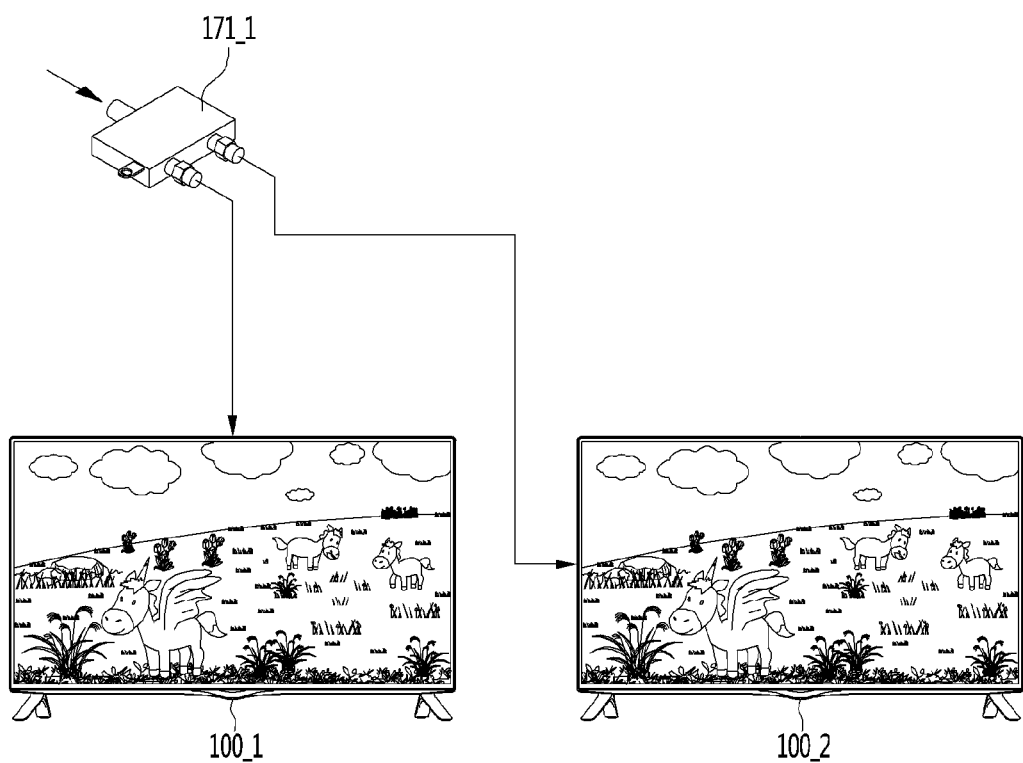
Figure 8:
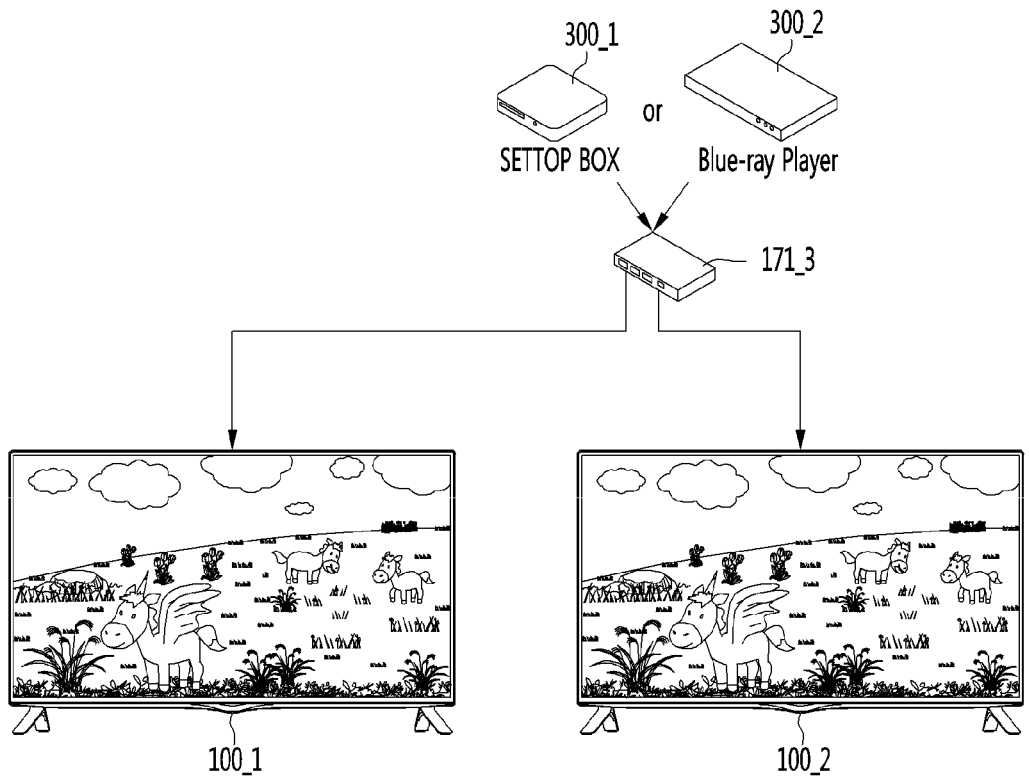

FIGS. 7 to 8 are diagrams illustrating embodiments in which display devices acquire the same content by physical input.

Figure 9:
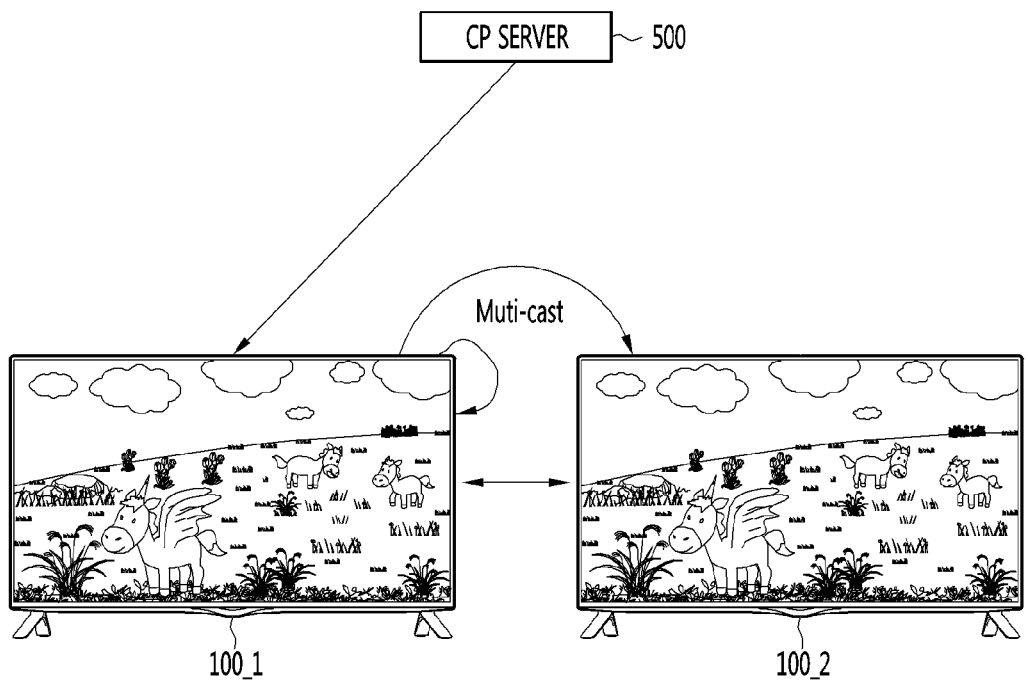

FIG. 9 is a diagram illustrating an embodiment in which a first display device and a second display device acquire the same content through a content provider (CP) server according to an embodiment of the present invention.

Figure 10:
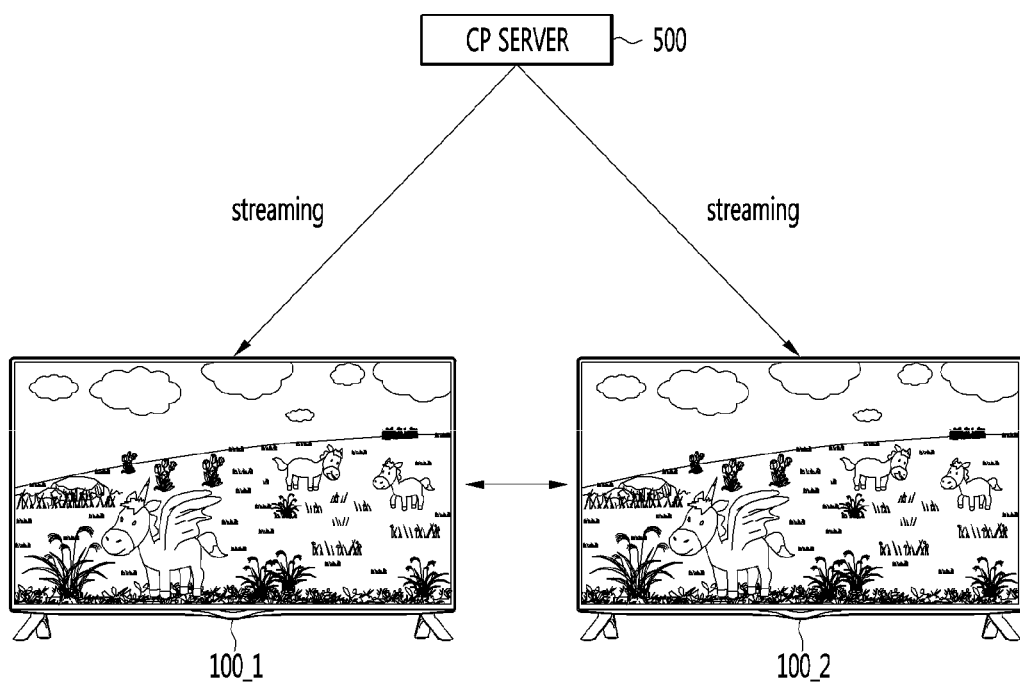

FIG. 10 is a diagram illustrating an embodiment in which a first display device and a second display device acquire the same content through a content provider (CP) server according to another embodiment of the present invention.

FIG. 11 is a diagram illustrating an example of a merged screen output according to a screen link request when a first display device and a second display device reproduce the same content according to an embodiment of the present invention.

FIGS. 12 and 13 are diagrams illustrating an example of a merged screen output according to a screen link request when a first display device and a second display device reproduce different content according to an embodiment of the present invention.

Figure 14:
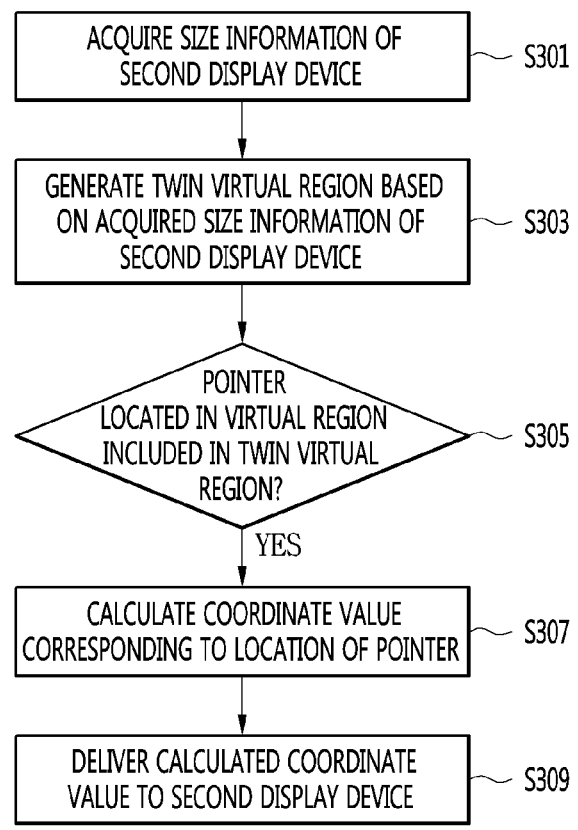

FIG. 14 is a flowchart illustrating a process of recognizing that a pointer is located on the screen of a second display device according to an embodiment of the present invention.

Figure 15:
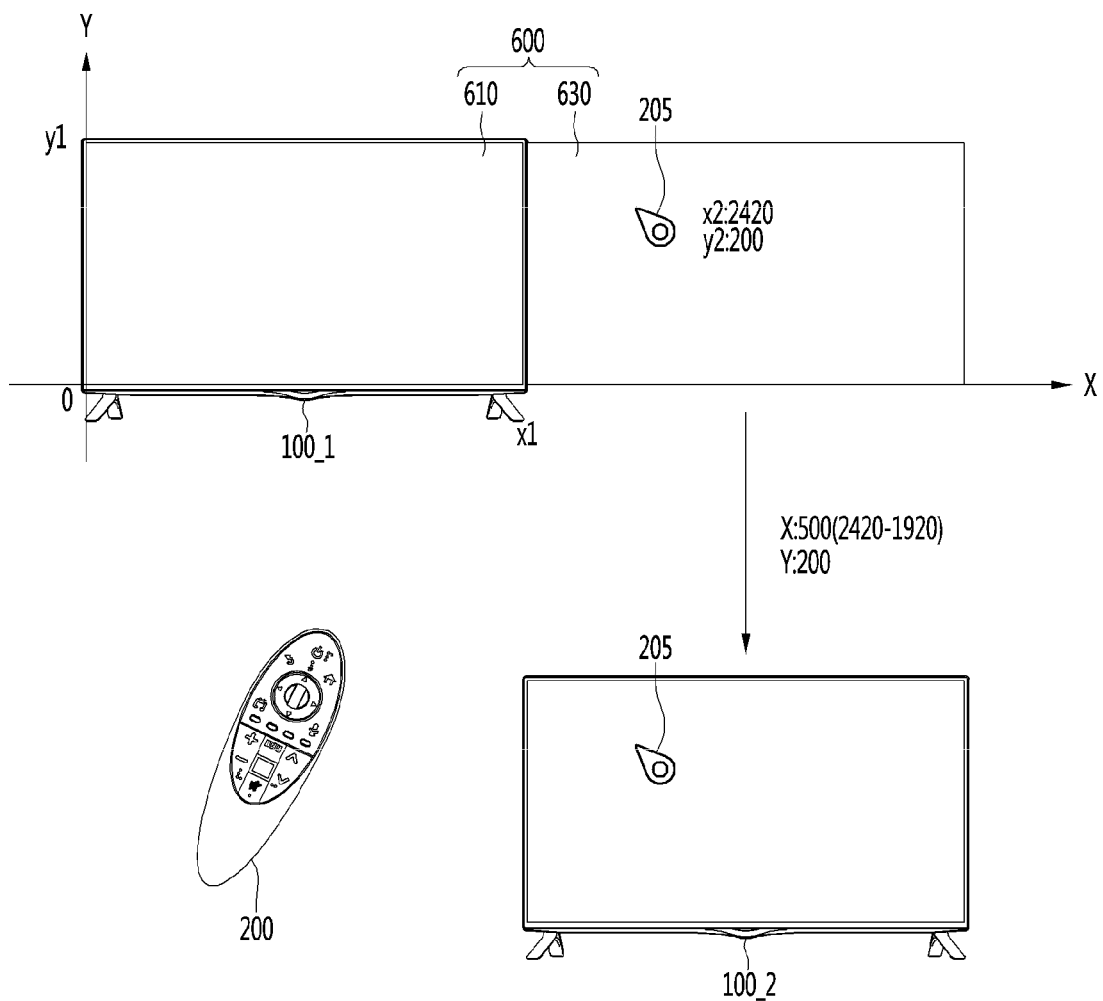

FIG. 15 is a diagram illustrating an embodiment of detecting the location of a pointer through a twin virtual region according to an embodiment of the present invention.

Figure 16:
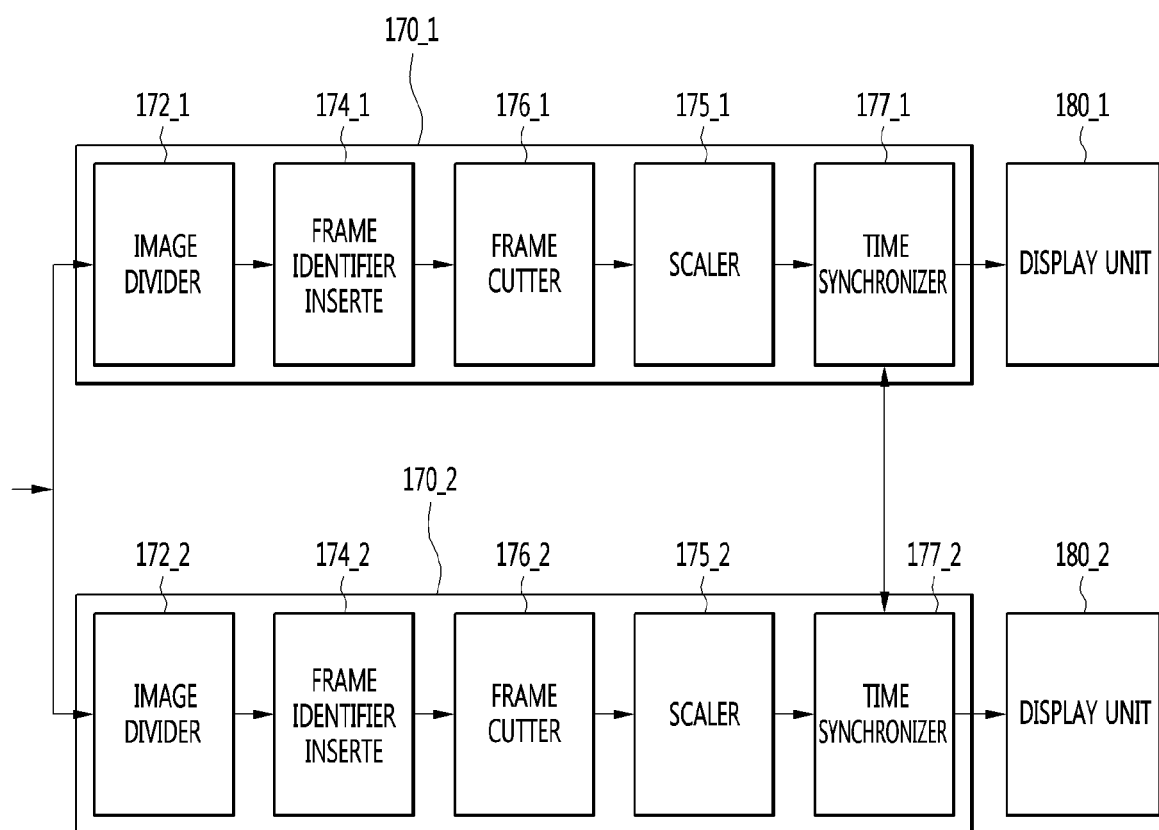

FIG. 16 is a diagram showing the configuration of a controller according to another embodiment of the present invention.

FIG. 17 is a diagram illustrating a process of performing synchronization in order to reproduce content.

FIG. 18 is a diagram illustrating a state in which a first display device and a second display device are normally disposed and a state which the first display device and the second display device are abnormally disposed.

Figure 19:
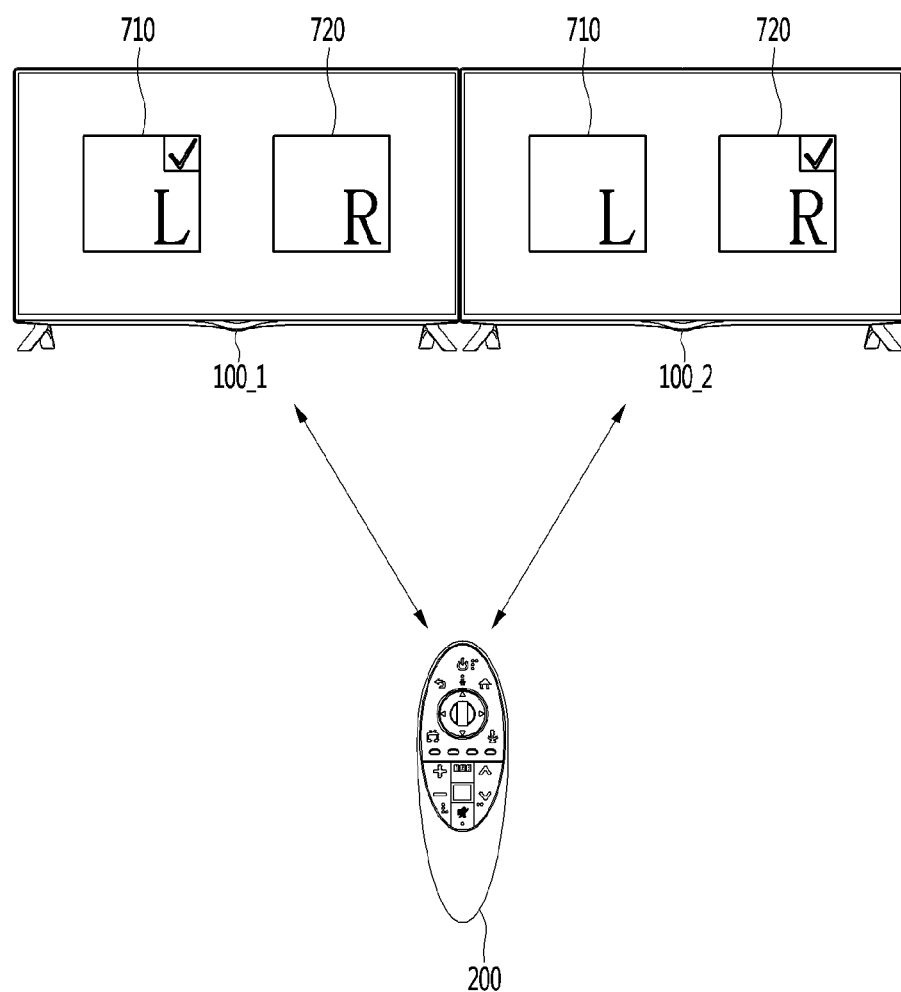

FIG. 19 is a diagram illustrating an example of manually setting disposition of a first display device and a second display device according to an embodiment of the present invention.

Figure 20:
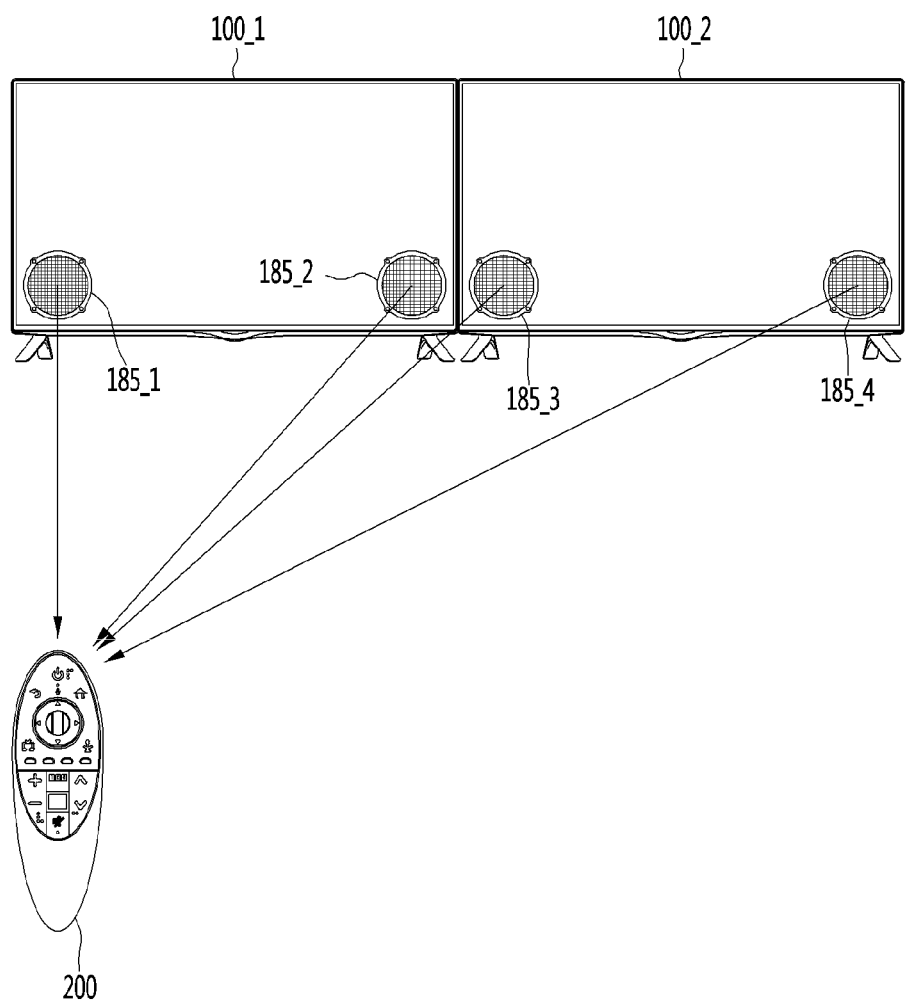

FIG. 20 is a diagram illustrating a method of checking the disposition state of display devices through a microphone provided in a remote control device and a speaker provided in each display device according to another embodiment of the present invention.

Figure 21:
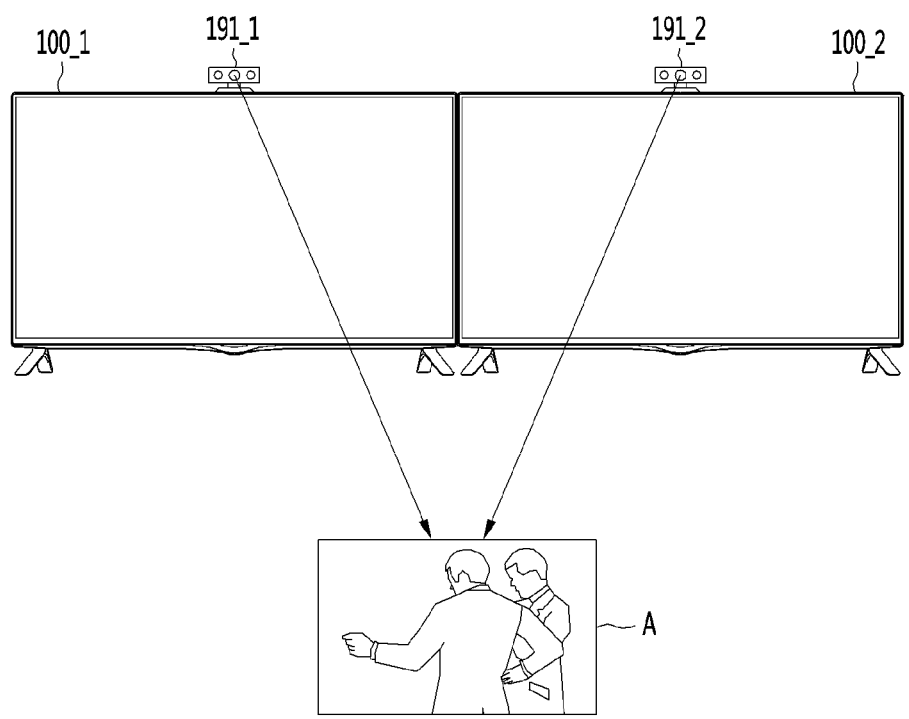

FIG. 21 is a diagram illustrating a method of checking the disposition state of display devices through a camera provided in each display device according to another embodiment of the present invention.

Figure 22:
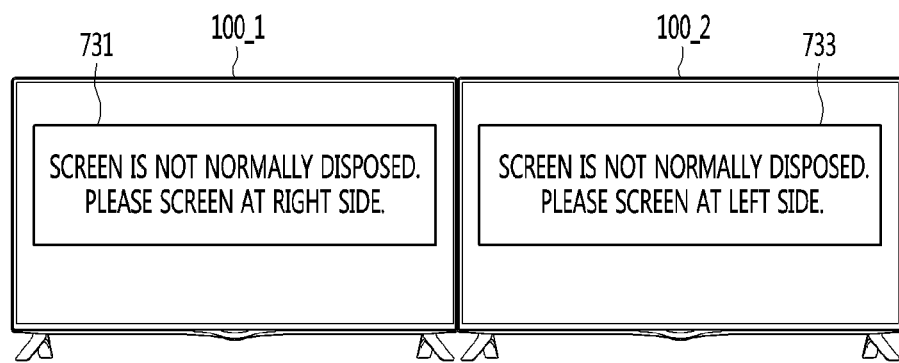

FIG. 22 is a diagram illustrating a disposition guide window output when a first display device and a second display device are abnormally disposed according to an embodiment of the present invention.

Figure 23:
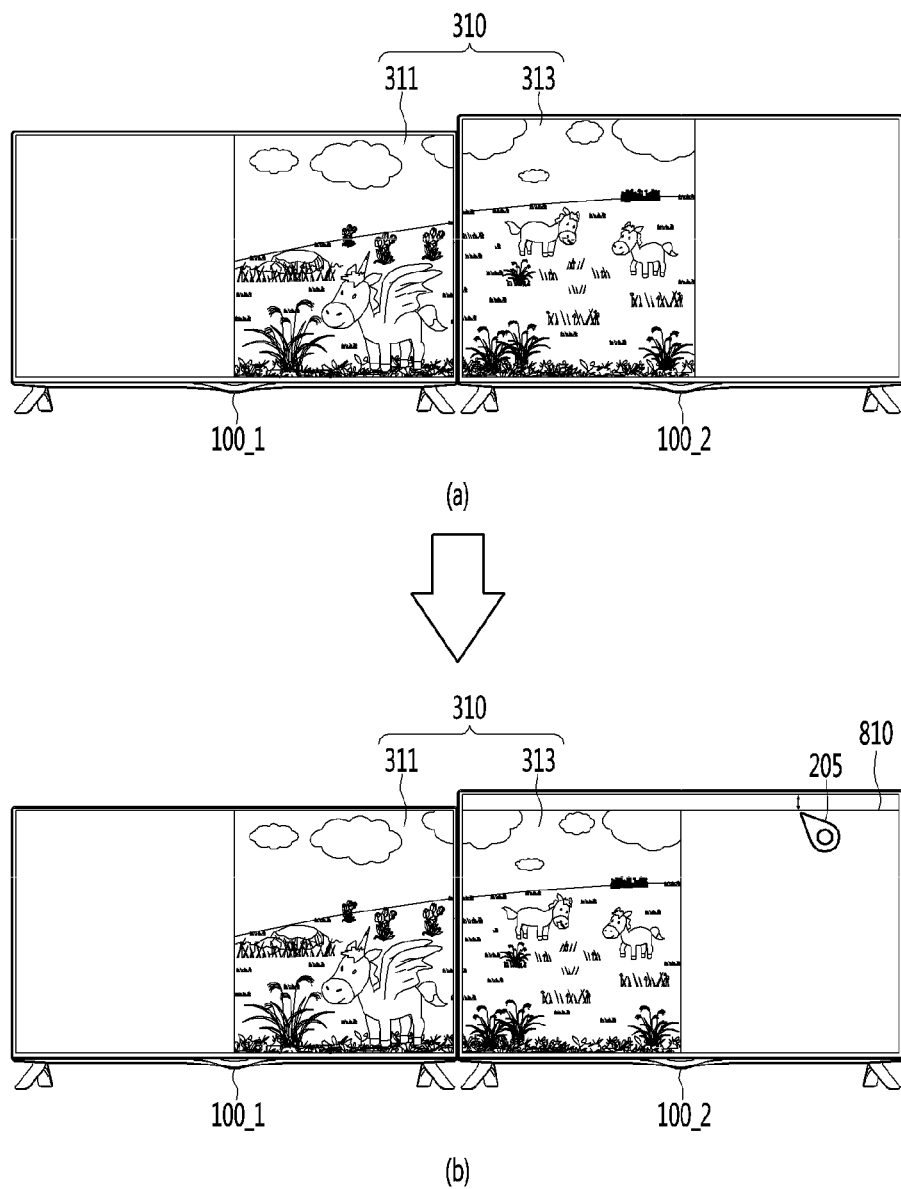

FIG. 23 is a diagram illustrating a process of linking screens when the size of a first display device and the size of a second display device are different according to an embodiment of the present invention.

FIGS. 24 to 27 are diagrams illustrating various embodiments of automatically adjusting and outputting sound according to the sound channel of each display device.

Figure 28:
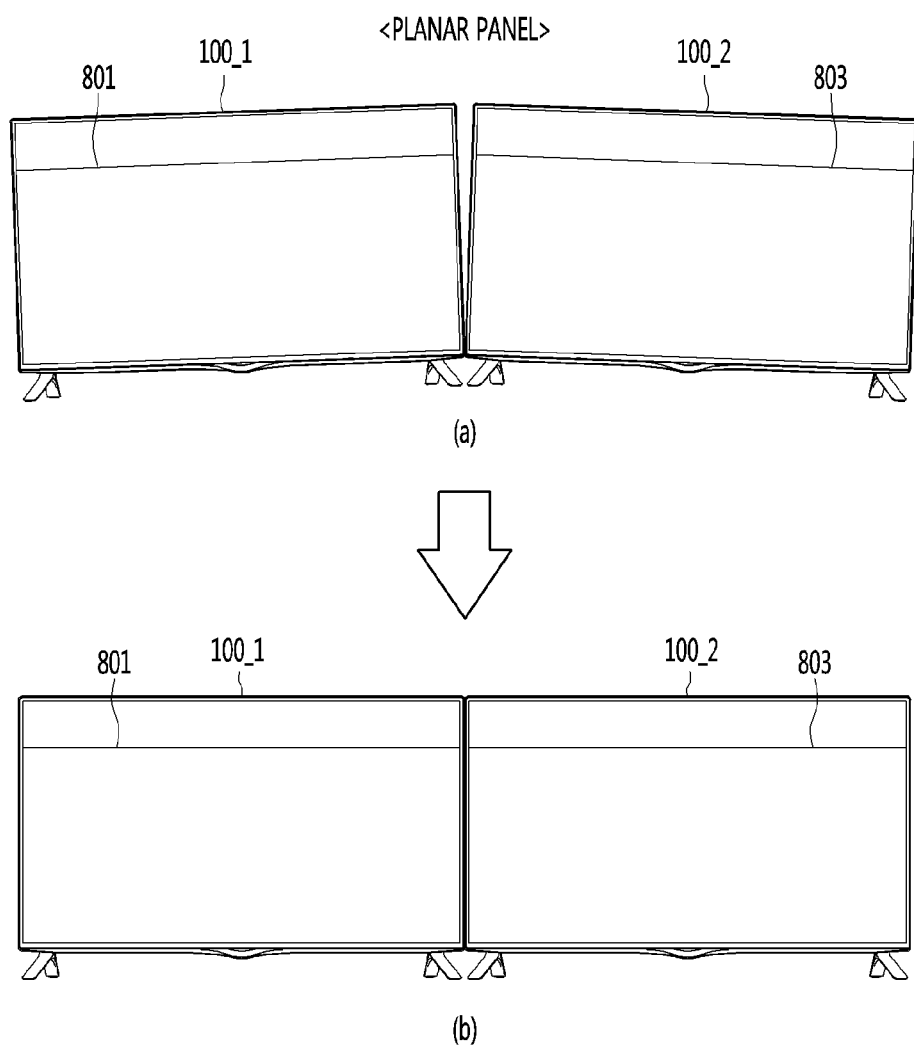

FIGS. 28 to 29 are diagrams illustrating an embodiment of providing a disposition guideline for guiding alignment of the display devices when physical disposition of a first display device and a second display device is twisted.

Figure 30:
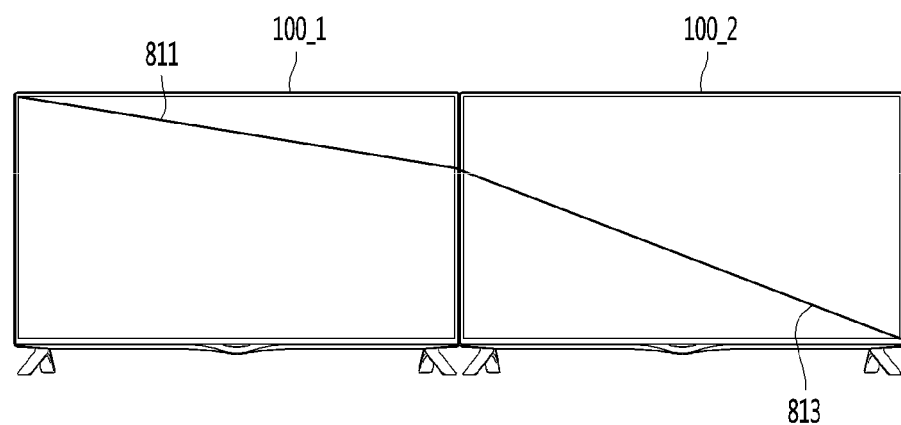

FIG. 30 is a diagram showing a screen, on which a diagonal guideline is displayed, according to an embodiment of the present invention.

Figure 31:
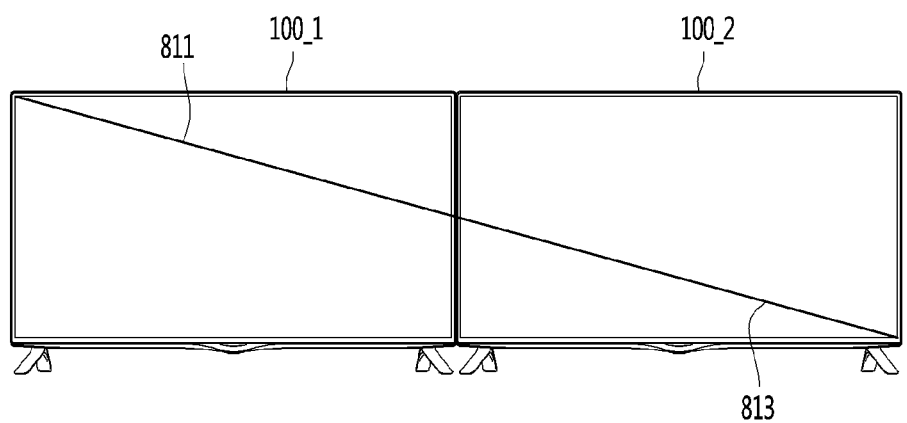

FIG. 31 is a diagram showing a screen, on which a diagonal guideline is aligned, according to an embodiment of the present invention.

Figure 32:
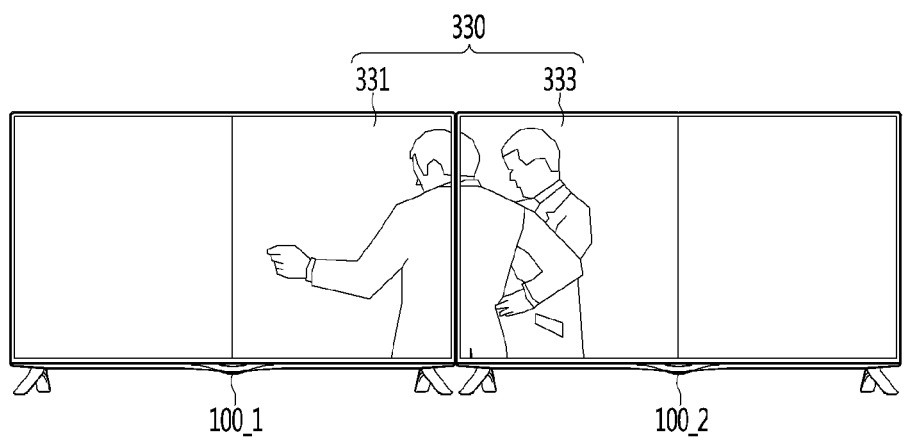

FIG. 32 is a diagram showing a merged screen according to an embodiment of the present invention.

Figure 33:
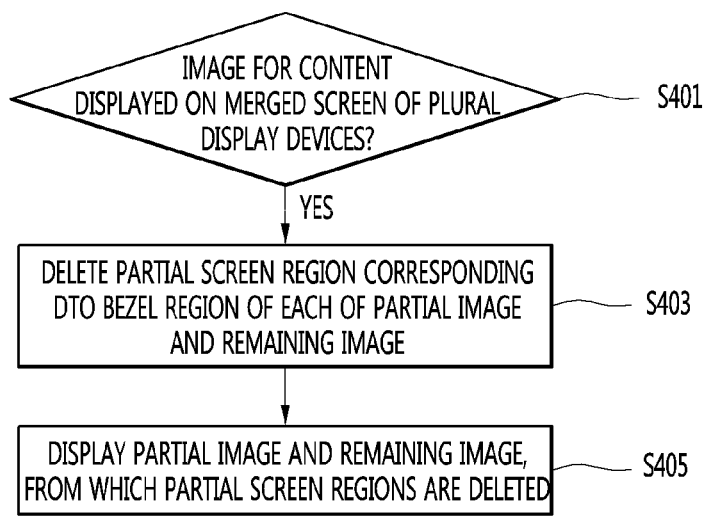

FIG. 33 is a flowchart illustrating image correction operation of a merged screen according to an embodiment of the present invention.

Figure 34:
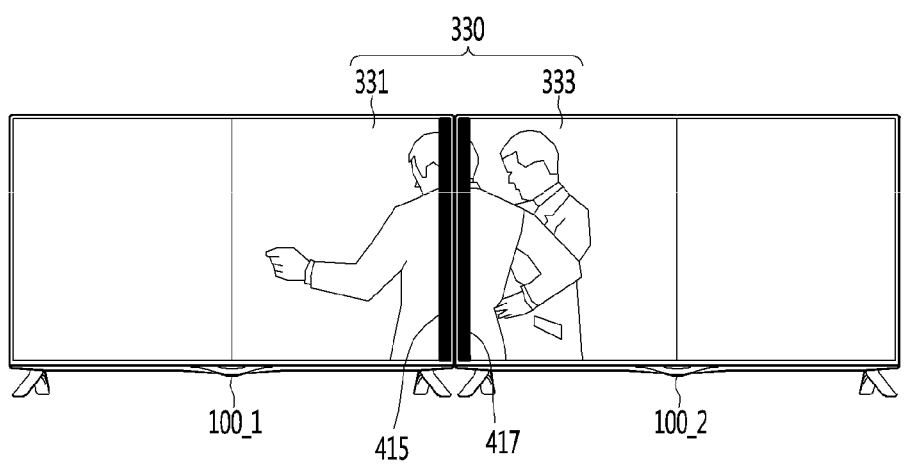

FIG. 34 is a diagram showing a partial screen region corresponding to a bezel region according to an embodiment of the present invention.

Figure 35:
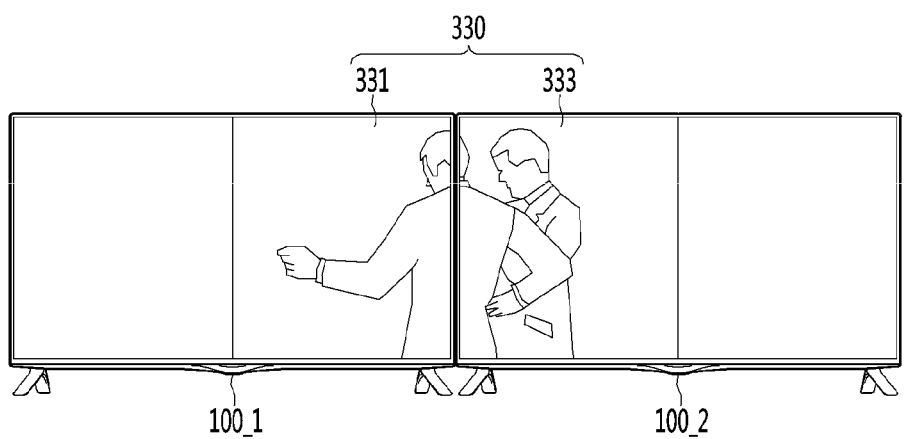

FIG. 35 is a diagram showing a merged screen, from which a partial region is deleted, according to an embodiment of the present invention.

Figure 36:
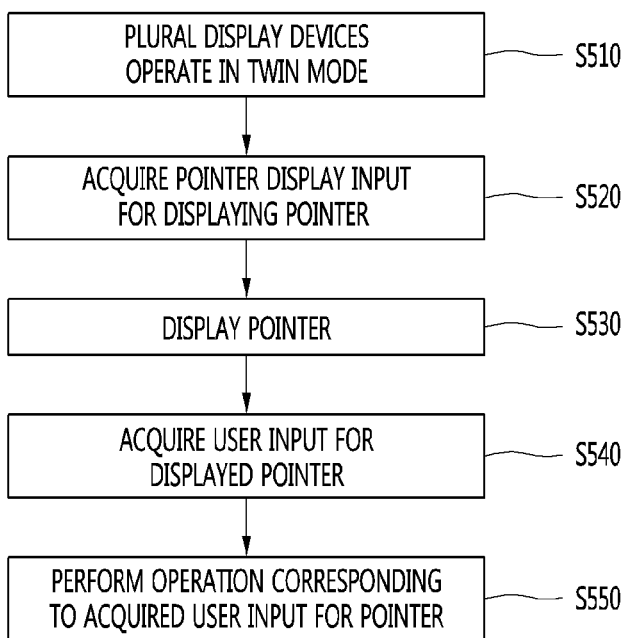

FIG. 36 is a flowchart illustrating a method of operating a display device according to user input for a pointer of a display device according to an embodiment of the present invention.

Figure 37A:
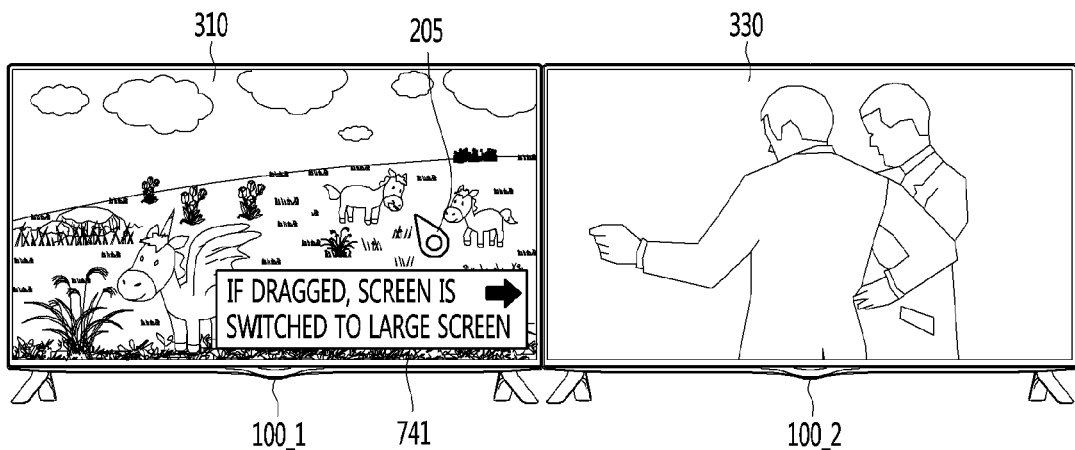

FIG. 37a is a diagram showing a screen for displaying guide information of display of a merged screen according to an embodiment of the present invention.

Figure 37B:
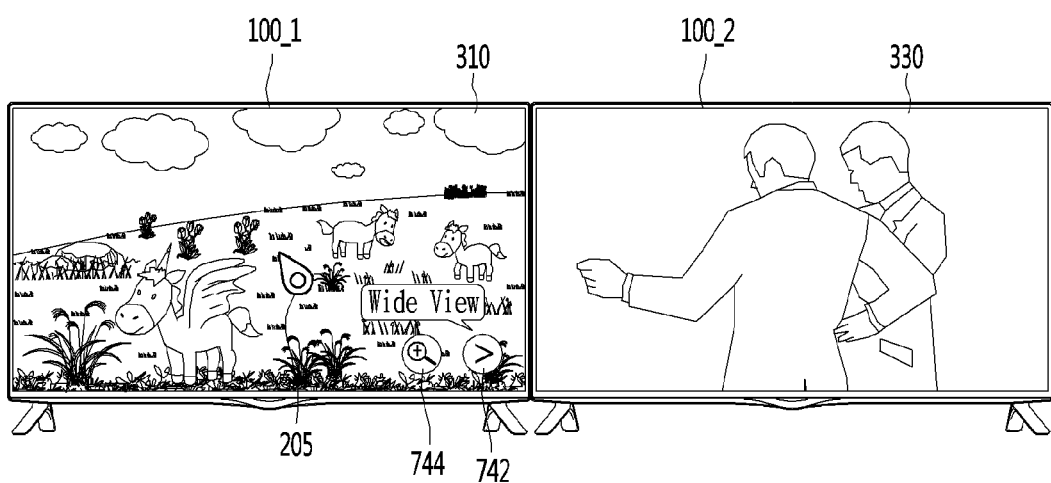

FIG. 37b is a diagram showing an example of displaying a merged screen icon according to an embodiment of the present invention.

Figure 37C:
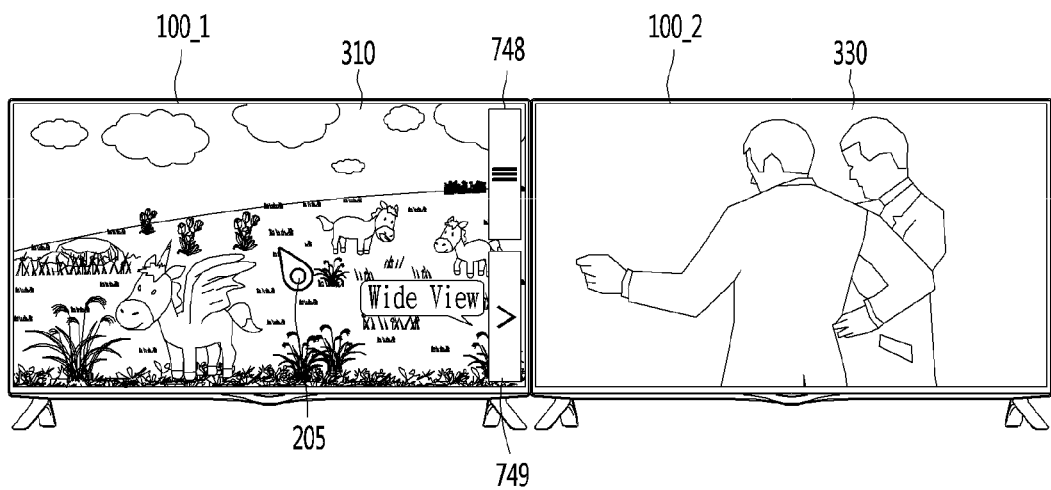

FIG. 37c is a diagram showing an example of displaying a merged screen icon according to another embodiment of the present invention.

Figure 37D:
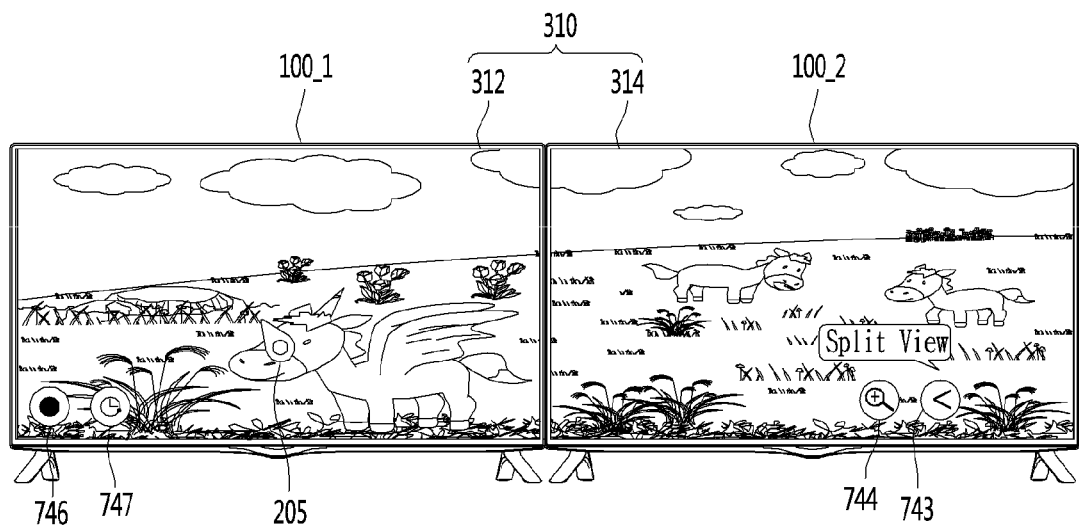

FIG. 37d is a diagram showing an example of displaying a divided screen icon according to another embodiment of the present invention.

Figure 38:
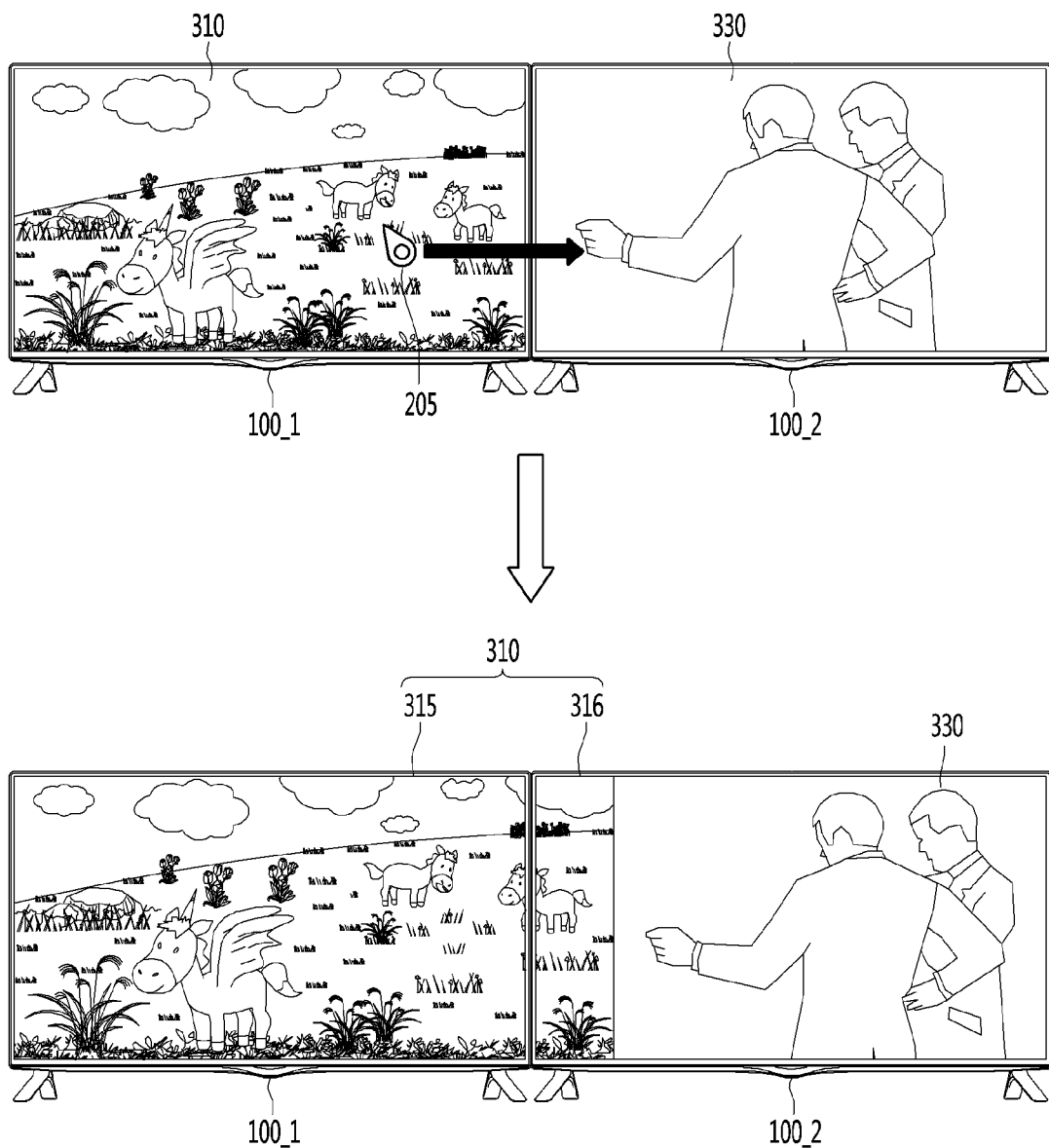

FIG. 38 is a diagram showing screen size adjustment operation according to an embodiment of the present invention.

Figure 39:
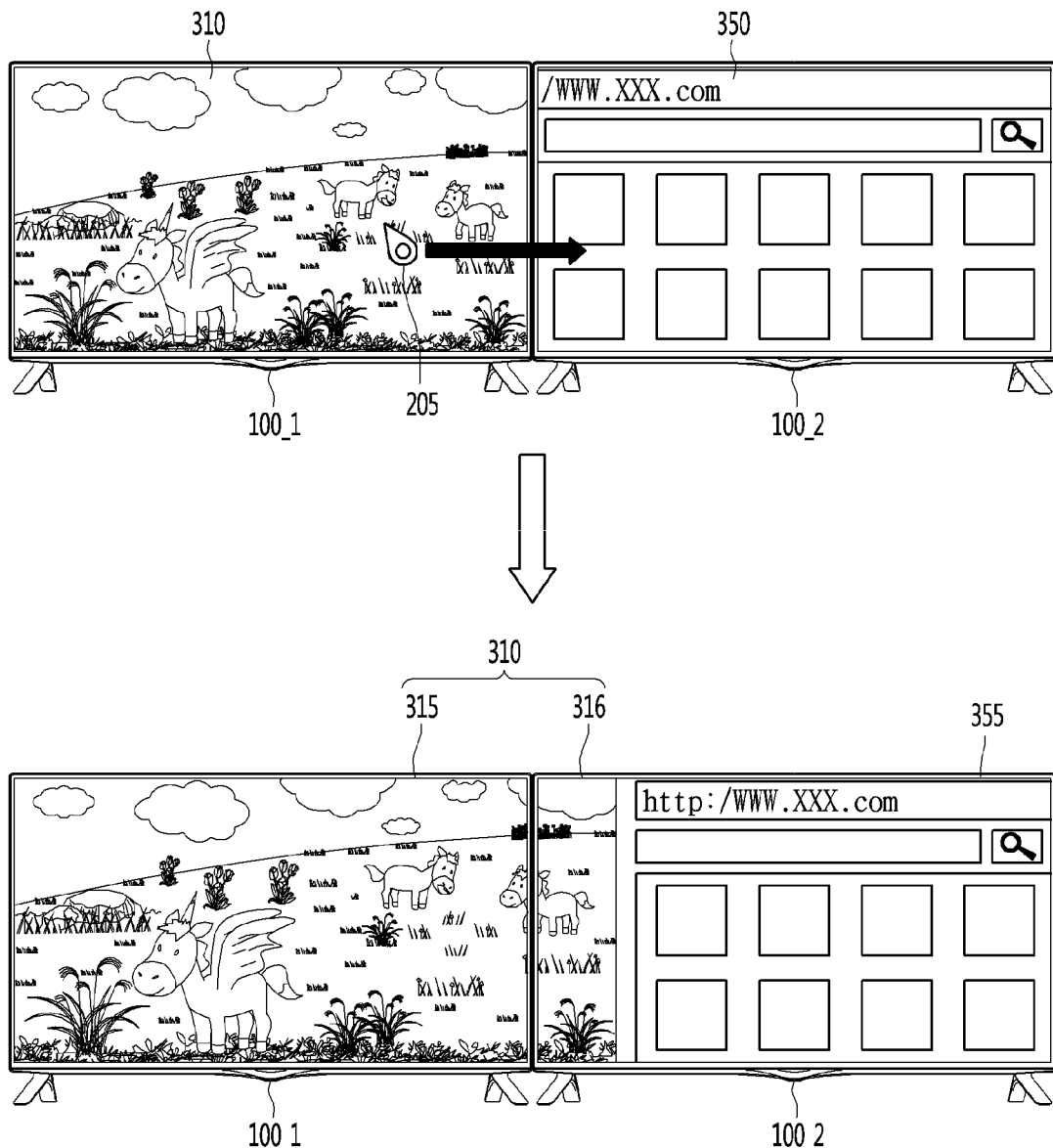

FIG. 39 is a diagram showing screen size adjustment operation according to an embodiment of the present invention.

Figure 40A:
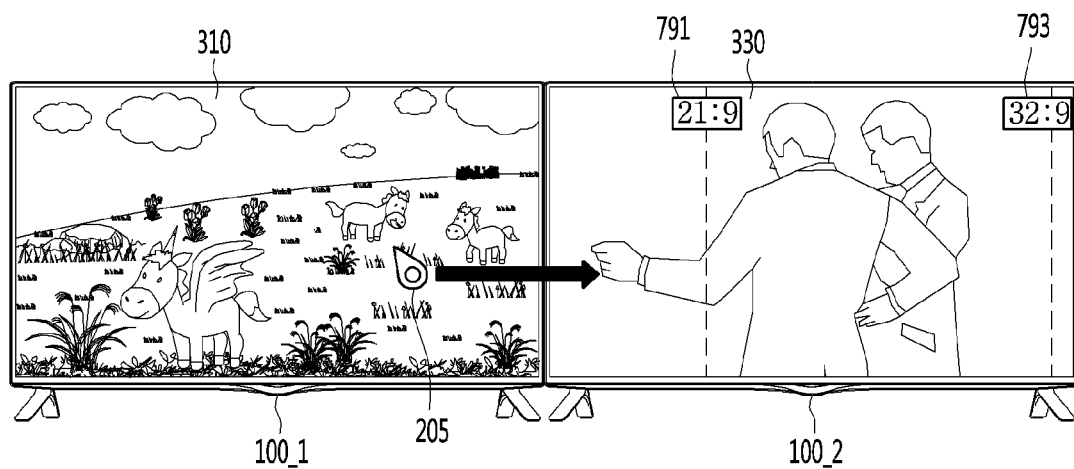

FIG. 40a is a diagram showing a reference line indicating an aspect ratio to be adjusted according to an embodiment of the present invention.

Figure 40B:
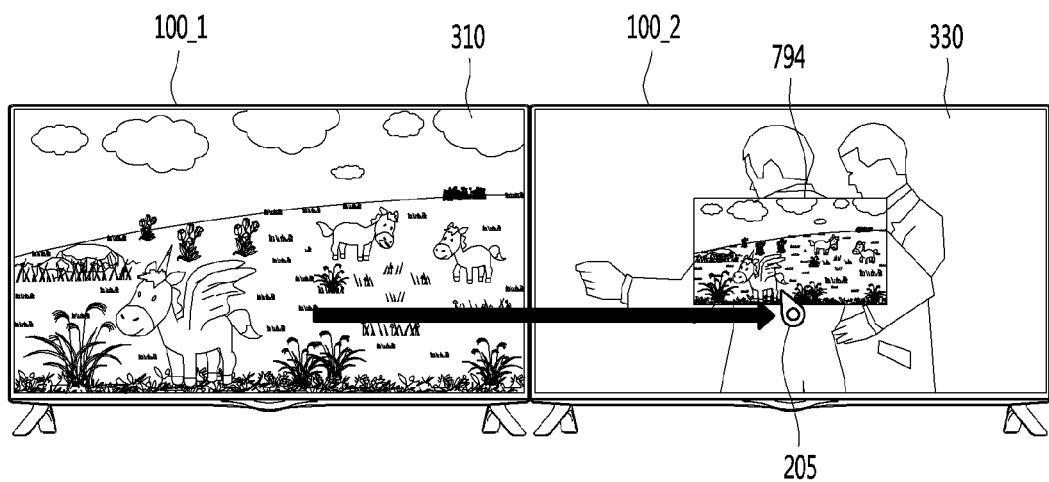

FIG. 40b is a diagram showing a thumbnail image indicating a preview image corresponding to an aspect ratio to be adjusted according to an embodiment of the present invention.

Figure 41:
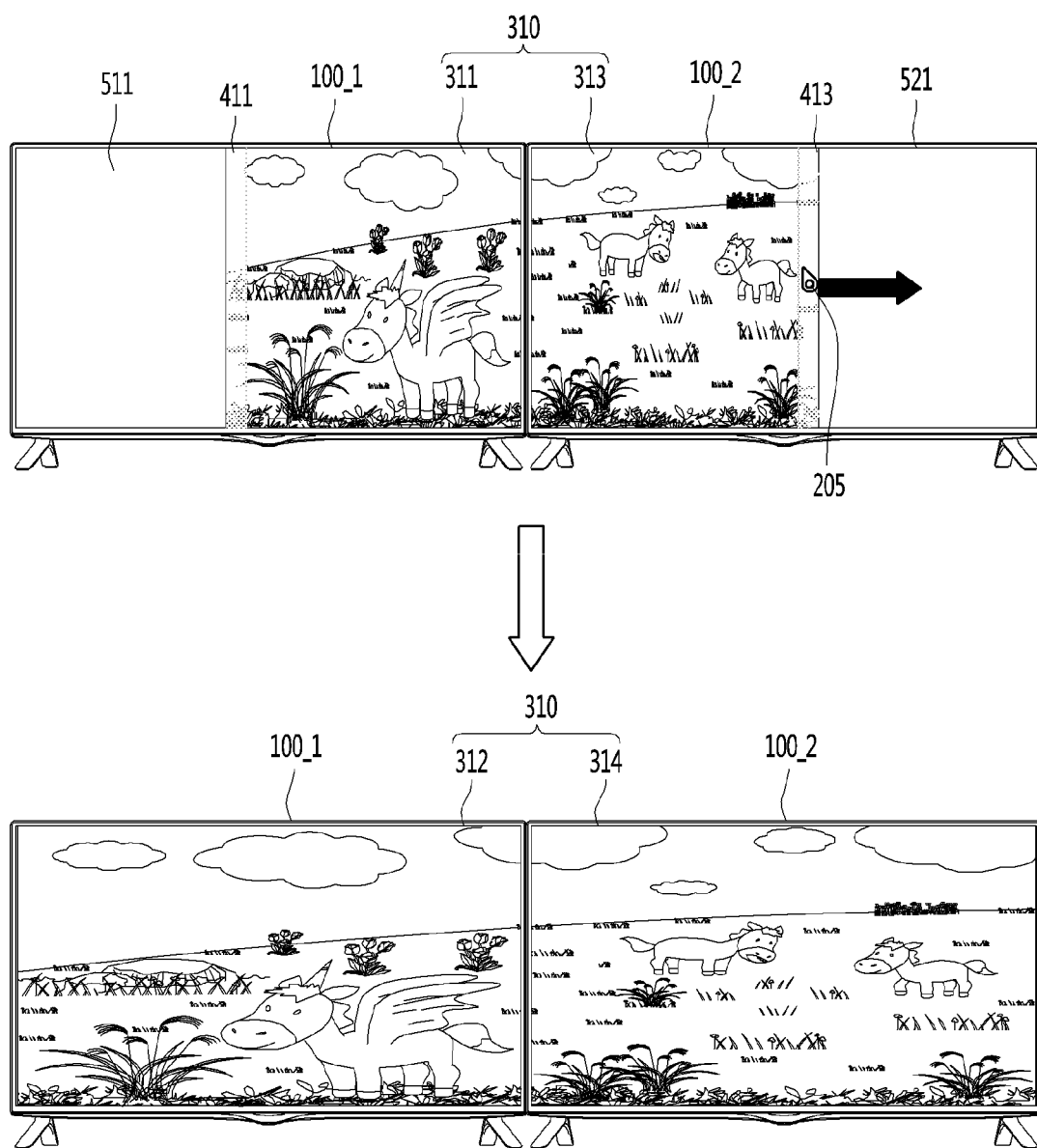

FIG. 41 is a diagram showing operation of adjusting the size of a merged screen according to an embodiment of the present invention.

FIG. 42 is a diagram showing an example of operation of displaying a merged screen according to an embodiment of the present invention.

FIG. 43 is a diagram showing an example of operation of moving a merged screen according to an embodiment of the present invention.

FIG. 44 is a diagram showing a speaker volume control region corresponding to a pointer location according to an embodiment of the present invention.

FIG. 45 is a diagram showing volume control input for a first left speaker according to an embodiment of the present invention.

FIG. 46 is a diagram showing volume control operation of a first left speaker according to an embodiment of the present invention.

FIG. 47 is a diagram showing volume control input of a first right speaker and a second left speaker according to an embodiment of the present invention.

Figure 48:
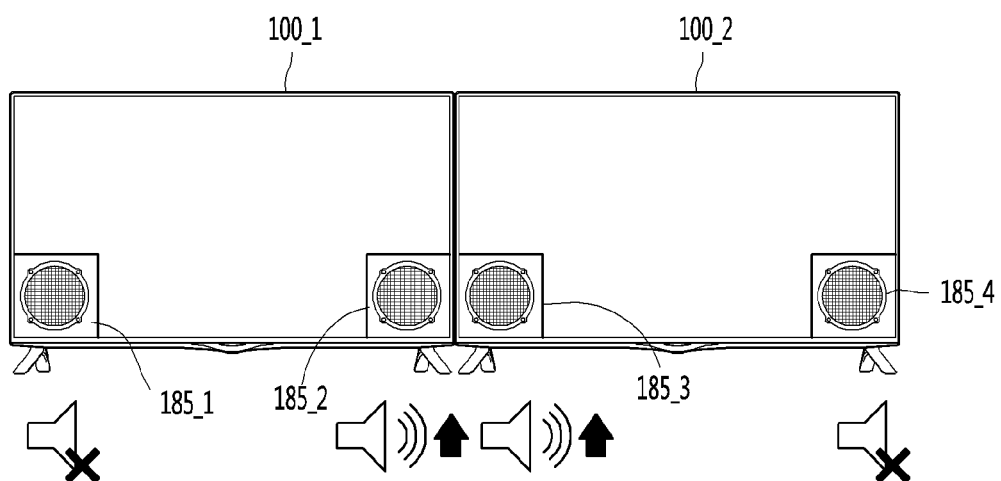

FIG. 48 is a diagram showing volume control operation of a first right speaker and a second left speaker according to an embodiment of the present invention.

Figure 49:
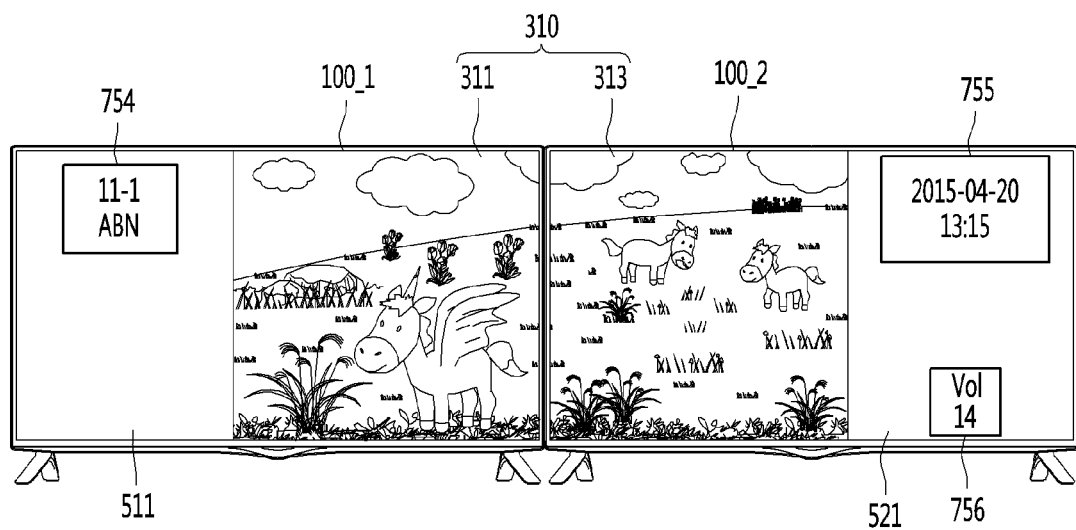

FIG. 49 is a diagram showing a screen, on which an info box is displayed, according to an embodiment of the present invention.

Figure 50:
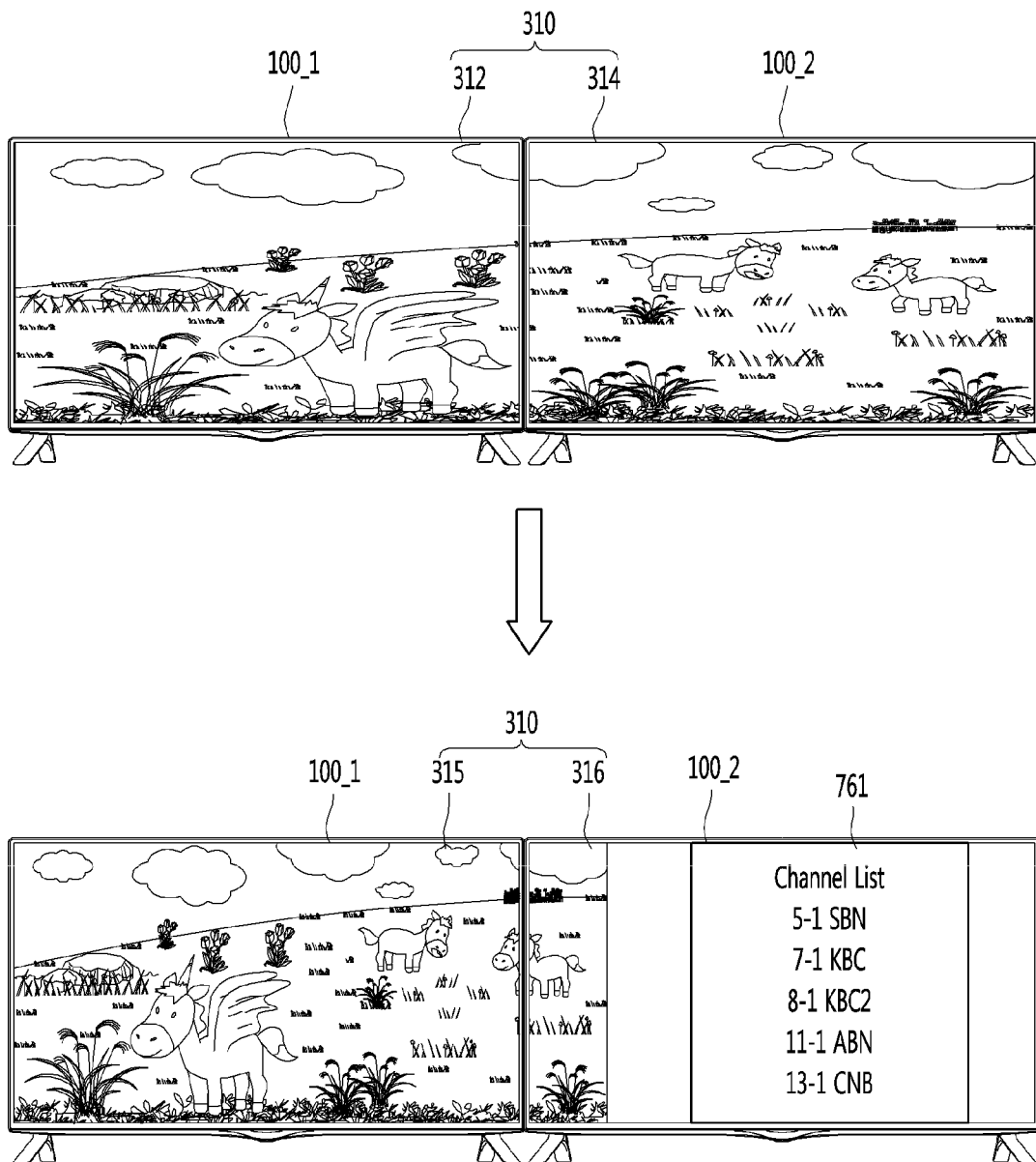

FIG. 50 is a diagram showing channel list display operation according to an embodiment of the present invention.

Figure 51:
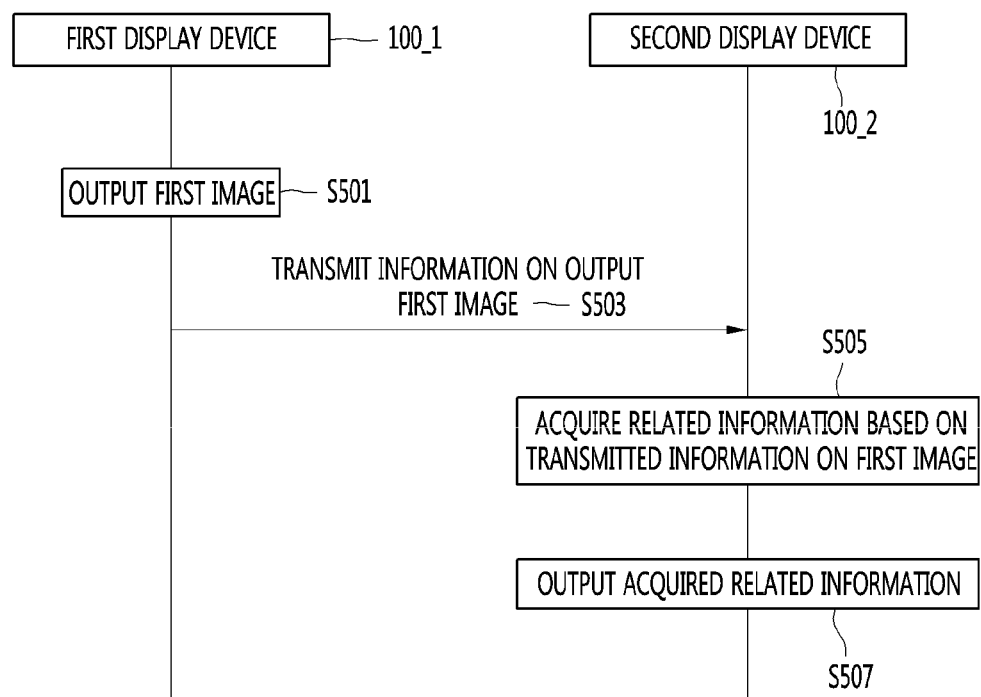

FIG. 51 is a flowchart illustrating operation of displaying related information according to an embodiment of the present invention.

Figure 52:
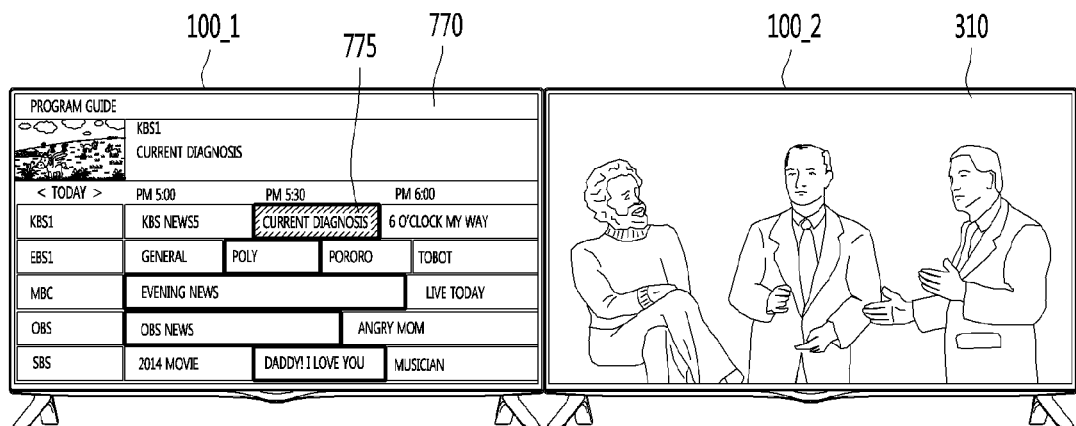

FIG. 52 is a diagram showing an example of EPG display according to an embodiment of the present invention.

Figure 53:
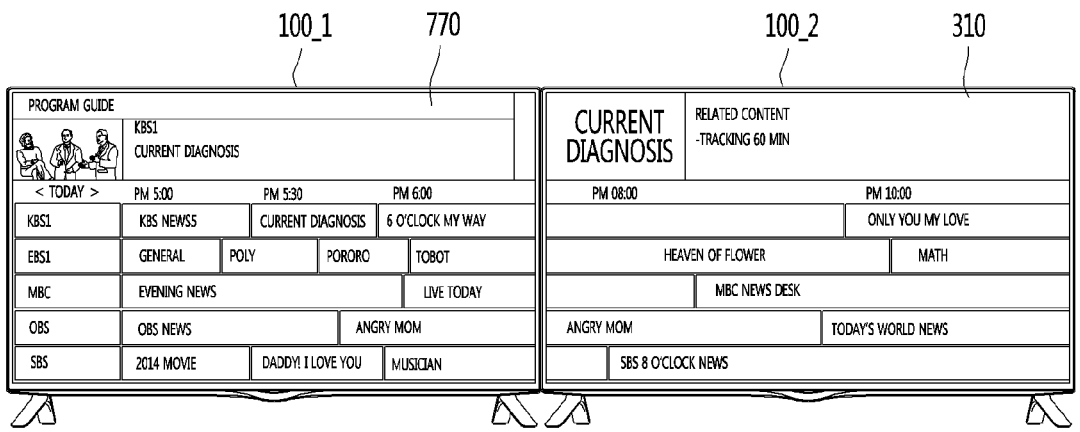

FIG. 53 is a diagram showing a merged screen for displaying an EPG according to an embodiment of the present invention.

FIG. 54*a* is a diagram showing display of an enlarged image according to an embodiment of the present invention.

FIG. 54*b* is a diagram showing selection of an enlarged region through a terminal according to an embodiment of the present invention.

FIG. 54*c* is a diagram showing a selection of an enlarged region through a terminal according to an embodiment of the present invention.

FIG. 55 is a diagram showing selection of an output image according to an embodiment of the present invention.

FIG. 56 is a diagram showing screen setting according to an embodiment of the present invention.

FIG. 57 is a diagram showing movement of an image displayed on a merged screen according to an embodiment of the present invention.

FIG. 58 is a diagram showing an image display screen according to an embodiment of the present invention.

FIG. 59 is a diagram showing a menu screen according to an embodiment of the present invention.

Figure 60:
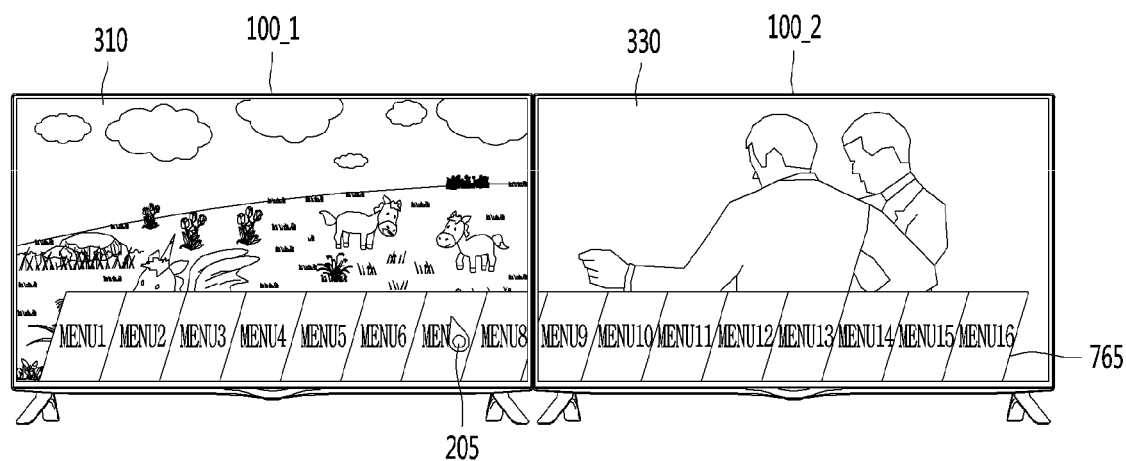

FIG. 60 is a diagram showing a menu screen according to another embodiment of the present invention.

Figure 61:
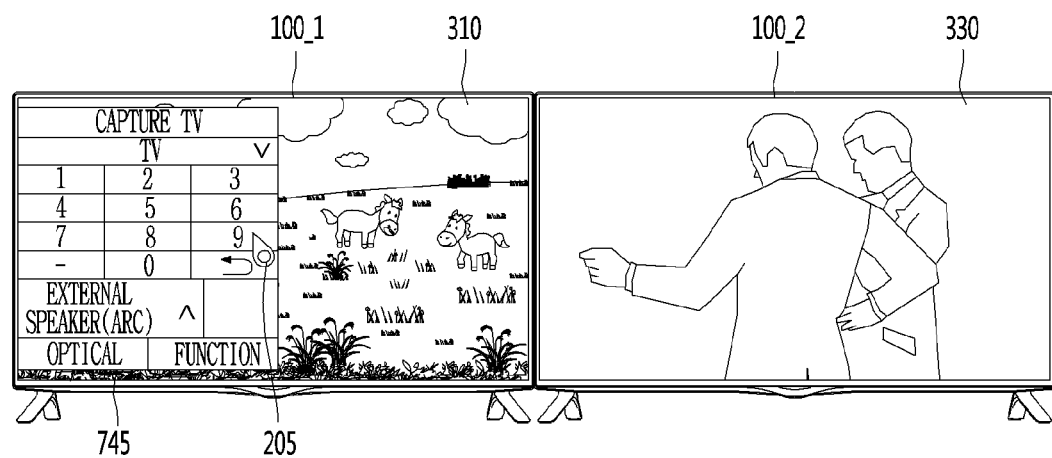

FIG. 61 is a diagram showing a screen for displaying an input key according to an embodiment of the present invention.

Figure 62:
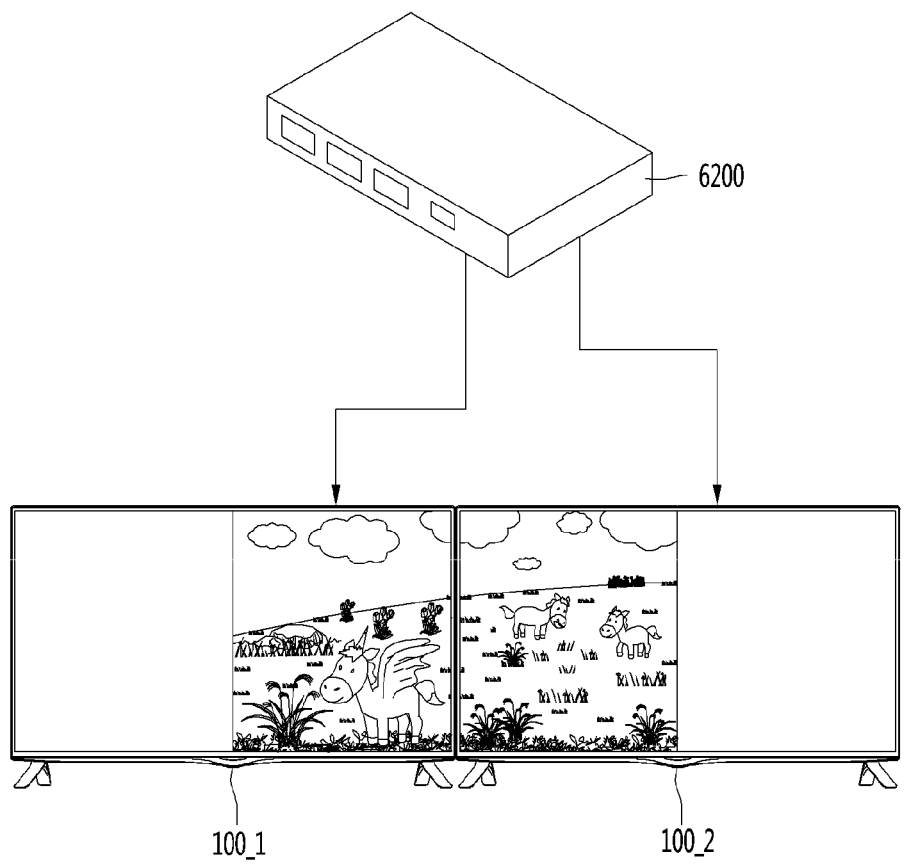

FIG. 62 is a diagram showing an output device for distributing content into a plurality of display devices according to an embodiment of the present invention.

Figure 63:
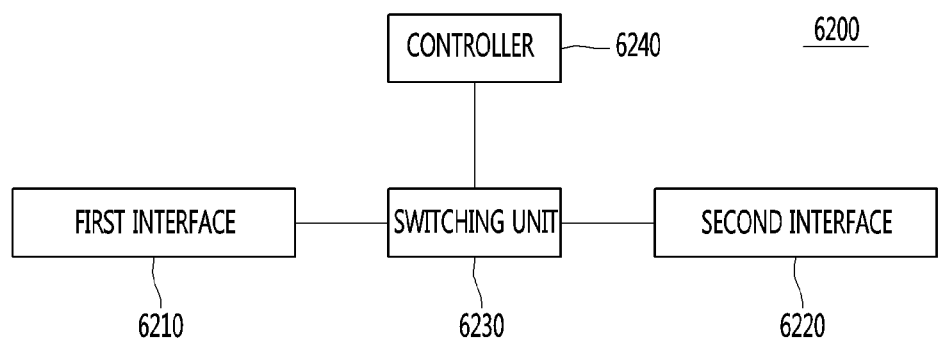

FIG. 63 is a block diagram illustrating the configuration of an output device according to another embodiment of the present invention.

Figure 64:
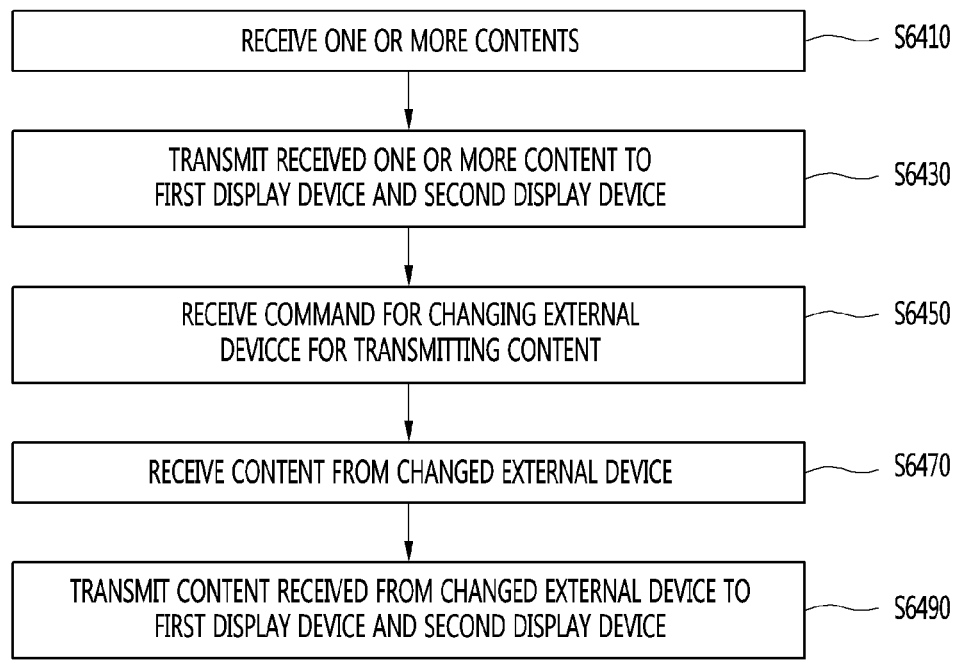

FIG. 64 is a flowchart illustrating a content output method of an output device for outputting content to a first display device and a second display device according to another embodiment of the present invention.

Figure 65:
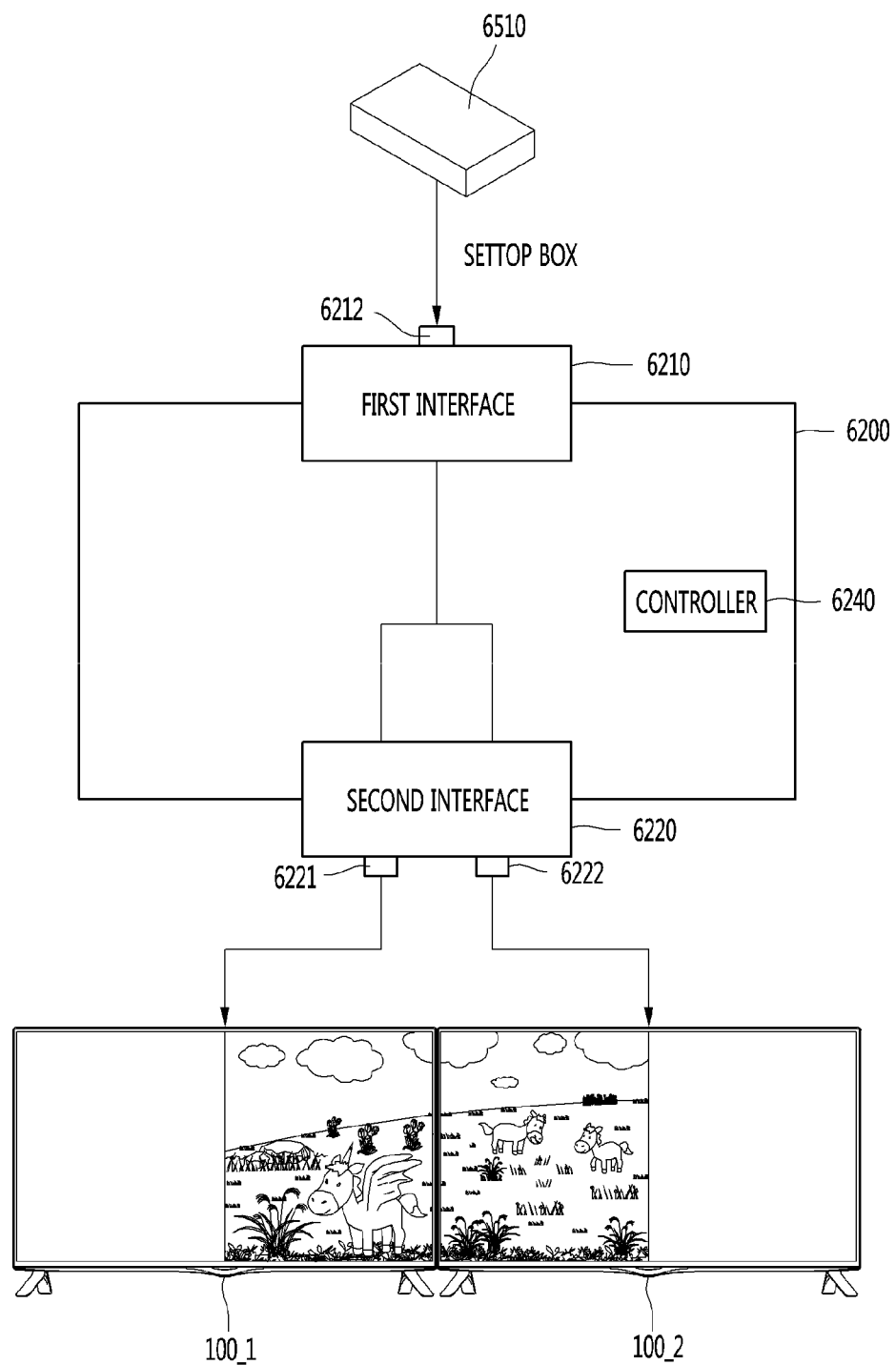

FIG. 65 is a diagram illustrating a process of transmitting content output from one external device.

Figure 66:
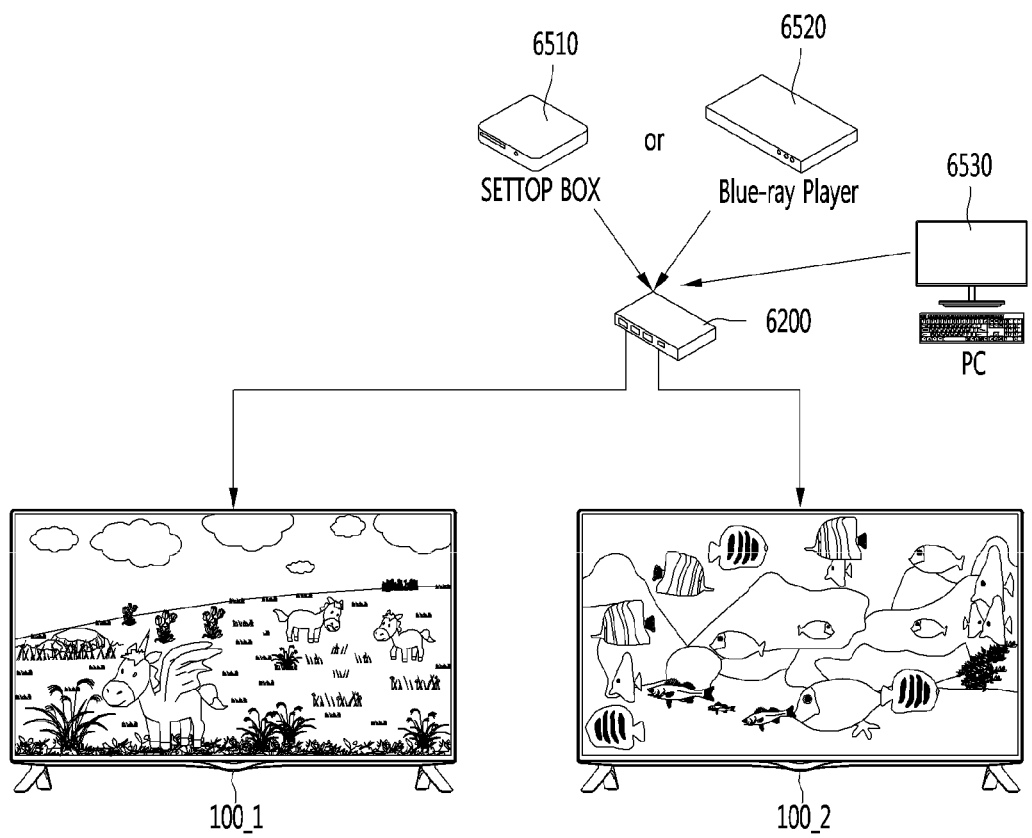
Figure 67:
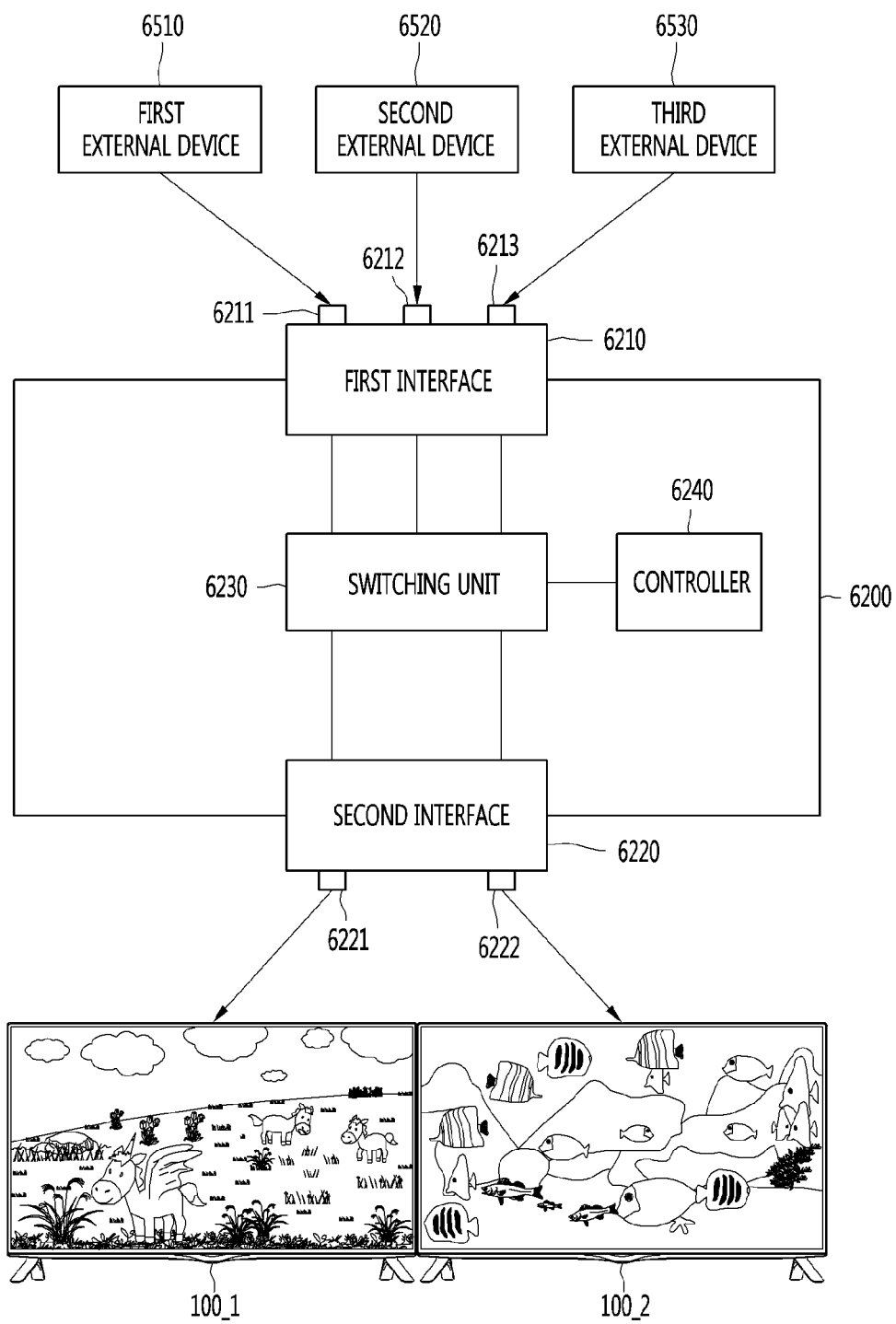

FIGS. 66 to 67 are diagrams illustrating a process of transmitting content output from a plurality of external devices.

Figure 68:
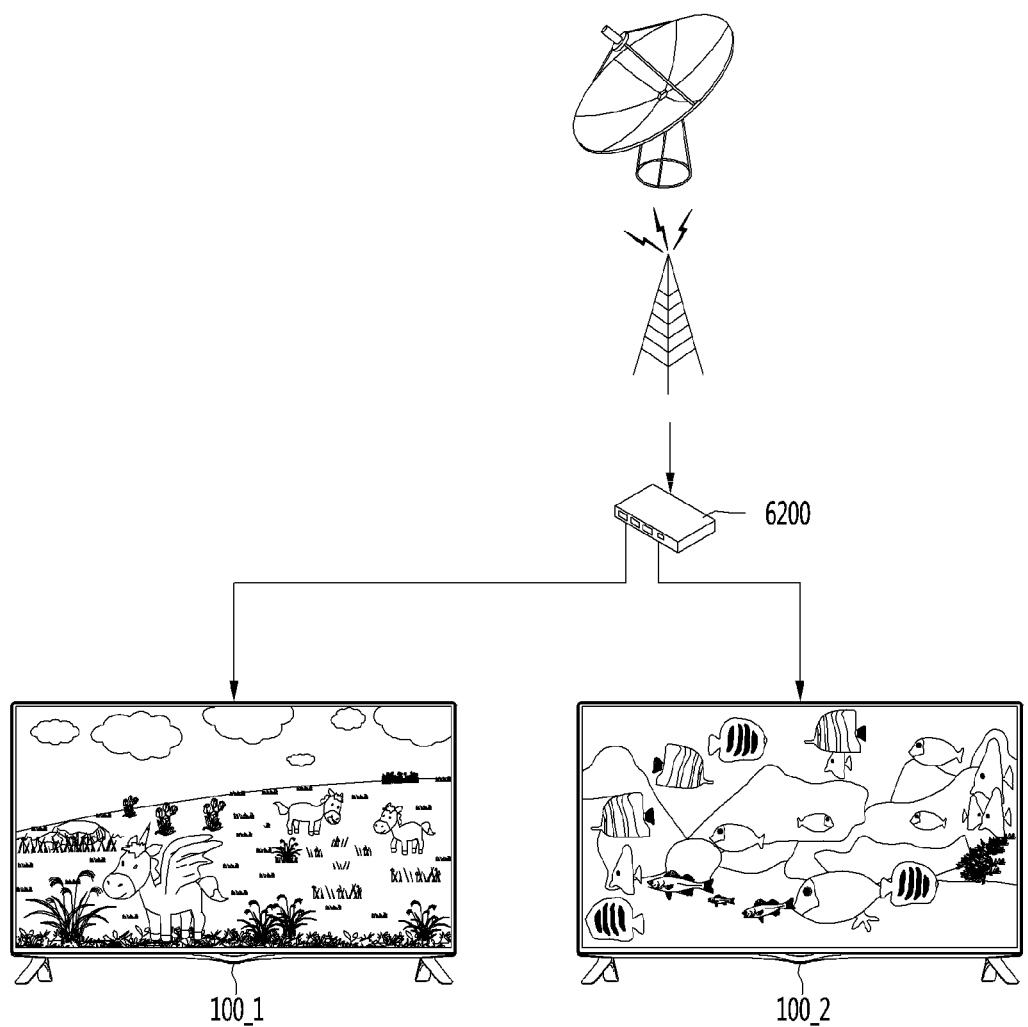

FIG. 68 is a diagram illustrating a content output method when content is received in the form of a broadcast signal.

Figure 69:
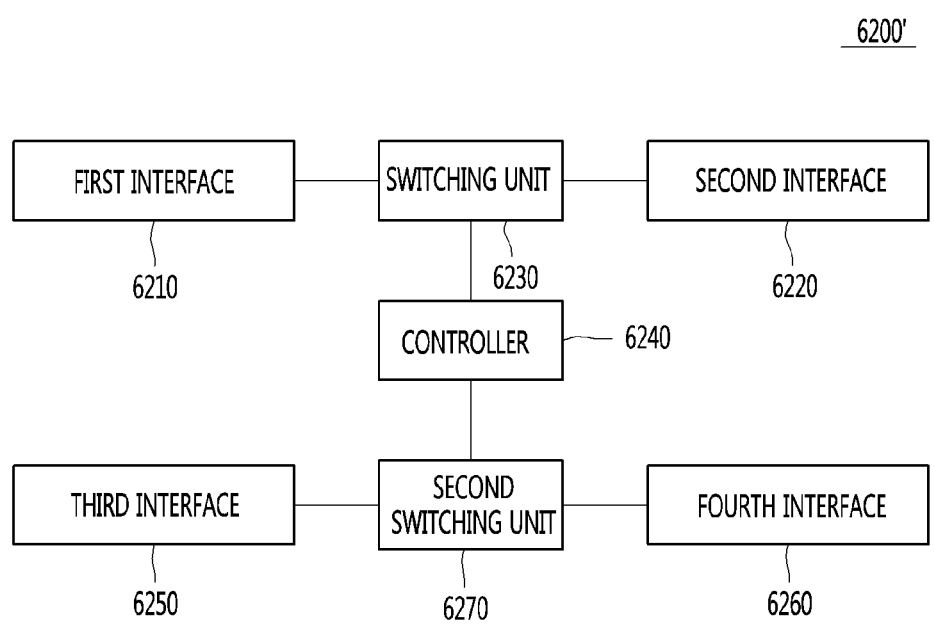

FIG. 69 is a block diagram illustrating the configuration of an output device according to another embodiment of the present invention.

Figure 70:
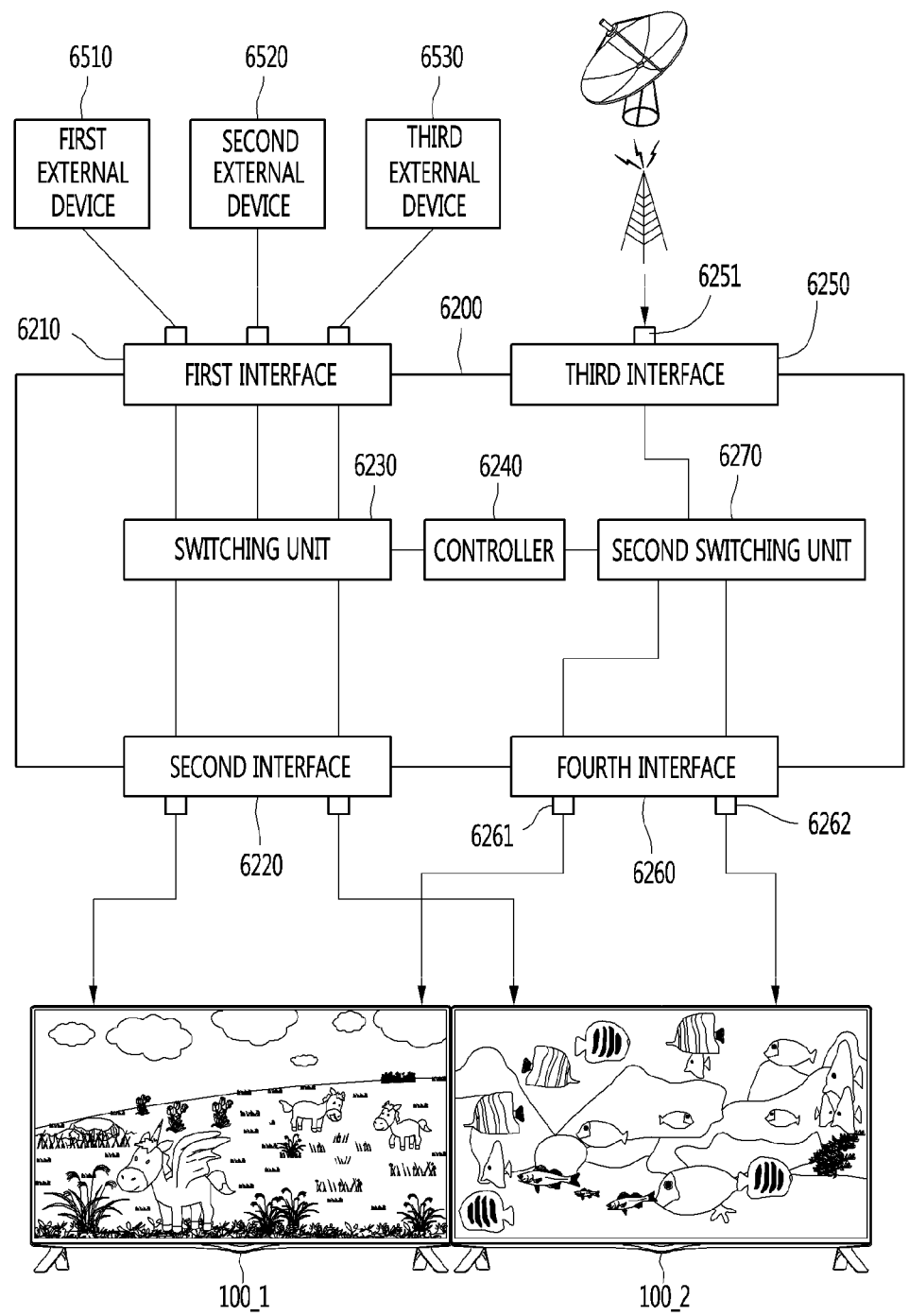

FIG. 70 is a diagram illustrating a process of transmitting content received in the form of a broadcast signal.

Figure 71:
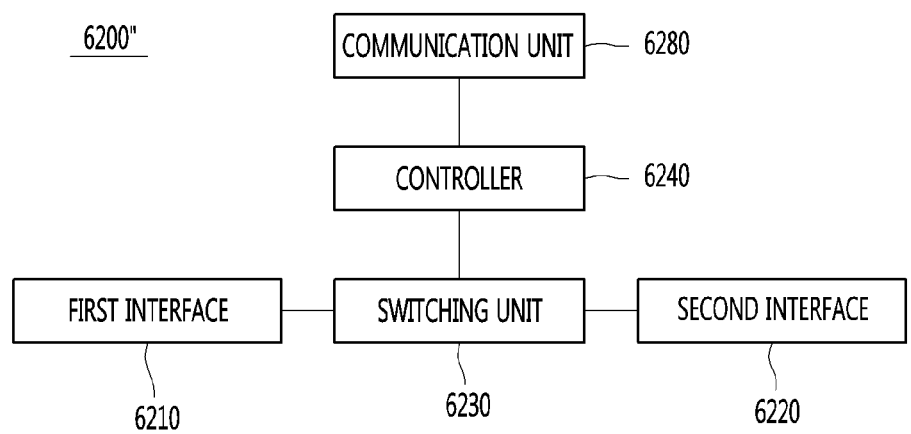

FIG. 71 is a block diagram illustrating an output device according to another embodiment of the present invention.

Figure 72:
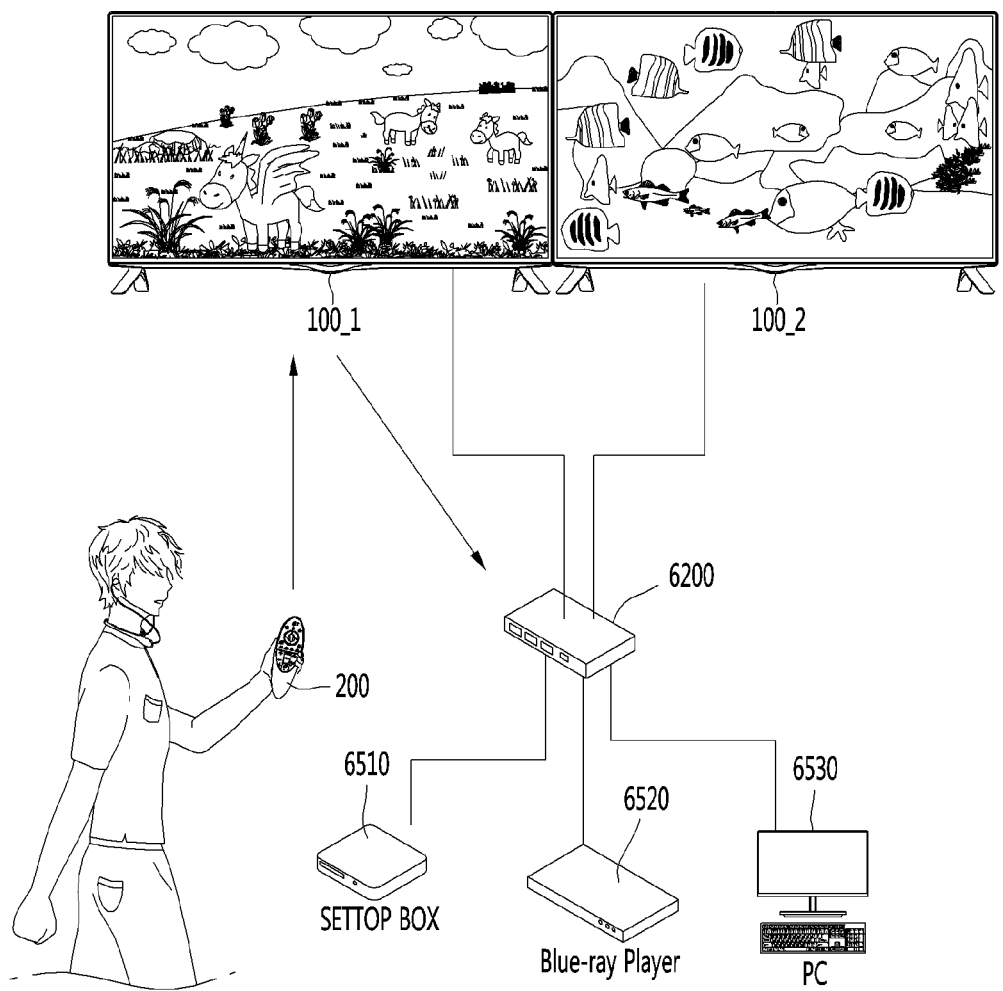

FIG. 72 is a diagram illustrating an output device for receiving user input from a display device.

Figure 73:
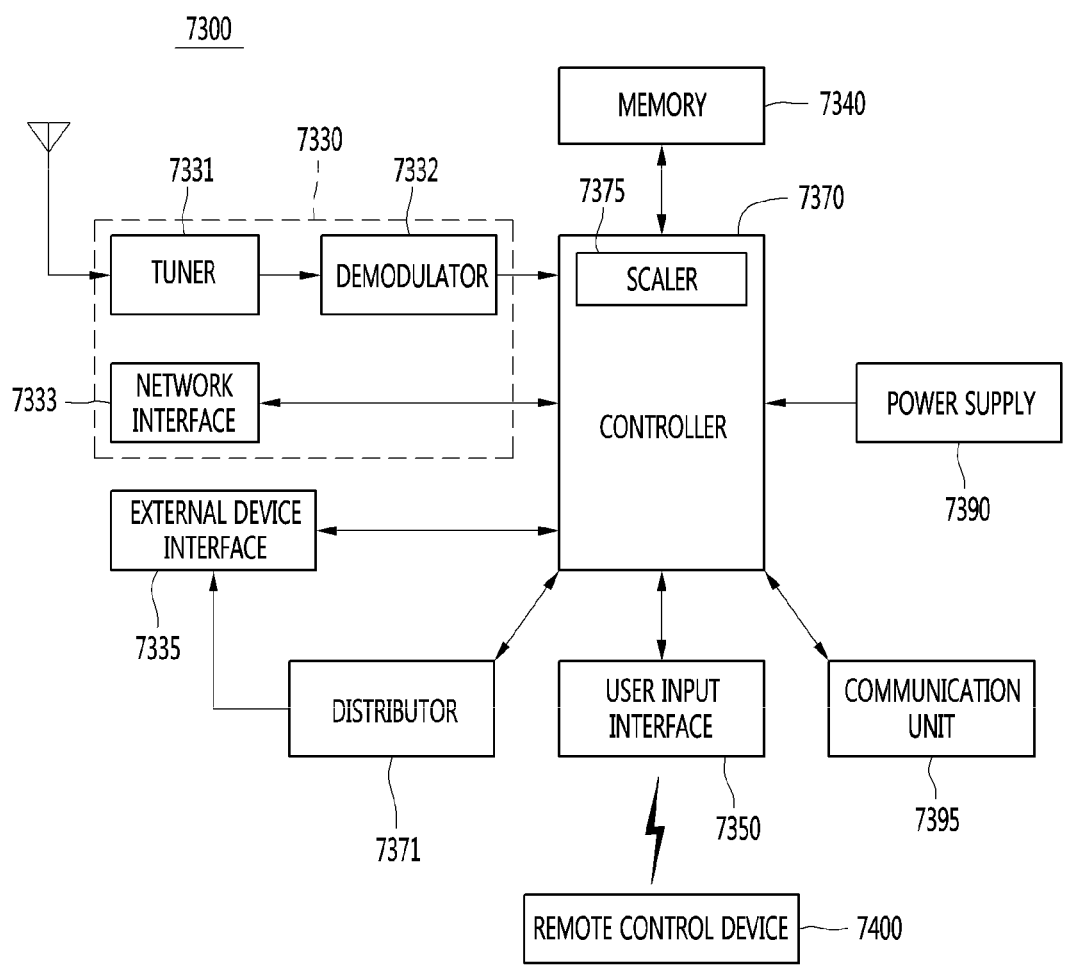

FIG. 73 is a block diagram illustrating an output device 7300 according to another embodiment of the present invention.

Figure 74A:
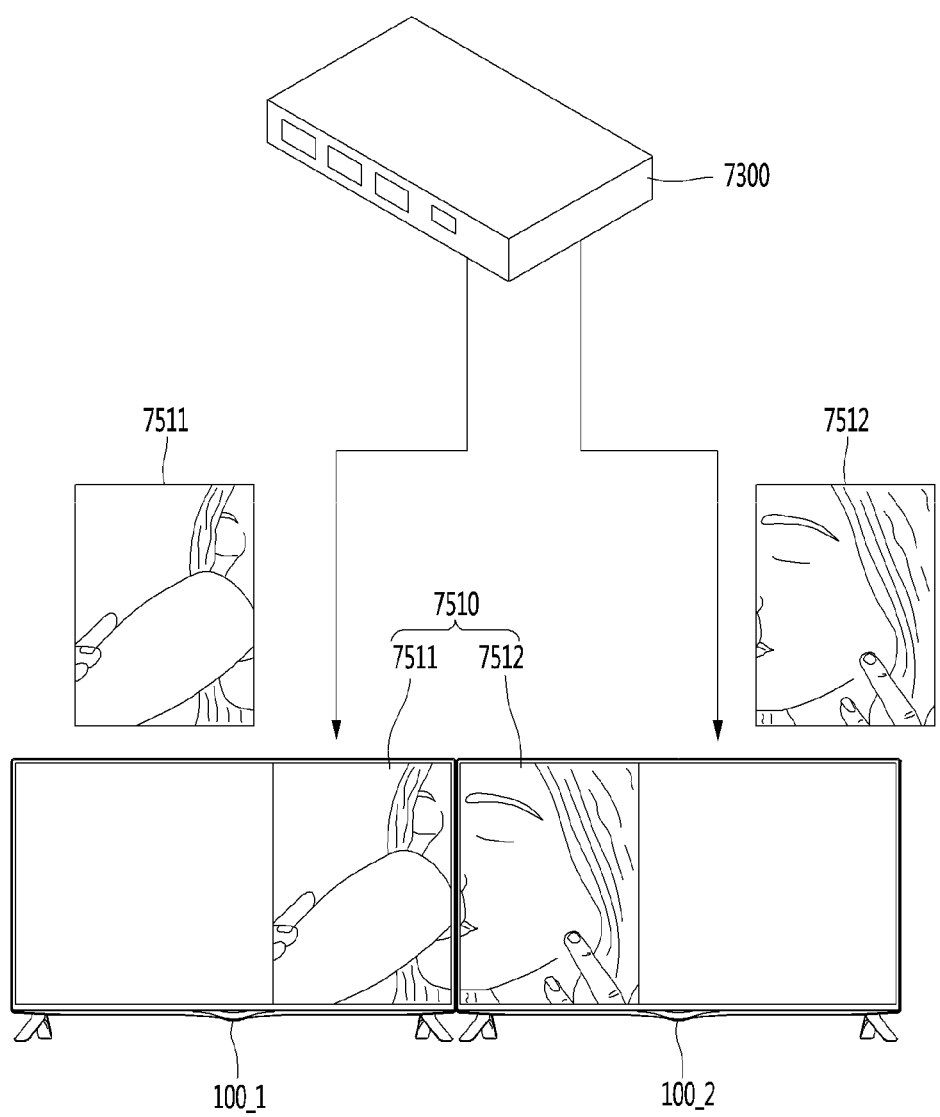
Figure 74B:
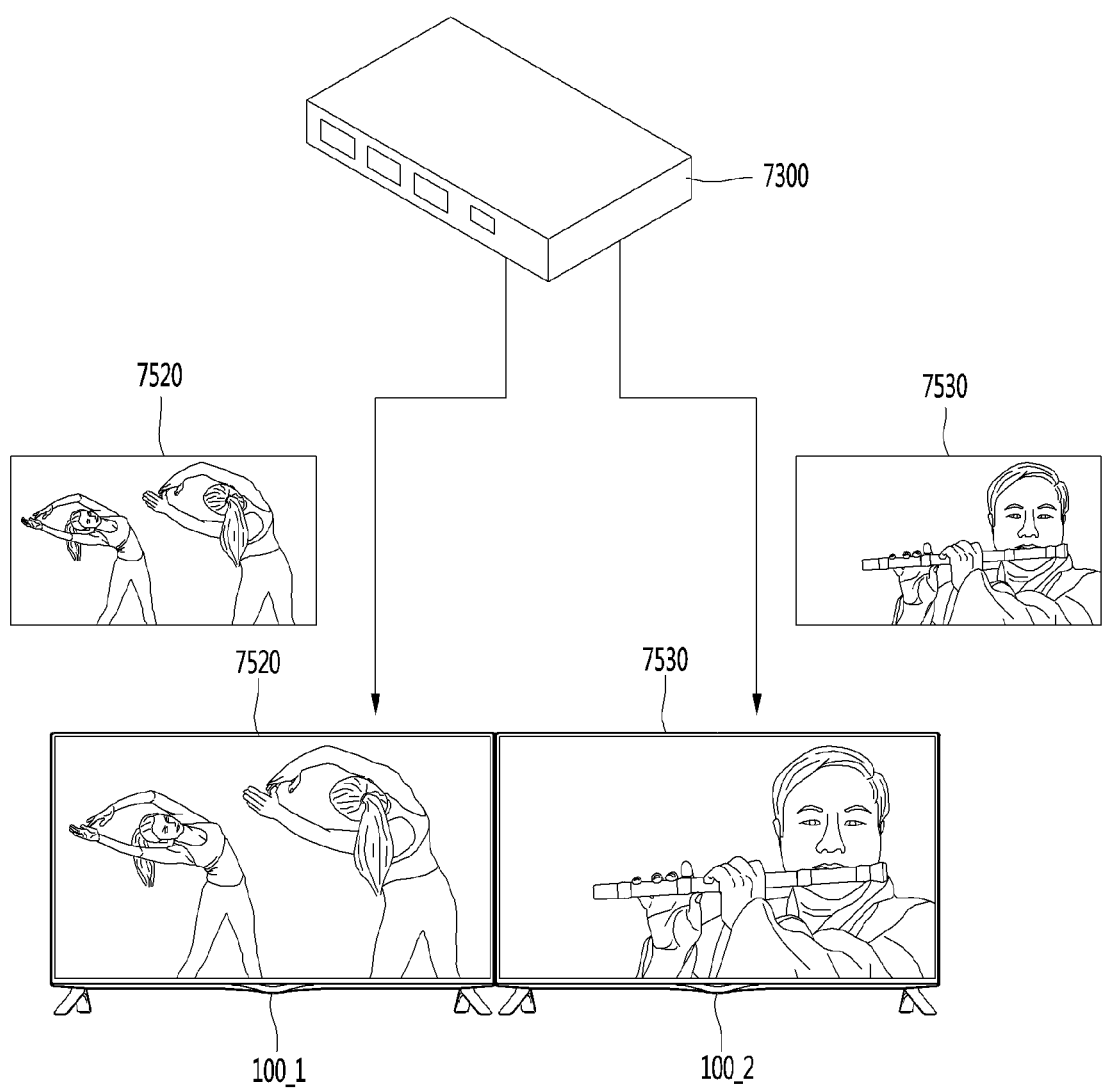

FIGS. 74*a* and 74*b* are diagrams illustrating a method of outputting content to a first display device 100_1 and a second display device 100_2 at an output device 7300.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a pointing device as an internet function is added while fulfilling the broadcast receiving function. Then, with the support of a wired or wireless internet function, it is possible to access the Internet and computers to perform an e-mail, web browsing, banking, or game function. For such various functions, standardized general-purpose OS can be used.

Accordingly, since various applications are freely added or deleted on a general-purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
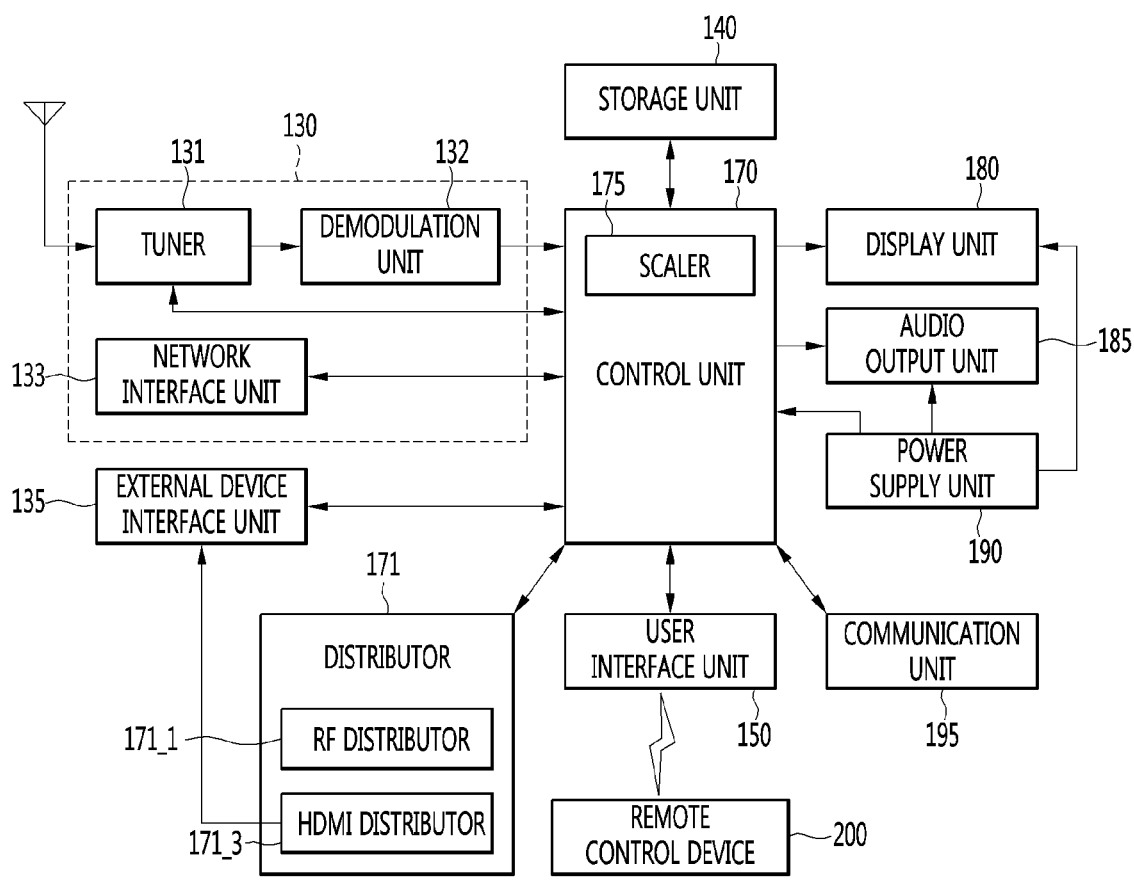
FIG. 1 is a block diagram showing the configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface 135, a memory 140, a user input interface 150, a controller 170, a wireless communication unit 173, a display unit 180, an audio output unit 185, a power supply unit 190, and a communication unit 195.

The broadcast reception unit 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an outputtable form.

The external device interface 135 can receive an application or an application list in an adjacent external device and deliver it to the controller 170 or the memory 140.

The external device interface 135 can provide a connection path between the display device 100 and a peripheral device. The external device interface 135 can receive and deliver content stored in the peripheral device to the controller 170.

The network interface 133 can provide an interface for connecting the display device 100 to a wired/wireless network including the Internet. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. That is, the network interface can access a predetermined webpage through a network to transmit or receive data to or from a corresponding server.

Then, the network interface 133 can receive content or data provided from a content provider or a network operator. That is, the network interface 133 can receive content such as movies, advertisements, games, VODs, and broadcast signals, which are provided by a content provider or a network provider, and information relating thereto through a network.

Additionally, the network interface 133 can receive firmware update information and update files provided by a network operator and transmit data to an Internet or content provider or a network operator.

The network interface 133 can select and receive a desired application among applications open to the air, through a network.

The memory 140 can store signal-processed image, voice, or data signals stored by a program for processing and controlling each signal in the controller 170.

Additionally, the memory 140 can perform a function for temporarily storing image, voice, or data signals output from the external device interface 135 or the network interface 133 and can store information on a predetermined image through a channel storage function.

The memory 140 can store an application or an application list received from the external device interface 135 or the network interface 133.

The display device 100 can play content files (for example, video files, still image files, music files, document files, application files, and so on) stored in the memory 140 and provide the content files to a user.

The user input interface 150 can deliver signals input by a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals input through local keys (not shown) such as a power key, a channel key, a volume key, and a setting key.

Image signals that are image-processed in the controller 170 can be input to the display unit 180 and displayed as an image corresponding to corresponding image signals. Additionally, image signals that are image-processed in the controller 170 can be input to an external output device through the external device interface 135.

Voice signals processed in the controller 170 can be audibly output through the audio output unit 185. Additionally, voice signals processed in the controller 170 can be input to an external output device through the external device interface 135.

Besides that, the controller 170 can control overall operations in the display device 100.

Additionally, the controller 170 can control the display device 100 by a user command or internal program input through the user input interface 150 and access a network to download a desired application or application list into the display device 100.

The controller 170 can output channel information selected by a user together with processed image or voice signals through the display unit 180 or the audio output unit 185.

Additionally, according to an external device image playback command received through the user input interface 150, the controller 170 can output image signals or voice signals of an external device such as a camera or a camcorder, which are input through the external device interface 135, through the display unit 180 or the audio output unit 185.

Moreover, the controller 170 can control the display unit 180 to display images and control broadcast images input through the tuner 131, external input images input through the external device interface 135, images input through the network interface, or images stored in the memory 140 to be displayed on the display unit 180. In this case, an image displayed on the display unit 180 can be a still image or video and also can be a 2D image or a 3D image.

Additionally, the controller 170 can perform control to play content stored in the display device 100, received broadcast content, and external input content received from an external device, and the content can take various formats such as broadcast images, external input images, audio files, still images, accessed web screens, and document files.

The controller 170 may include a scaler 175. The scaler 175 may scale an image acquired from an external device to resolution capable of being output by the display unit 180 and delivers the scaled image to the display unit 180.

The display unit 180 can convert image signals, data signals, or OSD signals, which are processed in the controller 170, or images signals or data signals, which are received by the external device interface 135, into R, G, and B signals to generate driving signals.

A divider 171 may divide content acquired from an external device into the display device and another display device 100. The divider 171 may include one or more of a radio frequency (RF) divider 171_1 and a high definition interface (HDMI) divider 171_2. The divider 171 will be described in detail below.

The communication unit 195 can exchange information with another display device through wired or wireless communication. The communication unit 195 can include a short-range communication module. The short-range communication module may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The communication unit 195 may be included in the controller 170.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface 133 or the external device interface 135 and play the images without including the tuner 131 and the demodulator 132.

For example, the display device 100 can be divided into an image processing device such as a set-top box for receiving broadcast signals or contents according to various network services and a content playback device for playing content received from the image processing device.

In this case, an operating method of a display device according to an embodiment of the present invention described below can be performed by the display device 100 described with reference to FIG. 1, an image processing device such as the separated set-top box, and a content playback device including the display unit 180 and the audio output unit 185.

Then, referring to FIGS. 2 and 3, a remote control device will be described according to an embodiment of the present invention.

Figure 2:
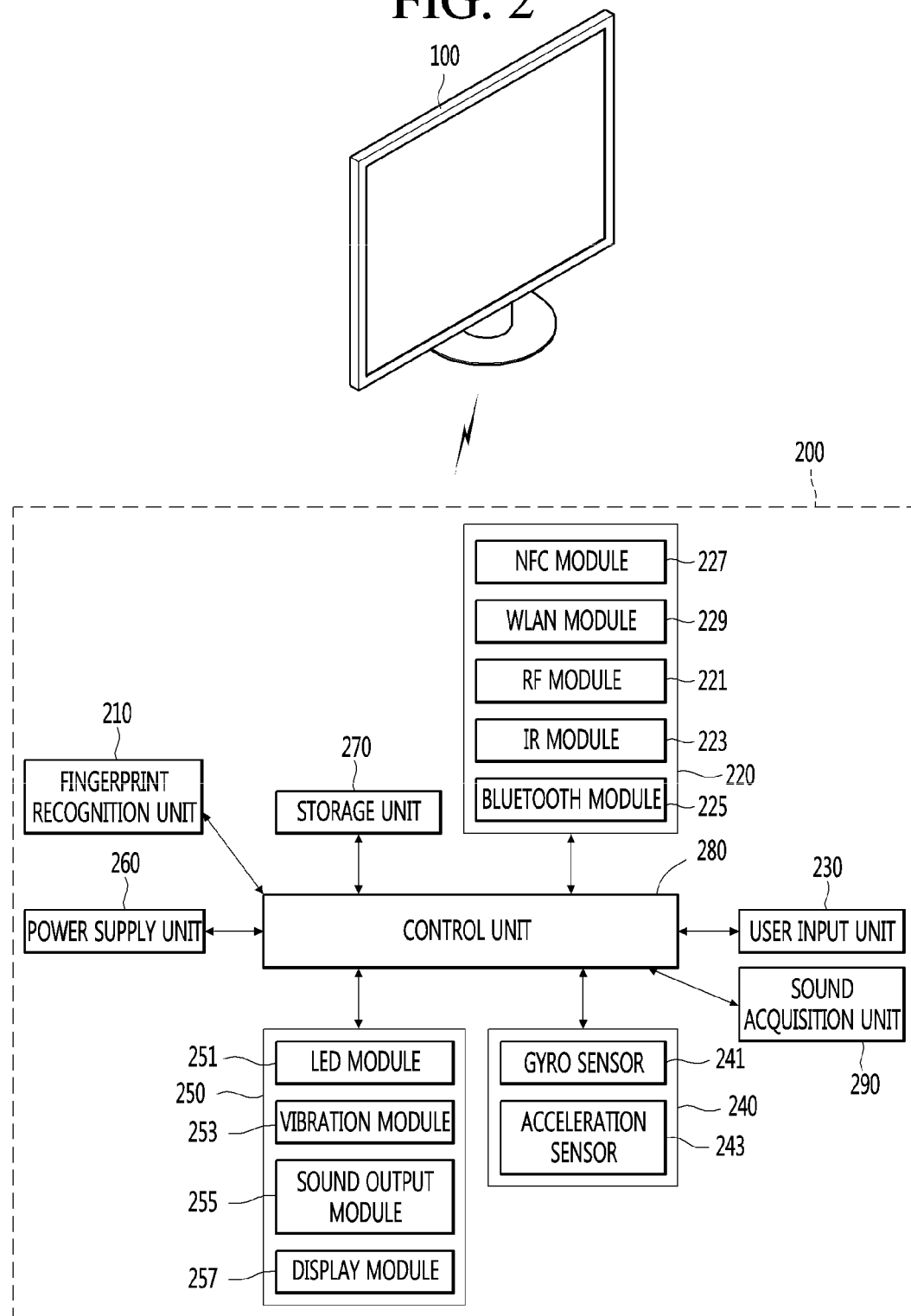
FIG. 2 is a block diagram illustrating a remote control device according to an embodiment of the present invention.
Figure 3:
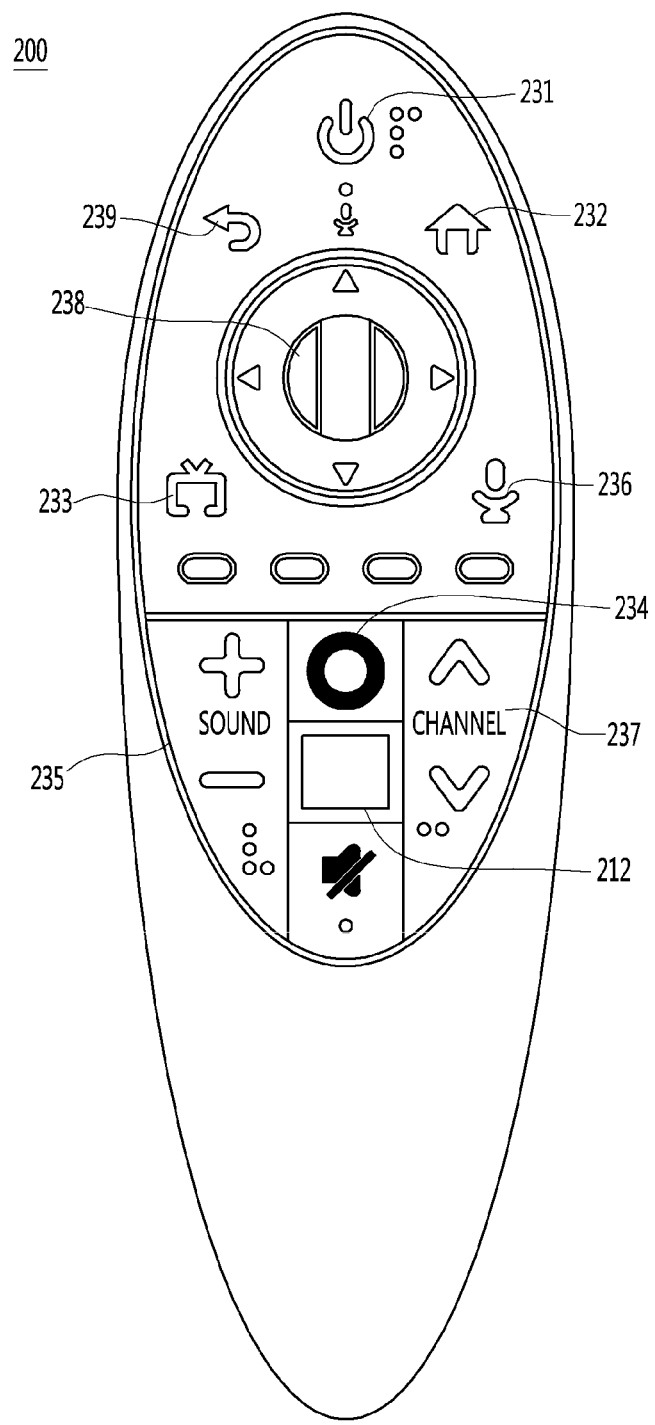
FIG. 3 is a view illustrating an actual configuration of a remote control device according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a memory 270, a controller 280, and a voice acquisition unit 290.

Referring to FIG. 2, the wireless communication unit 225 transmits/receives signals to/from any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and, if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 will be described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance from the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for emitting light, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and stops the power supply if the remote control device 200 does not operate for a predetermined time, so that power waste can be reduced. The power supply unit 260 can resume the power supply if a predetermined key provided at the remote control device 200 is manipulated.

The memory 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the memory 270, information on a frequency band for transmitting/receiving signals to/from the display device 100 paired with the remote control device 200 and refer to the information.

The controller 280 controls general matters relating to control of the remote control device 200. The controller 280 can transmit a signal corresponding to predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Then, FIG. 4 will be described.

Figure 4:
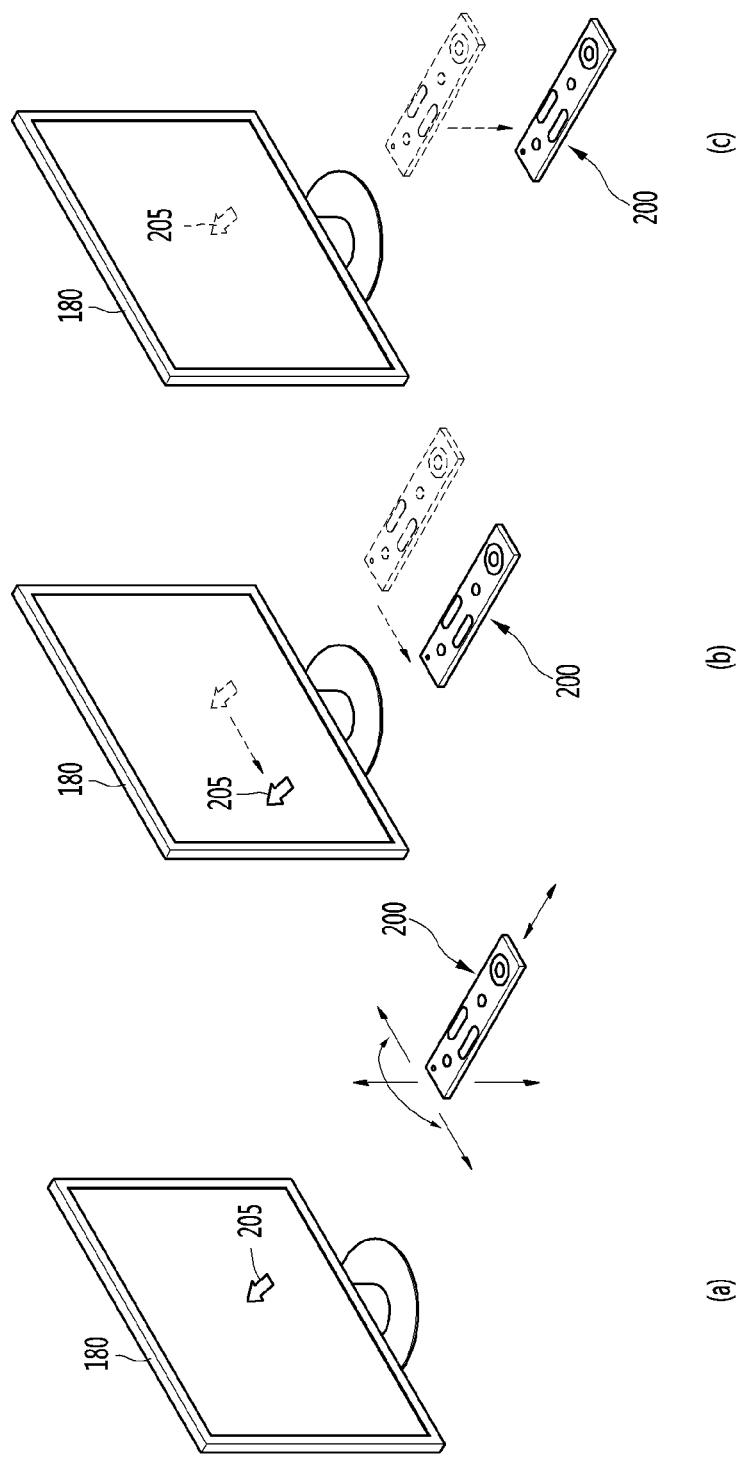
FIG. 4 is a view showing an example of utilizing a remote control device according to an embodiment of the present invention.

FIG. 4 is a view of utilizing a remote control device according to an embodiment of the present invention.

(a) of FIG. 4 illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to movement of the remote control device 200. Since the corresponding pointer 205 is moved and displayed according to movement of the remote control device in a 3D space as show in the drawing, the remote control device 200 can be referred to as a pointing device.

(b) of FIG. 4 illustrates that if a user moves the remote control device 200 to the left, the pointer 205 displayed on the display unit 180 of the display device 100 is moved to the left in correspondence thereto.

Information on movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to correspond to the calculated coordinates.

(c) of FIG. 4 illustrates that while a specific button of the remote control device 200 is pressed, a user moves the remote control device 200 away from the display unit 180. Thus, a selection area in the display unit 180 corresponding to the pointer 205 can be zoomed in and enlarged.

On the other hand, if a user moves the remote control device 200 close to the display unit 180, a selection area in the display unit 180 corresponding to the pointer 205 can be zoomed out and reduced.

On the other hand, if the remote control device 200 is away from the display unit 180, a selection area can be zoomed out and if the remote control device 200 is close to the display unit 180, a selection area can be zoomed in.

Additionally, if a specific button of the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button of the remote control device 200 is not pressed, only the pointer 205 is moved according to the up, down, left or right movement of the remote control device 200.

Moreover, the movement speed or movement direction of the pointer 205 can correspond to the movement speed or movement direction of the remote control device 200.

Furthermore, a pointer in this specification means an object displayed on the display unit 180 in correspondence to an operation of the remote control device 200. Accordingly, in addition to an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, a display system according to an embodiment of the present invention will be described with reference to FIG. 5.

(a) of FIG. 5 is a diagram illustrating the configuration of a display system according to an embodiment of the present invention and (b) of FIG. 5 is a diagram illustrating the detailed configuration of a controller included in each display device.

Referring to (a) of FIG. 5, the display system 1 may include a first display device 100_1, a second display device 100_2 and a remote control device 200. In the display system 1, the first display device 100_1 may mean a first display unit, and the second display device 100_2 may mean a second display unit. Accordingly, the first display device 100_1 may be described to refer to a first display unit and the second display device 100_2 may be described to refer to a second display unit. Hereinafter, in the description of the display system 1, the first display device 100_1 and the second display device 100_2 are used.

The first display device 100_1 and the second display device 100_2 may be connected to each other through the same network and one sides thereof may be adhered. The first display device 100_1 and the second display device 100_2 may acquire the same content. The first display device 100_1 and the second display device 100_2 may link the screens thereof and output the acquired content on a merged screen. For example, the first display device 100_1 may display a first partial image of the content on the screen thereof and the second display device 100_2 may display a second partial image excluding the first partial image on the screen thereof.

The first display device 100_1 and the second display device 100_2 may operate in a twin mode. The twin mode may mean a mode in which the first screen of the first display device 100_1 and the second screen of the second display device 100_2 are linked to be used as one merged screen. The first screen may correspond to a region occupied by the display unit 180 of the first display device 100_1 and the second screen may correspond to a region occupied by the display unit 180 of the second display device 100_2. In one embodiment, one or more of the first display device 100_1 and the second display device 100_2 may receive input through a button provided in a user input unit 230 of the remote control device 200 to operate in the twin mode. For example, when the first display device 100_1 receives a command for operating in the twin mode from the remote control device 200, the first display device 100_1 may transmit a control command for operating in the twin mode to the second display device 100_2.

As the first display device 100_1 and the second display device 100_2 are connected, one of the devices may operate as a master device and the other device may operate as a slave device. The master device may control operation of the slave device. The device having a controller having better quality between the first display device 100_1 and the second display device 100_2 may be used as a mater device.

The master device may transmit a control command to the slave device and operation of the slave device may be controlled according to the control command received from the master device, which will be described with reference to (b) of FIG. 5.

In (b) of FIG. 5, assume that the first display device 100_1 operates as a master device and the second display device 100_2 operates as a slave device. A first controller 170-1 of the first display device 100_1 may include a control command reception unit 910_1, a twin service management unit 920_1, an input manager 930_1 and a webkit 940_1. A second controller 170-2 of the second display device 100_1 may include a twin service management unit 920_1, an input manager 930_1, and a webkit 940_1.

The control command reception unit 910_1 may receive a control command from the remote control device 200 in the twin mode. The control command may be a screen link request.

The twin service management unit 920_1 may receive the control command from the control command reception unit 910_1 and deliver the control command to the twin service management unit 920_2 included in the second controller 170_2. For example, when the screen link request is delivered to the twin service management unit 920_2, the second controller 170_2 may link the screen of the first display device 100_1 to the screen thereof according to the screen link request.

The twin service management units 920_1 and 920_2 may mutually transmit and receive device information thereof when the first display device 100_1 and the second display device 100_2 are connected to each other.

The input managers 930_1 and 930_2 may receive control commands from the twin service management unit 920_1 and perform functions corresponding thereto.

The webkits 940_1 and 940_2 may open source application program frameworks which are the basis for a web browser.

Although the number of display devices 100 is 2 in FIG. 5, the present invention is not limited thereto and the embodiment of the present invention is applicable to three or more display devices.

Next, a method of operating a display system according to an embodiment of the present invention will be described with reference to FIG. 6.

FIG. 6 is a ladder diagram illustrating a method of operating a display system according to an embodiment of the present invention.

Referring to FIG. 6, the first display device 100_1 and the second display device 100_2 are connected to each other (S101). The first display device 100_1 and the second display device 100_2 may be connected by wire or wirelessly through a communication unit 195.

In one embodiment, the first display device 100_1 and the second display device 100_2 are wirelessly connected to each other through an Internet protocol (IP) router. That is, if the first display device 100_1 and the second display device 100_2 are wirelessly connected over the same network through the IP router, Wi-Fi may be used as a wireless communication protocol.

In another embodiment, when the first display device 100_1 and the second display device 100_2 are wirelessly connected to each other, the first display device 100_1 and the second display device 100_2 may be connected through Alljoyn technology. Alljoyn technology may refer to technology for performing direct communication between devices without a router (e.g., IP router). A wireless communication protocol used in Alljoyn technology may be any one of a Wi-Fi Direct protocol or a Bluetooth protocol.

As the first display device 100_1 and the second display device 100_2 are connected to each other, one of the devices may operate as a master device and the other device may operate as a slave device. The master device may control operation of the slave device. The master device may transmit a control command to the slave device and operation of the slave device may be controlled by the control command received from the master device.

In one embodiment, any one of the first display device 100_1 and the second display device 100_2 may be set as a master device and the other thereof may be set as a slave device, according to user input.

In another embodiment, the device connected to the remote control device 200 between the first display device 100_1 and the second display device 200_2 may be set as a master device and the device which is not connected to the remote control device 200 may be set as a slave device.

In the following embodiments, assume that the first display device 100_1 is set as a master device and the second display device 100_2 is set as a slave device.

The first display device 100_1 and the second display device 100_2 connected to each other share mutual device information (S103). That is, when the first display device 100_1 and the second display device 100_2 are connected, mutual device information may be transmitted and received through the communication unit 195 provided in each device.

Here, the device information may include one or more of identification of each display device 100, specification of each display device 100 and channel information.

The identification of the display device 100 may include information for identifying each device, such as an IP address and a model name, when the devices are connected through an IP.

The specification of the display device 100 may include one or more of performance information of the controller 170, size information of the display unit 180, resolution information and capacity information of a scaler.

The channel information may be information on the channel of a broadcast program. In one embodiment, the controller 170 of each display device 100 may receive channel information through the tuner 131. The channel information stored in the first display device 100_1 and the channel information stored in the second display device 100_2 may be different from each other. Each display device 100 may update the channel information based on the channel information received from the other device and perform synchronization. In another embodiment, the first display device 100_1 may receive only some of the channel information and the second display device 100_2 may receive the remaining channel information. The display devices 100 may share the received channel information and store one piece of complete channel information.

According to another embodiment of the present invention, in addition to sharing of the device information, the first display device 100_1 may periodically transmit scanned channel information to the second display device 100_2. The second display device 100_2 may update the channel information based on the channel information received from the first display device 100_1.

Thereafter, the controller 170 of the first display device 100_1 acquires first content (S105) and reproduces the acquired first content on the display unit 180 (S107), and the controller 170 of the second display device 100_2 acquires second content (S105) and reproduces the acquired second content on the display unit 180 (S107).

In one embodiment of the present invention, content may be multimedia content such as video, image or text.

For example, the first content and the second content may be broadcast programs. In this case, the first content may be received through the tuner 131 provided in the first display device 100_1 and the second content may be received through the tuner 131 provided in the second display device 100_2. If the first content and the second content are broadcast programs, the first content and the second content may be the same broadcast program or different broadcast programs.

In another embodiment, if the first content is equal to the second content, each display device 100 may acquire content through a distributer 171. The distributer 171 may be provided in the first display device 100_1 functioning as the master device or may be provided separately from the first display device 100_1, without being limited thereto. The distributer 171 may include one or more of a radio frequency (RF) distributor 171_1 and a high definition interface (HDMI) distributor 171_2.

The RF distributer 171_1 may distribute an RF signal received from an external device into the first display device 100_1 and the second display device 100_2. The HDMI distributer 171_2 may distribute a video signal and an audio signal received from a peripheral device connected to the first display device 100_1 into the first display device 100_1 and the second display device 100_2. The same video signal and the audio signal may be input to the first display device 100_1 and the second display device 100_2 through the distributor 171.

In another embodiment, if the first content and the second content are equal, each display device 100 may acquire content through the network interface 133. For example, the controller 170 of the first display device 100_1 may receive content from a content provider server for providing content through the network interface 133. The controller 170 of the first display device 100_1 may transmit the content received through the communication unit 195 in a multicast manner. The controller 170 of the first display device 100_1 may receive content transmitted in the multicast manner and the second display device 100_2 may receive content transmitted in the multicast manner.

An embodiment in which the first display device 100_1 and the second display device 100_2 acquire and reproduce the same content will be described with reference to the following drawings.

FIGS. 7 to 8 are diagrams illustrating embodiments in which the display devices acquire the same content by physical input.

FIG. 7 is a diagram illustrating an embodiment in which a first display device and a second display device acquire the same content through an RF distributor according to an embodiment of the present invention, and FIG. 8 is a diagram illustrating an embodiment in which a first display device and a second display device acquire the same content through an HDMI distributor according to another embodiment of the present invention.

First, referring to FIG. 7, the RF distributor 171 may receive the RF signal from an external device through an antenna connected to the first display device 100_1. The RF distributor 171 may distribute the received RF signal into the first display device 100_1 and the second display device 100_2. The RF signal may include a broadcast signal. The RF distributor 171 may be included in any one of the first display device 100_1 and the second display device 100_2 without being limited thereto or may be provided as separate components.

Next, FIG. 8 will be described.

Referring to FIG. 8, the HDMI distributor 173 may receive a video signal and an audio signal output from a peripheral device 300. The HDMI distributor 173 may distribute the received video and audio signals into the first display device 100_1 and the second display device 100_2. That is, the first display device 100_1 and the second display device 100_2 may receive the same video and audio signals. The external device interface 135 of each display device 100 may receive and deliver the video and audio signals received from the HDMI distributor 173 to the controller 170.

The HDMI distributor 173 may be included in any one of the first display device 100_1 and the second display device 100_2 without being limited thereto or may be provided as separate components.

Next, FIG. 9 will be described.

FIG. 9 is a diagram illustrating an embodiment in which a first display device and a second display device acquire the same content through a content provider (CP) server according to an embodiment of the present invention.

Referring to FIG. 9, the first display device 100_1 may receive content from the CP server 500 in a streaming manner. The controller 170 of the first display device 100_1 may transmit the content received from the CP server 500 to an external device through the communication unit 195 in a multicast manner. The first display device 100_1 may receive the content transmitted thereby in the multicast manner. The second display device 100_2 may also receive the content transmitted in the multicast manner.

Next, FIG. 10 will be described.

FIG. 10 is a diagram illustrating an embodiment in which a first display device and a second display device acquire the same content through a content provider (CP) server according to another embodiment of the present invention.

Referring to FIG. 10, the first display device 100_1 and the second display device 100_2 may receive the same content from the CP server 500 in a streaming manner. Specifically, when a request for reproducing first content is received, the first display device 100_1 may transmit information on an access path capable of receiving the first content to the second display device 100_2 while receiving the first content from the CP server 500 in the streaming manner. The second display device 100_2 may access the CP server 500 based on information on the received access path, and receive the first content from the CP server 500 in the streaming manner.

FIG. 6 will be described again.

The controller 170 of the first display device 100_1 receives a screen link request from the remote control device 200 (S109). The controller 170 of the first display device 100_1 may receive the screen link request from the remote control device 200 through the user input interface 150. The screen link request may be a request for linking the screen of the first display device 100_1 and the screen of the second display device 100_2 and displaying the first content displayed on the first display device 100_1 on the linked screen. The controller 170 of the first display device 100_1 may control the display unit 180 such that a part of the first content is displayed on the screen of the first display device 100_1 and the remaining part of the first content is displayed on the screen of the second display device 100_2 according to the screen link request.

Although the first display device 100_1 receives the screen link request in the embodiment of the present invention, the present invention is not limited thereto and the second display device 100_2 may receive the screen link request. When the second display device 100_2 receives the screen link request, the controller 170 of the second display device 100_2 may control the display unit 180 such that a part of the second content is displayed on the screen of the second display device 100_2 and a remaining part of the second content is displayed on the screen of the first display device 100_1.

The controller 170 of the first display device 100_1 determines whether the second display device 100_2 reproduces the same content as the first content after receiving the screen link request (S111). In one embodiment, if the content is a broadcast program, the controller 170 of the first display device 100_1 may receive channel information of the device information received from the second display device 100_2, and determine whether the first content and the second content currently displayed on the display devices 100 are equal. Specifically, the controller 170 of the first display device 100_1 may determine that the second display device 100_2 reproduces the same content as the first content, when the channel number corresponding to the first content is equal to the channel number corresponding to the second content. In contrast, the controller 170 of the first display device 100_1 may determine that the second display device 100_2 reproduces content different from the first content, when the channel number corresponding to the first content is not equal to the channel number corresponding to the second content.

If the second display device 100_2 reproduces the same content as the first content, the controller 170 of the first display device 100_2 transmits the screen link request to the second display device 100_2 (S113).

If the second display device 100_2 reproduces content different from the first content, the controller 170 of the first display device 100_2 transmits a content switching request for requesting reproduction of the first content and the screen link request to the second display device 100_2 (S115). In one embodiment, when the content is a broadcast program, the content switching request may be a channel switching request indicating channel change. Specifically, if the channel number of the second content reproduced by the second display device 100_2 is different from the channel number of the first content reproduced by the first display device 100_1, the controller 170 of the first display device 100_1 may transmit the channel change request for changing the channel number of the first content to the second display device 100_2 through the communication unit 195. According to the channel change request, the second display device 100_2 may tune to the same channel as the first display device 100_1.

The controller 170 of the first display device 100_1 and the controller 170 of the second display device 100_2 synchronize and reproduce the first content according to the received screen link request (S117).

Hereinafter, an embodiment of synchronizing and reproducing content according to a screen link request will be described.

FIG. 11 is a diagram illustrating an example of a merged screen output according to a screen link request when a first display device and a second display device reproduce the same content according to an embodiment of the present invention.

Referring to (a) of FIG. 11, the first display device 100_1 displays first content 310 on the screen thereof and the second display device 100_2 displays the first content 310 on the screen thereof. The pointer 205 moving in correspondence with movement of the remote control device 200 is located on the screen of the first display device 100_1. The controller 170 of the first display device 100_1 may receive the screen link request from the remote control device 200. In one embodiment, the screen link request may be generated by operation of pushing a button provided in the user input unit 230 of the remote control device 200 for a predetermined time.

When the first display device 100_1 receives the screen link request, the controller 170 of the first display device 100_1 may deliver the screen link request to the second display device 100_2. As shown in (b) of FIG. 11, the controller 170 of the first display device 100_1 may output a partial image 311 of the first content 310 through the display unit 180 of the first display device 100_1 according to the received screen link request, and the second display device 100_2 may output the remaining image 313 of the first content 310 through the display unit 180 of the second display device 100_2 according to the received screen link request. Therefore, the entire image of the content may be output on one merged screen obtained by merging the screens of the two display devices 100. For example, when the user presses the button provided in the user input unit 230 of the remote control device 200 for two seconds in a state in which the pointer 205 is located on the screen of the first display device 100_1, the linked screen may be provided as shown in (b) of FIG. 11. The user may view the content on a larger screen as the screens of the two display devices 100 are linked.

Meanwhile, the scaler 175 included in the controller 170 of each display device 100 may scale the image of the first content to resolution capable of being output by the display unit 180 and deliver the scaled image to the display unit 180.

According to another embodiment of the present invention, the resolution of the display unit 180 provided in the first display device 100_1 and the resolution of the display unit 180 of the second display device 100_2 may be different from each other. The resolutions of the devices may be shared in step S103 described with reference to FIG. 6. The controller 170 of the first display device 100_1 may perform control to output content based on the display unit 180 having lower resolution, upon determining that the resolution of the display unit 180 provided in the first display device 100_1 and the resolution of the display unit 180 provided in the second display device 100_2 are different from each other. For example, if the resolution supported by the display unit 180 provided in the first display device 100_1 is UDH (Ultra Definition) and the resolution supported by the display unit 180 provided in the second display device 100_2 is HD (high Definition), the controller 170 of the first display device 100_1 may control the display unit 180 of the first display device 100_1 and the display unit 180 of the second display device 100_2 to output the content with HD resolution according to the screen link request.

Next, FIGS. 12 to 13 will be described.

FIGS. 12 and 13 are diagrams illustrating an example of a merged screen output according to a screen link request when a first display device and a second display device reproduce different content according to an embodiment of the present invention.

First, FIG. 12 will be described.

Referring to (a) of FIG. 12, the first display device 100_1 displays first content 310 on the screen thereof and the second display device 100_2 displays second content 330 on the screen thereof. The pointer 205 moving in correspondence with movement of the remote control device 200 is located on the screen of the first display device 100_1. The controller 170 of the first display device 100_1 may receive a screen link request from the remote control device 200. The controller 170 of the first display device 100_1 may transmit a content switching request and a screen link request to the second display device 100_2, because contents produced on the screens are different from each other.

The second display device 100_2 may switch the reproduced content from the second content to the first content according to the received content switching request.

The controller 170 of the first display device 100_1 may control the display units 180 to display a partial image 311 of the first content on the display unit 180 of the first display device 100_1 and to display the remaining image 313 of the first content on the display unit 180 of the second display device 100_2, according to the screen link request.

The user may view one content on a large screen using a simple input operation while viewing different contents through the screens of the display devices.

Next, FIG. 13 will be described.

Referring to (a) of FIG. 13, the first display device 100_1 displays first content 310 on the screen thereof and the second display device 100_2 displays second content 330 on the screen thereof. The pointer 205 moving in correspondence with movement of the remote control device 200 is located on the screen of the second display device 100_2. The controller 170 of the first display device 100_1 may determine that the pointer 205 is located on the screen of the second display device 100_2 based on size information thereof and size information of the second display device 100_2. This will be described below.

In a state in which the pointer 205 is located on the screen of the second display device 100_2, the controller 170 of the first display device 100_1 may receive a screen link request from the remote control device 200. The controller 170 of the first display device 100_1 may recognize that the contents reproduced on the screens are different and switch the reproduced content from the first content 310 to the second content 330. That is, the content displayed according to screen link may be determined based on the screen, on which the pointer 205 is located.

As shown in (b) of FIG. 13, the controller 170 of the first display device 100_1 may control the display units 180 to display a partial image 331 of the second content on the display unit 180 of the first display device 100_1 and to display the remaining image 331 of the second content on the display unit 180 of the second display device 100_2, according to the screen link request.

The user may view one content on a large screen using a simple input operation while viewing different contents through the screens of the display devices.

Next, a process of recognizing that the pointer 205 is located on the screen of the second display device 100_2 will be described with reference to FIGS. 14 and 15.

FIG. 14 is a flowchart illustrating a process of recognizing that a pointer is located on the screen of a second display device according to an embodiment of the present invention.

Referring to FIG. 14, the controller 170 of the first display device 100_1 acquires the size information of the connected second display device 100_2 (S301). The size information of the second display device 100_2 may be acquired in step S103 of sharing the device information described with reference to FIG. 6. The size information may include the inch information of the second display device 100_2.

The controller 170 of the first display device 100_1 generates a twin virtual region based on the acquired size information of the second display device 100_2 (S303). The twin virtual region may refer to a region virtually generated to check whether the pointer 205 is located on the screen of the second display device 100_2. The twin virtual region may include a real region corresponding to the screen of the first display device 100_1 and a virtual region corresponding to the screen of the second display device 100_2. The virtual region may be generated using the size information of the second display device 100_2. The twin virtual region will be described with reference to FIG. 15.

The controller 170 of the first display device 100_1 checks whether the pointer is located in the virtual region included in the twin virtual region (S305), and calculates a coordinate value corresponding to the location of the pointer when the pointer is not located in the real region but is located in the virtual region (S307).

The controller 170 of the first display device 100_1 delivers the calculated coordinate value to the second display device 100_2 (S309). Hereinafter, steps S301 to S309 will be described in detail with reference to FIG. 15.

FIG. 15 is a diagram illustrating an embodiment of detecting the location of a pointer through a twin virtual region according to an embodiment of the present invention.

Referring to FIG. 15, the twin virtual region 600 may include a real region 610 corresponding to the screen of the first display device 100_1 and a virtual region 630 generated based on the size information of the second display device 100_2. The controller 170 of the first display device 100_1 may acquire the coordinate values of the real region 610 and the coordinate values of the virtual region 630 acquired based on the size information of the second display device 100_2. Assume that a maximum x coordinate value of the real region 610 is x1 (that is, 1920).

If the pointer 205 is not located in the real region 610 but is located in the virtual region 630, the controller 170 of the first display device 100_1 may acquire (x2, y2)=(2420, 200) which is the coordinate value of the pointer 205 located in the virtual region 600 of the twin virtual region 600. The controller 170 of the first display device 100_1 may sense that the pointer 205 is located outside the real region 610 and check the movement distance of the remote control device 200. The controller 170 of the first display device 100_1 may acquire (x2, y2)=(2420, 200) which is the virtual coordinate value of the pointer 205 using the coordinate value corresponding to the movement distance of the remote control device 200. The controller 170 of the first display device 100_1 may calculate a coordinate value 500 obtained by subtracting 1920 which is the maximum x coordinate of the real region 610 from 2420 which is the acquired virtual x coordinate value. That is, the controller 170 of the first display device 100_1 may acquire and transmit the calculated x coordinate value 500 and an existing y coordinate value 200 to the second display device 100_2. The first display device 100_1 and the second display device 100_2 may determine (500, 200) as the location of the pointer 205 on the screens thereof.

Next, a method of performing synchronization to reproduce the same content acquired by the first display device 100_1 and the second display device 100_2 on a merged screen according to a screen link request will be described with reference to FIGS. 16 and 17.

FIG. 16 is a diagram showing the configuration of a controller according to another embodiment of the present invention, and FIG. 17 is a diagram illustrating a process of performing synchronization in order to reproduce content.

In particular, FIGS. 16 and 17 show an embodiment in which the first display device 100_1 and the second display device 100_2 acquire the same content through the distributor 171.

Referring to FIG. 16, the controller 170_1 of the first display device 100_1 may include an image divider 172_1, a frame identifier inserter 174_1, a frame cutter 176_1, a scaler 175_1, and a time synchronizer 177_1. The controller 170_2 of the second display device 100_2 may include an image divider 172_2, a frame identifier inserter 174_2, a frame cutter 176_2, a scaler 175_2, and a time synchronizer 177_2.

The image divider 172_1 or 1722 may divide the image of the content received from the distributor 171 into a plurality of frames, as shown in (a) of FIG. 17.

The frame identifier inserters 174_1 or 174_2 may insert a frame identifier capable of identifying each frame to each of the plurality of divided frames. Each frame identifier inserter may insert the same identifier to the same frame. As shown in (b) of FIG. 17, the frame identifier inserter 174_1 or 174_2 may insert the same identifier to the same frame like T0, T1 and T2.

The frame cutter 176_1 or 176_2 may cut the frame in order to display only a part of each frame on the display unit 180 of each display device 100. Specifically, as shown in (c) of FIG. 17, the frame cutter 176_1 may cut off a right half region to leave a left half region of each frame and the frame cutter 176_2 may cut off a left half region to leave a right half region of each frame.

The scaler 175_1 or 175_2 may scale each cut frame according to the resolution of each display unit 180. Specifically, as shown in (c) of FIG. 17, the scaler 175_1 may scale each cut frame according to the resolution of the display unit 180_1 and the scaler 175_2 may scale each cut frame according to the resolution of the display unit 180-2.

The time synchronizer 177_1 or 177_2 may synchronize reproduction of each frame using the identifier inserted into each scaled frame. That is, the time synchronizer 177_1 or 177_2 may compare the identifiers of the scaled frames through communication and output the frame to each display unit 180 when the identifiers of the frames are equal. Therefore, the timings of the frames may be adjusted such that the image of the content is displayed on one large screen as shown in (d) of FIG. 17.

Next, an embodiment of automatically or manually setting disposition of each device for normal link of the screen of the first display device 100_1 and the screen of the second display device 100_2 will be described.

(a) of FIG. 18 shows a state in which the first display device 100_1 and the second display device 100_2 are normally disposed, and (b) of FIG. 18 shows a state in which the first display device 100_1 and the second display device 100_2 are abnormally disposed. That is, assume that normal disposition means that the first display device 100_1 is disposed at the left side and the second display device 100_2 is located at the right side.

If the first display device 100_1 and the second display device 100_2 are abnormally disposed, screen link may be abnormally performed such that the content may not be smoothly displayed on one large screen as shown in (b) of FIG. 18.

FIG. 19 is a diagram illustrating an example of manually setting disposition of a first display device and a second display device according to an embodiment of the present invention.

Referring to FIG. 19, the first display device 100_1 and the second display device 100_2 may display a plurality of disposition setting items. The plurality of disposition setting items may include a left disposition setting item 710 and a right disposition setting item 720. When the left disposition setting item 710 displayed on the screen of the first display device 100_1 is selected through button input of the remote control device 200, the first display device 100_1 may be set to be disposed at the left side. When the right disposition setting item 730 displayed on the screen of the second display device 100_2 is selected through button input of the remote control device 200, the second display device 100_2 may be set to be disposed at the right side.

In one embodiment, the disposition setting items may be displayed when the display devices 100 enter a twin mode.

FIG. 20 is a diagram illustrating a method of checking the disposition state of display devices through a microphone provided in a remote control device and a speaker provided in each display device according to another embodiment of the present invention.

Referring to FIG. 20, the first display device 100_1 may include a first left speaker 185_1 and a first right speaker 185_2, and the second display device 100_2 may include a second left speaker 185_3 and a second right speaker 185_4. Assume that the remote control device 200 may be located at the front side of the first display device 100_1 and the second display device 100_2, and the first display device 100_1 and the second display device 100_2 may be provided close to each other.

The controller 170 of each display device 100 may sequentially output a test sound signal through a speaker provided therein. For example, the test sound signal may be output in order of the first left speaker 185_1, the first right speaker 185_2, the second left speaker 185_3 and the second right speaker 185_4. The intensities of the test sound signals may be the same.

The microphone 291 of the remote control device 200 may receive the test sound signal output from each speaker. The controller 280 of the remote control device 200) may calculate gain of each test sound signal based on the received test sound signal. For example, due to a difference in distance between the speakers and the remote control device 200, any one of the gain G1 of the test sound signal output from the first left speaker 185_1 and gain G4 of the test sound signal output from the second right speaker 185_4 may be maximum gain and the other gain may be minimum gain. In addition, since the first display device 100_1 and the second display device 100_2 are provided close to each other, gain G2 of the test sound signal output from the first right speaker 185_2 and gain G3 of the test sound signal output from the second left speaker 185_3 may be similar. The first display device 100_1 may receive the gain of each test sound signal from the remote control device 200 and check the location thereof and the location of the second display device 1002 based on the received gain. For example, if the remote control device 200 is closest to the first left speaker 185_1, the level of the test sound signal output from the first left speaker 185_1 is largest and the level of the test sound signal output from the second right speaker 185_4 may be smallest. The first display device 100_1 and the second display device 100_2 recognize the locations of the speakers provided therein. Accordingly, since the first display device 100_1 may recognize that the second display device 100_2 is located at the left side because the level of the test sound signal output from the first left speaker 185_1 is largest and recognize that the second display device 100_2 is located at the right side because the level of the test sound signal output from the second right speaker 185_4 is smallest. In this case, the first display device 100_1 may determine that each display device is normally disposed. If each display device 100 is abnormally disposed, as shown in FIG. 22, the first display device 100_1 may display a screen disposition guide window 731.

Next, FIG. 21 will be described.

FIG. 21 is a diagram illustrating a method of checking the disposition state of display devices through a camera provided in each display device according to another embodiment of the present invention.

Referring to FIG. 21, the first display device 100_1 may include a first camera 191_1 located at an upper side thereof and the second display device 100_2 may include a second camera 191_2 located at an upper side thereof. The first camera 191_1 and the second camera 191_2 may capture an image of a thing A located at a front side thereof. The first display device 100_1 may analyze the image captured by each camera to check disposition of each display device 100. That is, since a first image of the thing A captured by the first camera 191_1 and a second image of the thing A captured by the second camera 191_2 are captured at different angles, the first display device 100_1 may analyze the first image and the second image to check the disposition state of each display device 100.

Meanwhile, the display device 100 may further include a proximity sensor 160 at the lateral side of the display device 100. The proximity sensor 160 may be provided at one side of the display device 100 corresponding to another display device 100. For example, the proximity sensor 160 may be provided at the left and right sides of the display device 100. When another display device 100 is provided close to the display device, the proximity sensor 160 may sense that another display device 100 is provided close to the display device 100. In one embodiment, the controller 180 of the first display device 100_1 may operate in the twin mode for forming the merged screen with the second display device 100_2, as described above, upon sensing that the second display device 100_2 is provided close to the first display device through the proximity sensor 160 provided in the first display device 100_1.

FIG. 22 is a diagram illustrating a disposition guide window output when a first display device and a second display device are abnormally disposed according to an embodiment of the present invention.

In FIGS. 20 and 21, when the first display device 100_1 and the second display device 100_2 are abnormally disposed, the display devices 100 may display disposition guide windows 731 and 733. The user may change disposition of the display devices through the disposition guide windows.

Next, an embodiment of linking screens if the sizes (inches) of the first display device 100_1 and the second display device 100_2 are different from each other will be described.

FIG. 23 is a diagram illustrating a process of linking screens when the size of a first display device and the size of a second display device are different according to an embodiment of the present invention.

In FIG. 23, assume that the size of the display unit 180 provided in the first display device 100_1 is less than that of the display unit 180 provided in second display device 100_2.

Referring to (a) of FIG. 23, when the same content is input to the display devices 100, the first display device 100 may display a partial image 311 of the content and the second display device 100_2 may display the remaining image 313 of the content according to the screen link request. However, since the size of the second display device 100_2 is greater than that of the first display device 100_1, the user may be uncomfortable when viewing the content.

The controller 170 of the first display device 100_1 may control the second display device 100_2 to automatically adjust the size of the remaining image 313 of the content based on the size thereof, since the size information of the second display device 100_2 stored in step S103 of sharing the device information can be checked. Specifically, the controller 170 of the first display device 100_1 may transmit a control command for adjusting the size of the remaining image 313 of the content based on the size of the display unit 170 thereof to the second display device 100_2. The second display device 100_2 may scale the remaining image 313 of the content to correspond to the size of the display unit 100_1 of the first display device 100_1 through the scaler according to the received control command. The second display device 1002 may output the scaled remaining image 313 as shown in (b) of FIG. 23.

According to another embodiment of the present invention, in order to adjust a deviation of the image generated due to a difference between the sizes of the display devices 100, as shown in (b) of FIG. 23, a deviation correction guideline 810 generated based on the size of the first display device 100_1 may be displayed on the second display device 100)_2. The user may adjust the remaining image 313 of the content to be displayed according to the deviation correction guideline 810 through the pointer 205.

Next, an embodiment of automatically outputting optimized sound according to the sound channel of each display device 100 will be described.

FIGS. 24 to 27 are diagrams illustrating various embodiments of automatically adjusting and outputting sound according to the sound channel of each display device.

Figure 24:
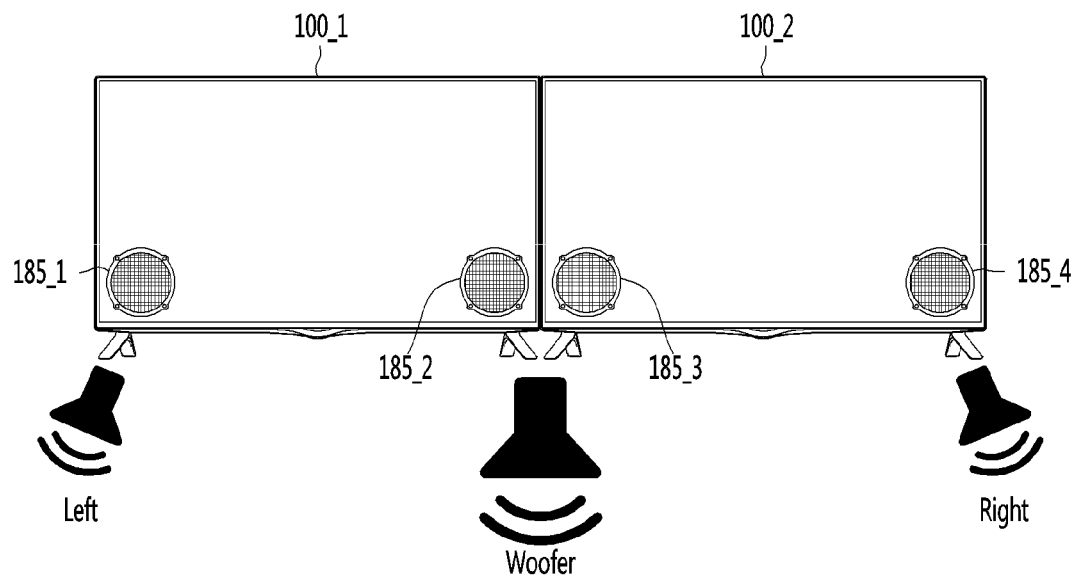
Figure 25:
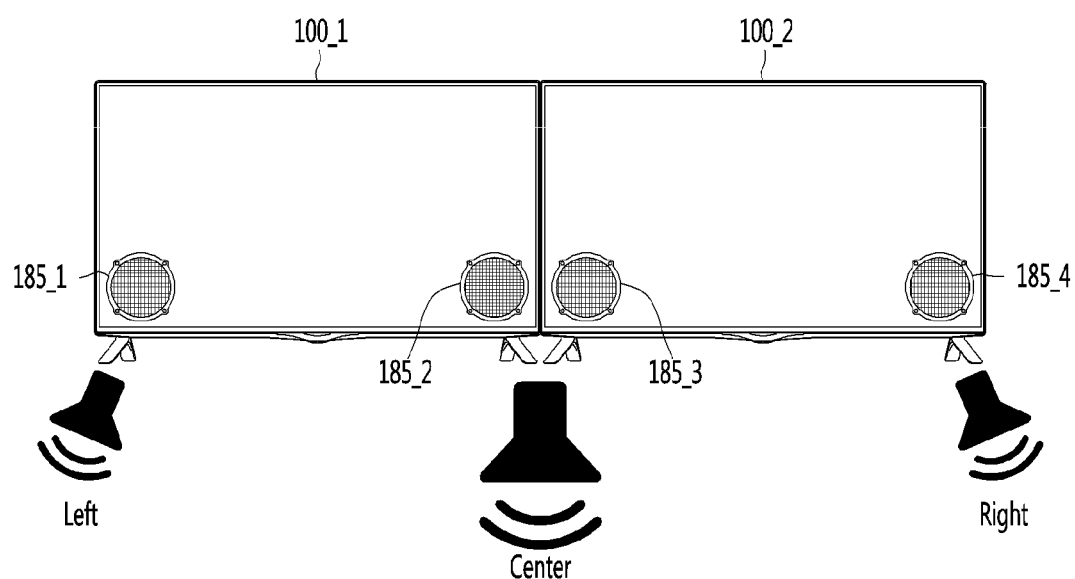

In FIGS. 24 and 25, assume that the sound channels of the display devices 100 are a 2.1 channel and the screens of the display devices are linked to output content. If the sound channel is a 2.1 channel, each display device 100 may include two speakers and one woofer.

Referring to FIG. 23, the first left speaker 185_1 may output original left audio and the second right speaker 185_4 may output original right audio. The first right speaker 185_2 and the second left speaker 185_3 may output low-frequency sound as if the woofer outputs audio, thereby outputting 2.1-channel sound.

Referring to FIG. 25, the first left speaker 185_1 may output original left audio and the second right speaker 185_4 may output original right audio. The first right speaker 185_2 and the second left speaker 185_3 may mix and output the original left audio and the original right audio. Audio obtained by mixing left audio and right audio may be referred to as center audio. Therefore, the first right speaker 185_2 and the second left speaker 185_3 may output center audio which is mixed audio. Therefore, it is possible to output virtual 3.0-channel sound.

Figure 26:
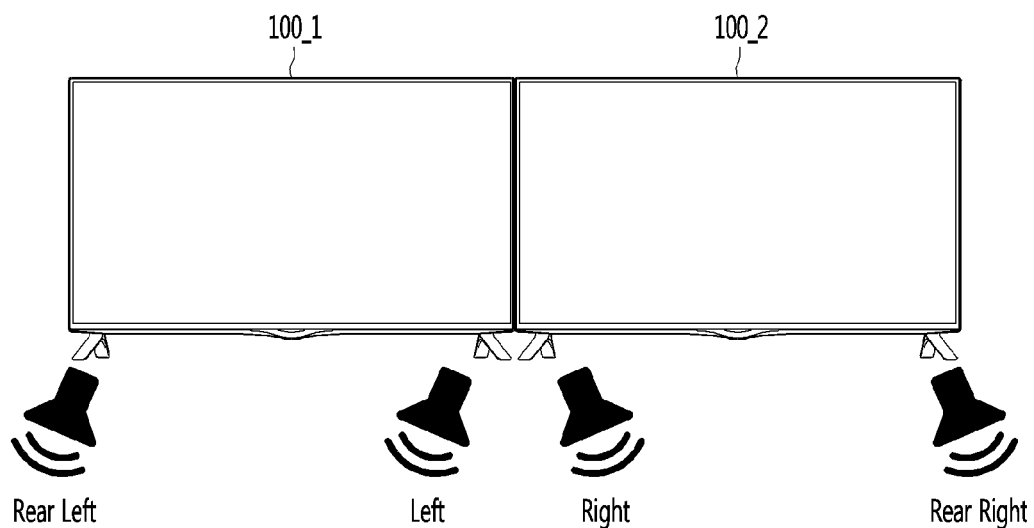
Figure 27:
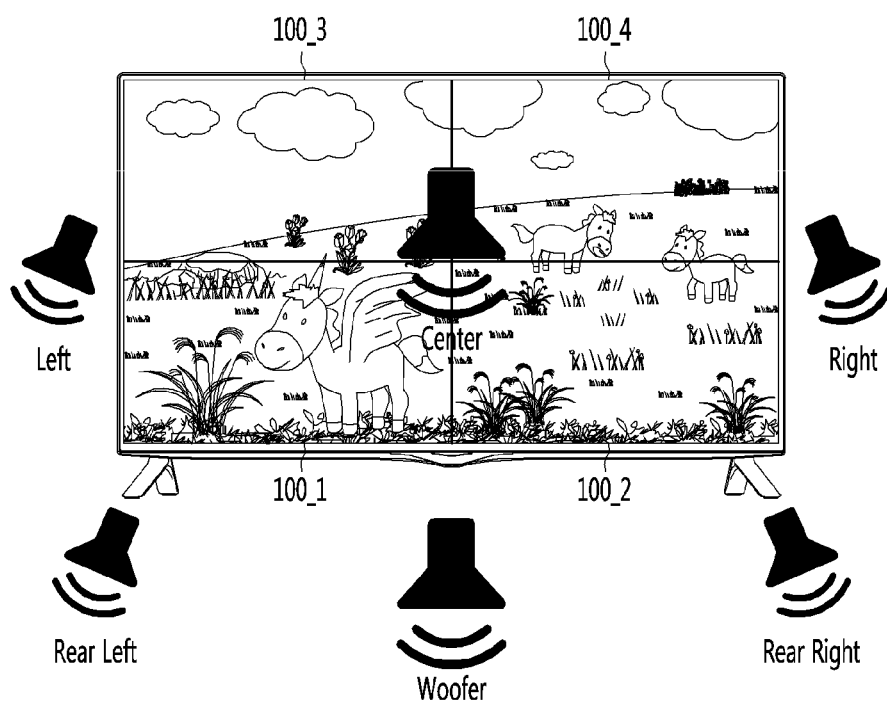

In FIGS. 26 to 27, assume that the sound channels of the display devices 100 are a 5.1 channel and the screens of the display devices are linked to output content. If the sound channel is a 5.1 channel, the display device 100 includes two speakers located at a front side of the display device 100, two speakers located at the rear side of the display device, one speaker located at the center of the display device, and a sub-woofer for enforcing low-frequency sound. Audio output from the speakers located at the front side of each display device 100 may be ignored. Audio output from the speaker provided at the rear left side of the first display device 100 may be left audio output in correspondence with the linked screen and audio output from the speaker provided at the rear right side of the second display device 100_2 may be right audio corresponding to the linked screen. In addition, audio output from the speaker provided at the rear right side of the first display device 100_1 is left audio output in correspondence with the linked screen and audio output from the speaker provided at the rear left side of the second display device 100_2 may be right audio output in correspondence with the linked screen. Therefore, it is possible to output virtual 4.0-channel sound.

Next, FIG. 27 will be described.

FIG. 27 shows an embodiment of outputting virtual 5.1-channel sound when four display devices 100_1 to 100_4 are connected to each other to link the screens thereof. That is, the third display device 100_3 and the fourth display device 100_4 may output virtual 3.0-channel sound as described in the embodiment of FIG. 25 and the first display device 100_1 and the second display device 100_2 may output virtual 2.1-channel sound. Therefore, the four display devices are connected to output 5.1-channel sound.

Next, an embodiment of providing a disposition guideline for guiding alignment of first and second display devices when the first display device and the second display device are physically disposed not to be fitted to each other will be described with reference to FIGS. 28 and 29.

FIG. 28 shows the case where the display panels of the display devices 100 are planar and FIG. 29 shows the case where the display panels are curved.

Referring to FIG. 28(*a*), the angles of the adhered surfaces of the first display device 100_1 and the second display device 100_2 are different from each other. The first display device 100_1 and the second display device 100_2 may output a first disposition guideline 801 and a second disposition guideline 803 on the screens thereof upon entering the twin mode. The first and second disposition guidelines 801 and 803 may enable the user to facilitate physical adhesion of the display devices 100. As shown in FIG. 28(*b*), the user may align the display devices 100 such that the first and second disposition guidelines 801 and 803 are located in a straight line. The embodiment of FIG. 28 is similarly applicable to the curved panel shown in FIG. 29. The user may manually, easily and accurately align the display devices 100 through the disposition guideline.

In another embodiment, an embodiment of providing a diagonal guideline for aligning physical disposition of a first display device and a second display device will be described.

FIG. 30 is a diagram showing a screen, on which a diagonal guideline is displayed, according to an embodiment of the present invention.

FIG. 31 is a diagram showing a screen, on which a diagonal guideline is aligned, according to an embodiment of the present invention.

Referring to FIG. 30, the first display device 100_1 and the second display device 100_2 may output a first diagonal guideline 811 and a second diagonal guideline 813 on the screens thereof. The first diagonal guideline 811 and the second diagonal guideline 813 may enable the user to facilitate physical adhesion of the display devices 100 and physical adhesion of the display devices 100 in the front-and-rear direction. Therefore, the user may align the display devices 100 such that the first and second diagonal guidelines 811 and 813 are located in a straight line as shown in FIG. 31. Therefore, the first display device 100_1 and the second display device 100_2 aligned such that the first and second diagonal guidelines 811 and 813 are located in a straight line may be physically adhered in the front-and-rear direction. Meanwhile, the above-described diagonal guideline is applicable to the display device 100 having the curved panel. In the case of the display device 100 having the curved panel, the diagonal guideline corresponding to the curvature of the curved panel may be output on the screen.

Next, correction of an output image when the image of one content is displayed on the merged screen of the display devices 100 will be described.

First, when the display devices 100 display a partial image and the remaining image of one content on the merged screen, screen distortion which may be generated due to bezels corresponding to the adhered surfaces of the display devices 100 will be described.

FIG. 32 is a diagram showing a merged screen according to an embodiment of the present invention.

Referring to FIG. 32, the first display device 100_1 and the second display device 100_2 may display second content 330 as one content. For example, the partial image 331 of the second content 330 may be displayed on the display unit 180 of the first display device 100_1 and the remaining image 331 of the second content 330 may be displayed on the display unit 180 of the second display device 100_2. In this case, due to the right bezel of the first display device 100_1 and the left bezel of the second display device 100_2 corresponding to the adhered surfaces of the first display device 100_1 and the second display device 100_2, the partial image 331 of the second content and the remaining image 333 of the second content may not be smoothly displayed. Such a screen distortion phenomenon may interrupt viewing of the user as the thickness of the bezel of the display device 100 increases.

FIG. 33 is a flowchart illustrating image correction operation of a merged screen according to an embodiment of the present invention.

Referring to FIG. 33, when the first display device 100_1 and the second display device 100_2 display one content on the merged screen (S401), the first display device 100_1 and the second display device 100_2 delete partial screen regions corresponding to the bezel regions in the partial image and remaining image of one content (S403). In addition, the first display device 100_1 and the second display device 100_2 display the partial image and the remaining image, from which the partial screen regions are deleted, respectively (S405).

This will be described with reference to FIGS. 34 and 35.

FIG. 34 is a diagram showing a partial screen region corresponding to a bezel region according to an embodiment of the present invention.

FIG. 35 is a diagram showing a merged screen, from which a partial region is deleted, according to an embodiment of the present invention.

Referring to FIG. 34, the first display device 100_1 and the second display device 100_2 may display the second content 330 as one content. The display unit 180 of the first display device 100_1 may display the partial image 331 of the second content, and the display unit 180 of the second display device 100_2 may display the remaining image 333 of the second content. In addition, the controller 170 of the first display device 100_1 may delete a first partial region 415 which is a partial region corresponding to the bezel region in the partial image 331 of the second content. In addition, the controller 170 of the second display device 100_2 may delete a second partial region 417 which is a partial region corresponding to the bezel region in the remaining image 333 of the second content. Here, the deleted first partial region 415 may have a size corresponding to the right bezel of the first display device 100_1, and the deleted second partial region 417 may have a size corresponding to the left bezel of the second display device 100_2. In addition, as shown in FIG. 35, the controller 170 of the first display device 100_1 may display the partial image 331 of the second content 330, from which the first partial region 415 is deleted, on the display unit 180 of the first display device 100_1. In addition, the controller 170 of the second display device 100_2 may display the remaining image 333 of the second content 330, from which the second partial region 417 is deleted, on the display unit 180 of the second display device 100_2. The display devices 100 may delete the partial images of the output images and display the partial images on the display units 180, thereby correcting screen distortion which may be generated due to the bezel corresponding to the adhered surfaces of the display units 100. Meanwhile, the controllers 170 of the display devices 100 may delete the partial regions of the images output in correspondence with the thicknesses of the bezels of the display devices.

Subsequently, operation according to user input for a pointer when a plurality of display devices 100 operates in a twin mode will be described.

FIG. 36 is a flowchart illustrating a method of operating a display device according to user input for a pointer of a display device according to an embodiment of the present invention.

Referring to FIG. 36, the plurality of display devices 100 operates in a twin mode (S510).

For example, the first display device 100_1 and the second display device 100_2 may operate in the twin mode. The twin mode may refer to a mode in which the first screen of the first display device 100_1 and the second screen of the second display device 100_2 are linked to be used as one merged screen or a mode in which different images are displayed on the first screen of the first display device 100)_1 and the second screen of the second display device 100_2. This was described above and thus a description thereof will be omitted.

One or more of the plurality of display devices 100 may acquire pointer display input for displaying the pointer 205 (S520).

One of the plurality of display devices 100 operating in the twin mode may acquire pointer display input for displaying the pointer 205 on the screen of one of the plurality of display devices 100 operating in the twin mode. Here, the display device 100 for acquiring pointer display input for displaying the pointer 205 may be a display device 100 operating as a master device or a display device 100 operating as a slave device among the plurality of display devices 100 operating in the twin mode.

In one embodiment, one or more of the plurality of display devices 100 operating in the twin mode may receive a signal for movement of the remote control device 200 from the remote control device 200 and acquire the received signal for movement of the remote control device 200 as pointer display input for displaying the pointer 205.

In another embodiment, one or more of the plurality of display devices 100 operating in the twin mode may receive a manipulation signal for manipulation of the user input unit 230 of the remote control device 200 from the remote control device 200 and acquire the received manipulation signal of the remote control device 200 as pointer display input for displaying the pointer 205.

In another embodiment, one or more of the plurality of display devices 100 operating in the twin mode may recognize movement of a specific body part of the user through the camera and acquire movement of the recognized specific body part of the user as pointer display input for displaying the pointer 205. For example, the specific body part of the user may be a user's hand.

In another embodiment, one or more of the plurality of display devices 100 operating in the twin mode may receive a signal for specific voice of the user acquired from the remote control device 200 and acquire a signal for the received specific voice of the user as pointer display input for displaying the pointer 205. Here, the specific body part of the user may be a user's hand.

Meanwhile, one of the plurality of display devices 100 operating in the twin mode may acquire pointer display input for displaying the pointer 205 and transmit a signal for the acquired pointer display input to another display device 100. For example, the display device 100 for acquiring pointer display input among the plurality of display devices 100 may transmit the signal for the pointer display input to another display device 100 through the twin service management unit 920. This was described above and a description thereof will be omitted.

One of the plurality of display devices 100 displays the pointer 205 on the screen of the display unit 180 (S530), and acquires user input for the displayed pointer 205 (S540).

One of the plurality of display devices 100 operating in the twin mode may display the pointer 205 on the screen of the display unit 180.

In one embodiment, if the plurality of display devices operating in the twin mode includes the first display device 100_1 and the second display device 100_2, the pointer 205 may be displayed on the screen of the display unit 180 of the first display device 100_1.

In another embodiment, if the plurality of display devices 100 operating in the twin mode includes the first display device 100_1 and the second display device 100_2, the pointer 205 may be displayed on the screen of the display unit 180 of the second display device 100_2.

One display device 100 for displaying the pointer 205 among the plurality of display devices 100 operating in the twin mode may be a predetermined display device and the location of the pointer 205 displayed on the screen of the display unit 180 of one display device 100 may be a predetermined location of the screen of the display unit 180.

The plurality of display devices 100 operating in the twin mode may acquire user input for the pointer 205 displayed on one of the plurality of display devices 100.

Here, user input for the pointer 205 may include one or more of input for moving the pointer 205, input for selecting a point corresponding to the pointer 205, input for dragging the pointer 205, and input for dragging and dropping the pointer 205. Input for selecting the point corresponding to the pointer 205 may include one or more of click input, double-click input and long-press input for the point corresponding to the pointer 205.

Meanwhile, when one of the plurality of display devices 100 operating in the twin mode acquires user input for the displayed pointer 205, a signal for the acquired user input may be transmitted to another display device 100. For example, a display device, which has acquired user input for the displayed pointer 205, among the plurality of display devices 100 may transmit a signal for the acquired user input to another display device 100 through the twin service management unit 920. This was described above and a description thereof will be omitted.

One or more of the plurality of display devices 100 operating in the twin mode may display guide information indicating that a merged screen according to twin mode operation may be displayed on the screen of one or more of the plurality of display devices 100, upon displaying the pointer 205.

An embodiment thereof will be described with reference to FIG. 37*a*.

FIG. 37*a* is a diagram showing a screen for displaying guide information of display of a merged screen according to an embodiment of the present invention.

Referring to FIG. 37*a*, the controller 170 of the first display device 100_1 may display the first content 310 on the display unit 180_1 and the controller 170 of the second display device 100_2 may display the second content 330 on the display unit 180_2. The controller 170 of the first display device 100_1 may acquire pointer display input for displaying the pointer 205 and display the pointer 205 on the screen for displaying the first content 310. The controller 170 of the first display device 100_1 may display a guide window 741 indicating that a merged screen according to twin mode operation can be on the first display unit 180_1. For example, the controller 170 of the first display device 100_1 may display guide information indicating switching to a large screen as a merged screen and an arrow for a drag direction in the guide window 741, when a partial region of the screen for displaying the first content 310 is dragged to the screen for displaying the second content 330 using the pointer 205. In addition, the controller 170 of the second display device 100_2 may display the guide window 741 indicating that the above-described merged screen may be displayed on the second display unit 180_2, when the pointer 205 is displayed on the second display unit 180_2.

Another embodiment will be described with reference to FIG. 37*b*.

FIG. 37*b* is a diagram showing an example of displaying a merged screen icon according to an embodiment of the present invention.

Referring to FIG. 37*b*, the controller 170 of the first display device 100_1 may display the first content 310 on the display unit 180_1 and the controller 170 of the second display device 100_2 may display the second content 330 on the display unit 180_2. The controller 170 of the first display device 100_1 may acquire pointer display input for displaying the pointer 205 and display the pointer 205 on the screen for displaying the first content 310. The controller 170 of the first display device 10)_1 may display a merged screen icon 742 for displaying a merged screen according to twin mode operation on the first display unit 180_1. One or more of the first display device 100_1 and the second display device 100_2 may acquire user input for clicking the merged screen icon 742 using the pointer 205 and display the first content on the large screen as the merged screen. In addition, the controller 170 of the first display device 100_1 may display an enlarged image icon 744 on the first display unit 180_1. In addition, one or more of the first display device 100_1 and the second display device 100_2 may acquire user input for clicking the enlarged image icon 744 using the pointer 205 and display the enlarged image of the selected region of the first content 310 on the second display device 100_2. This will be described below. Meanwhile, the controller 170 of the second display device 100_2 may display the merged screen icon 742 and the enlarged image icon 744 when the pointer 205 is located on the second display unit 180_2, and perform operation corresponding to user input for the displayed merged screen icon 742 or enlarged image icon 744.

FIG. 37*c* is a diagram showing an example of displaying a merged screen icon according to another embodiment of the present invention.

Referring to FIG. 37*c*, the controller 170 of the first display device 100_1 may display the first content 310 on the display unit 180_1 and the controller 170 of the second display device 100_2 may display the second content 330 on the display unit 180_2. The controller 170 of the first display device 100_1 may acquire pointer display input for displaying the pointer 205 and display the pointer 205 on the screen for displaying the first content 310. The controller 170 of the first display device 100_1 may display a merged screen icon 748 for displaying a merged screen according to twin mode operation on the first display unit 180_1. One or more of the first display device 100_1 and the second display device 100_2 may acquire user input for clicking the merged screen icon 748 using the pointer 205 and display the first content 310 on the large screen as the merged screen. In addition, the controller 170 of the first display device 100_1 may display a content list icon 748 on the first display unit 180_1. In addition, one or more of the first display device 100_1 and the second display device 100_2 may acquire user input for the content list icon 748 using the pointer 205 and display a content list of one or more contents on the second display device 100_2. Here, content list display includes display of information on an EPG for a broadcast channel. Meanwhile, the controller 170 of the second display device 100_2 may display the above-described merged screen icon 748 and the content list icon 749 when the pointer 205 is located on the second display unit 180_2, and perform operation corresponding to user input for the displayed merged screen icon 748 or content list icon 749.

Meanwhile, the plurality of display devices 100 according to the present invention may display guide information indicating that the plurality of display devices 100 may provide divisional screens for displaying different images on the screen of one or more of the plurality of display devices 100, upon display of the merged screen.

FIG. 37*d* is a diagram showing divisional screen icon display according to an embodiment of the present invention.

Referring to FIG. 37*d*, the controller 170 of the first display device 100_1 may display a partial image 312 of the first content 310 on the entire screen of the first display unit 180_1, and the controller 170 of the second display device 100_2 may display the remaining image 314 of the first content 310 on the entire screen of the second display unit 180_2. The controller 170 of the first display device 100_1 may acquire pointer display input for displaying the pointer 205 and display the pointer 205 on the screen for displaying the first content 310. In addition, the controller 170 of the first display device 100_1 may display a divisional screen icon 743 for enabling the plurality of display devices 100 to output different images on the second display unit 180_2. In addition, one or more of the first display device 100_1 and the second display device 100_2 may acquire user input for clicking the divisional screen icon 743 using the pointer 205 and display different images on the first display device 100_1 and the second display device 100_2. Here, one of the first display device 100_1 and the second display device 100_2 may display the first content 310. In addition, the second display device 100_2 may display the enlarged image icon 744 and may display the enlarged image of the selected region of the first content 310 on second display device 100_2 upon acquiring user input for clicking the enlarged image icon 744 using the pointer 205. This will be described below. In addition, the first display device 100_1 may display a recording icon 746 for recording reproduced content and record the first content 310 upon acquiring user input for clicking the recording icon 746 using the pointer 205. In addition, the first display device 100_1 may display a reproduction timing icon 747 for displaying images at different reproduction timings of the same content. In addition, the first display device 100_1 may acquire user input for clicking the reproduction timing icon 747 using the pointer 205 and display images at different reproduction timings of the first content 310 on the first display device 100_1 and the second display device 100_2. This will be described below.

A guide window for the above-described guide information may be displayed on the screen of the second content 330 displayed by the second display device 100_2, according to selection of the user or the designer, in addition to the first display device 100_1.

FIG. 36 will be referred to again.

One or more of the plurality of display devices 100 performs operation corresponding to the acquired user input for the pointer 205 (S550).

One or more of the plurality of display devices 100 may perform various operations related to the display device 100 through operation corresponding to the acquired user input for the pointer 205.

For example, one or more of the plurality of display devices 100 may perform one or more of merged screen display of one content or one application, screen size adjustment of a plurality of screens or a merged screen output in the twin mode, screen movement of a plurality of screens or a merged screen output in the twin mode and volume control operation of the audio output unit 185, as operation corresponding to the acquired user input for the pointer 205. Here, volume control of the audio output unit 185 may mean control of gain of a sound signal.

This will be described in detail through a detailed embodiment.

In a first embodiment, as operation corresponding to the acquired user input for the pointer 205, screen size adjustment will be described with reference to FIGS. 38 to 41.

FIG. 38 is a diagram showing screen size adjustment operation according to an embodiment of the present invention.

Referring to FIG. 38, the controller 170 of the first display device 100_1 may display the first content 310 on the display unit 180_1 and display the pointer 205 on the screen for the displayed first content 310. In addition, the controller 170 of the second display device 100_2 may display the second content 330 on the display unit 180_2. One or more of the first controller 170_1 and the second controller 170_2 may acquire user input for dragging and dropping the displayed pointer 205 on the screen for the second content 330 in the partial region of the screen for the first content 310. Therefore, the controller 170 of the first display device 100_1 may display the partial image 315 of the first content 310 on the screen of the first display unit 180_1 in correspondence with the dragging distance of the user input for dragging and dropping. Here, the partial image 315 of the first content 310 displayed on the first display unit 180_1 may be the partial image displayed on a screen having a larger size than before receiving user input for dragging and dropping. In addition, the controller 170 of the second display device 100_2 may display the remaining image 316 of the first content 310 and the second content 330 on the screen of the second display unit 180_2 in correspondence with the dragging distance of the user input for dragging and dropping. Here, the image of the second content 330 displayed on the second display unit 180_2 may be the image displayed on a screen having a smaller size than before receiving user input for dragging and dropping. The image of the second content 330 displayed on the screen having the smaller size may have an aspect ratio equal to or different from that of the previous image.

Meanwhile, operation of adjusting the screen size as operation corresponding to user input for the pointer 205 is applicable to a screen for an application as well as a screen for content. This will be described with reference to FIG. 39.

FIG. 39 is a diagram showing screen size adjustment operation according to an embodiment of the present invention.

Referring to FIG. 39, the controller 170 of the first display device 100_1 may display the first content 310 on the first display unit 180_1 and display the pointer 205 on the screen for the displayed first content 310. In addition, the controller 170 of the second display device 100_2 may display a web browser screen 350 for a web browser application on the second display unit 180_2. Here, the web browser screen 350 may be a web browser screen for a PC version or an entire screen version.

One or more of the first controller 170_1 and the second controller 170_2 may acquire user input for dragging and dropping the displayed pointer 205 on the web browser screen 350 in the partial region of the screen for the first content 310. Therefore, the controller 170 of the first display device 100_1 may display the partial image 315 of the first content 310 on the screen of the first display unit 180_1 in correspondence with the distance of user input for dragging and dropping. Here, the partial image 315 of the first content 310 displayed on the first display unit 180_1 may be the partial image displayed on a screen having a larger size than before receiving user input for dragging and dropping. In addition, the controller 170 of the second display device 100_2 may display the remaining image 316 of the first content 310 and the switched web browser screen 355 on the screen of the display unit 180_1 in correspondence with the distance corresponding to user input for dragging and dropping. Here, the switched web browser screen 355 may be a web browser screen for a mobile version or a reduced screen version.

Meanwhile, one or more of the plurality of display devices 100 operating in the twin mode may display a reference line indicating an aspect ratio to be adjusted on the display unit 180 in correspondence with user input for adjusting a screen size.

This will be described with reference to FIG. 40*a*.

FIG. 40*a* is a diagram showing a reference line indicating an aspect ratio to be adjusted according to an embodiment of the present invention.

Referring to FIG. 40*a*, the controller 170 of one or more of the plurality of display devices 100 operating in the twin mode may display one or more reference lines 791 and 793 indicating the aspect ratio to be adjusted on the display unit 180 in correspondence with user input for adjusting the screen size. Here, user input for adjusting the screen size may be user input for dragging and dropping the pointer 205. Therefore, the controller 170 of one or more of the plurality of display devices 100 operating in the twin mode may acquire user input for dragging the pointer 205 and display one or more reference line indicating the aspect ratio to be adjusted on the display unit 180 of the plurality of display devices 100. Specifically, the controller 170 of one or more of the first display device 100_1 and the second display device 100_2 may acquire user input for dragging the pointer 205 displayed on the first display unit 180_1 and display the first reference line 791 and the second reference line 793 on the second display unit 180_2. Here, the first reference line 791 may refer to a reference line indicating a point capable of displaying a screen for selected content with a ratio of 21:9 according to user input for dragging and dropping the pointer 205 and the second reference line 793 may refer to a reference line indicating a point capable of displaying a screen for selected content with a ratio of 32:9 according to user input for dragging and dropping the pointer 205. In addition, the controller 170 of the second display device 100_2 may display "21:9" which is the aspect ratio to be adjusted on the first reference line 791 displayed on the second display unit 180_2 and the name of the aspect ratio indicating the screen with a ratio of 21:9. In addition, the controller 170 of the second display device 100_2 may display "32:9" which is the aspect ratio to be adjusted on the second reference line 793 displayed on the second display unit 180_2 and the name of the aspect ratio indicating the screen with a ratio of 32:9.

In addition, the controller 170 of one or more of the first display device 100_1 and the second display device 100_2 may acquire user input for dragging and dropping the pointer 205 in correspondence with the displayed reference line and display the screen corresponding to the dragged region with the aspect ratio corresponding to the reference line.

In one embodiment, when the controller 170 of one or more of the first display device 100_1 and the second display device 100_2 may acquire user input for dragging and dropping the pointer 205 to the first reference line 791, the display device 100_1 and the second display device 100_2 may display a screen with a ratio of 21:9 for the first content 310. Here, the screen with the ratio of 21:9 for the first content 310 may be the above-described merged screen.

In another embodiment, when the controller 170 of one or more of the first display device 100_1 and the second display device 100_2 may acquire user input for dragging and dropping the pointer 205 to the second reference line 793, the display device 100_1 and the second display device 100_2 may display a screen with a ratio of 32:9 for the first content 310. Here, the screen with the ratio of 32:9 for the first content 310 may be the above-described merged screen.

In addition, one or more of the plurality of display devices 100 operating in the twin mode may display a thumbnail image indicating a preview image corresponding to an aspect ratio to be adjusted on the display unit 180 in correspondence with user input for adjusting a screen size.

This will be described with reference to FIG. 40b.

FIG. 40b is a diagram showing a thumbnail image indicating a preview image corresponding to an aspect ratio to be adjusted according to an embodiment of the present invention.

Referring to FIG. 40b, the controller 170 of one or more of the plurality of display devices 100 operating in the twin mode may display a thumbnail image 794 indicating a preview image corresponding to an aspect ratio to be adjusted on the display unit 180 in correspondence with user input for adjusting a screen size. Here, user input for adjusting the screen size may be user input for dragging and dropping the pointer 205. In addition, the controller 170 of one or more of the plurality of display devices 100 may adjust and display the ratio of the thumbnail image 794 indicating the preview image in correspondence with user input for dragging and dropping.

The description of the reference line indicating the aspect ratio to be adjusted and the thumbnail image indicating the preview image is exemplary and is not limited thereto. Accordingly, thumbnail images or reference lines having various ratios are applicable to the present invention according to selection of a user or a designer.

Meanwhile, the plurality of display devices 100 operating in the twin mode may adjust the size of the merged screen displayed through operation corresponding to user input for the pointer 205, when the merged screen for one content or one application is displayed. For example, each of the plurality of display devices 100 may acquire user input for dragging and dropping a left or right partial region of the merged screen using the pointer 204 and adjust the size of the merged screen in correspondence with the acquired user input. Here, the left or right partial region of the merged screen may mean a partial region from a left or right outermost part of the merged screen. In addition, user input for the pointer 205 may be user input for a key such as the directional key of the remote control device 200.

This will be described with reference to FIG. 41.

FIG. 41 is a diagram showing operation of adjusting the size of a merged screen according to an embodiment of the present invention.

Referring to FIG. 41, the controller 170 of the first display device 100_1 may output a partial image 311 of the first content 310 through the display unit 180 of the first display device 100_1, and the controller 170 of the second display device 100_2 may output the remaining image 313 of the first content 310 through the display unit 180 of the second display device 100_2. Therefore, the entire image of the first content 310 may be output on a merged screen obtained by merging the screens of two display devices 100. In addition, the controller 170 of one or more of the first display device 100_1 and the second display device 100_2 may acquire user input for dragging and dropping a right partial region 413 of the merged screen for the first content 310 using the pointer 205. The controller 170 of one or more of the first display device 100_1 and the second display device 100_2 may adjust the size of the merged screen for the first content 310 in correspondence with the acquired user input for dragging and dropping. For example, the controller 170 of one or more of the first display device 100_1 and the second display device 100_2 may display the first content 310 on the entire screen of the first display unit 180_1 and the second display unit 180_2 in correspondence with the dragging distance of user input for dragging and dropping. Therefore, the controller 170 of the first display device 100_1 may display the partial image 312 of the first content 310 on the entire screen of the first display unit 180_1, and the controller 170 of the second display device 100_2 may display the remaining image 314 of the first content 310 on the entire screen of the second display unit 180_2.

In a second embodiment, operation of displaying the merged screen for one content or application as operation corresponding to user input for the pointer 205 will be described with reference to FIG. 42.

FIG. 42 is a diagram showing an example of operation of displaying a merged screen according to an embodiment of the present invention.

Referring to FIG. 42, the controller 170 of the first display device 100_1 may display the first content 310 on the display unit 180_1 and display the pointer 205 on the screen for the displayed first content 310. In addition, the controller 170 of the second display device 100_2 may display the second content 330 on the display unit 180_2. One or more of the first controller 170_1 and the second controller 170_2 may acquire user input for dragging and dropping the displayed pointer 205 from the partial region of the screen for the first content 310 to cross the switching reference line 790 of the screen for the second content 330 as user input for displaying the merged screen for the first content 310. Therefore, the controller 170 of the first display device 100_1 may output the partial image 311 of the first content 310 on the display unit 180 of the first display device 100_1, and the controller 170 of the second display device 100_2 may output the remaining image 313 of the first content 310 on the display unit 180 of the second display device 100_2. Accordingly, the entire image of the first content 310 may be output on the merged screen obtained by merging the screens of the two display devices 100. Here, the switching reference line 790 may or may not be displayed on the first display unit 180_1 or the second display unit 180_2. Meanwhile, when user input for dragging and dropping the pointer 205 from the partial region of the screen for the first content 310 not to cross the switching reference line 790 of the screen for the second content 330 is received, one or more of the first controller 170_1 and the second controller 170_2 may not display the merged screen for the first content 310.

In a third embodiment, screen movement operation of each of the plurality of screens or the merged screen output in the twin mode as operation corresponding to user input for the pointer 205 will be described with reference to FIG. 43.

FIG. 43 is a diagram showing an example of operation of moving a merged screen according to an embodiment of the present invention.

Referring to FIG. 43, the controller 170 of the first display device 100_1 may display the partial image 311 of the first content 310 on the first display unit 180_1, and the controller 170 of the second display device 100_2 may output the remaining image 313 of the first content 310 on the second display unit 180_2. Therefore, the entire image of the first content 310 may be output on the merged screen obtained by merging two display devices 100. In addition, the controller 170 of one or more of the first display device 100_1 and the second display device 100_2 may acquire user input for dragging and dropping the partial region of the merged screen for the first content 310 using the pointer 205. The controller 170 of one or more of the first display device 100_1 and the second display device 100_2 may move the merged screen for the first content 310 in correspondence with the acquired user input for dragging and dropping. Therefore, the first display device 100_1 and the second display device 100_2 may move the image for the first content 310 in a left direction corresponding to the user input for dragging and dropping and output the image on the display units 180. Accordingly, the controller 170 of the first display device 100_1 may display the changed partial screen 315 for the first content 310 on the first display unit 180_1, and the controller 170 of the second display device 100_2 may display the changed remaining screen 316 for the first content 310 on the second display unit 180_1. Here, the changed partial screen 315 and the changed remaining screen 316 may be screens for the first content 310 moved in the left direction corresponding to the acquired user input for dragging and dropping.

In a fourth embodiment, volume control operation of the audio output unit 185 as operation corresponding to user input for the pointer 205 will be described with reference to FIGS. 44 to 48.

FIG. 44 is a diagram showing a speaker volume control region corresponding to a pointer location according to an embodiment of the present invention.

Referring to FIG. 44, in the screen of the display unit 180 of the first display device 100_1, a first left speak region 411 may be a region for controlling the volume of the first left speaker 185_1, and a first right speaker region 412 may be a region for controlling the volume of the first right speaker 185_2. In addition, in the screen of the display unit 180 of the second display device 100_2, a second left speaker region 413 may be a region for controlling the volume of the second left speaker 185_3, and a second right speaker region 414 may be a region for controlling the volume of the second right speaker 185_4.

In addition, when the pointer 205 is located in any one of the first left speaker region 411, the first right speaker region 412, the second left speaker region 413 and the second right speaker region 414 and user input for volume control is acquired, the first controller 170_1 and the second controller 170_2 may control the volume of the speaker corresponding to the region in which the pointer 205 is located.

One embodiment will be described with reference to FIGS. 45 and 46.

FIG. 45 is a diagram showing volume control input for a first left speaker according to an embodiment of the present invention.

FIG. 46 is a diagram showing volume control operation of a first left speaker according to an embodiment of the present invention.

Referring to FIG. 45, one or more of the first controller 170_1 and the second controller 170_2 may acquire user input for increasing the volume from the remote control device 200 in a state in which the pointer 205 is located in the first left speaker region 411 of the first display unit 180_1. Therefore, as shown in FIG. 46, the first controller 170_1 may increase the volume of the first left speaker 185_1 in correspondence with the user input for increasing the volume. Here, operation for increasing the volume of the first left speaker 185_1 may mean that the gain of the sound signal output through the first left speaker 185_1 is increased. Meanwhile, the first controller 170_1 and second controller 170_2 may mute the first right speaker 185_2, the second left speaker 1853 and the second right speaker 185_4, except for the first left speaker 185_1 corresponding to the user input for increasing the volume, for a predetermined time after acquiring the user input for controlling the volume. Therefore, as shown in FIG. 46, the first controller 170_1 may increase the volume of the first left speaker 185_1 and mute the first right speaker 185_2. In addition, the second controller 170_2 may mute the second left speaker 185_3 and the second right speaker 185_4.

Another embodiment will be described with reference to FIGS. 47 and 48.

FIG. 47 is a diagram showing volume control input of a first right speaker and a second left speaker according to an embodiment of the present invention.

FIG. 48 is a diagram showing volume control operation of a first right speaker and a second left speaker according to an embodiment of the present invention.

Referring to FIG. 47, when the pointer 205 is located in one or more of the first right speaker region 412 and the second left speaker region 413 respectively corresponding to the first right speaker 185_2 and the second left speaker 185_3 for outputting woofer or center audio and user input for increasing the volume is acquired, the first controller 170_1 and the second controller 170_2 may increase the volumes of the first right speaker 185_2 and the second left speaker 185_3. Therefore, as shown in FIG. 48, the first controller 170_1 and the second controller 170_2 may increase the volumes of the first right speaker 185_2 and the second left speaker 185_3 for outputting woofer or center audio. In addition, the first controller 170_1 and the second controller 170_2 may mute the first left speaker 185_1 and the second right speaker 185_4, except for the first right speaker 185_2 and the second left speaker 185_3 corresponding to the user input for increasing the volume, for a predetermined time after acquiring the user input for controlling the volume. This was described above and a description thereof will be omitted.

Meanwhile, the display devices 100 according to the present invention may output audio of only one of the plurality of display devices 100 in correspondence with the location of the pointer 205. For example, if the pointer 205 is displayed on the display unit 180 of the first display device 100_1 between the first display device 100_1 and the second display device 100_2, the controller 170 of the first display device 100_1 may perform control such that the audio output unit 185 of the first display device 100_1 output audio, and the controller 170 of the second display device 100_2 may perform control such that the audio output unit 185 of the second display device 100_2 does not output audio. Therefore, the first left speaker 185_1 and the first right speaker 185_2 included in the first display device 100_1 may output a sound signal and the second left speaker 185_3 and the second right speaker 185_4 included in the second display device 100_2 may not output a sound signal.

In addition, the display devices 100 according to the present invention may change a broadcast channel displayed by one of the plurality of display devices 100 in correspondence with the location of the pointer 205. For example, when channel change input is received in a state in which the pointer 205 is displayed on the display unit 180 of the first display device 100_1 between the first display device 100_1 and the second display device 100_2, the controller 180 of the first display device 100_1 may change the channel displayed on the first display unit 180_1, and the controller 180 of the second display device 100_2 may not change the channel displayed on the second display unit 180_2.

Meanwhile, the display devices 100 according to the present invention may display an information display window for a variety of information related to the display devices 100 in a black region. Here, the information display window may mean an on screen display (OSD) displayed on the display unit 180. For example, the information display window may include one or more of an info box for displaying information on a displayed channel and a channel list for displaying channel information of a plurality of channels. In addition, the black region may mean a region, in which an image is not displayed, of the screen of the display unit 180.

One embodiment will be described with reference to FIG. 49.

FIG. 49 is a diagram showing a screen, on which an info box is displayed, according to an embodiment of the present invention.

Referring to FIG. 49, the controller 170 of the first display device 100_1 may output the partial image 311 of the first content 310 through the display unit 180 of the first display device 100_1, and the controller 170 of the second display device 100_2 may output the remaining image 313 of the first content 310 through the display unit 180 of the second display device 100_2. In addition, the controller 170 of the first display unit 100_1 may output a first info box 754 in a left black region 511 which is the black region of the first display unit 180_1. Information on the displayed first content may be displayed in the first info box 754. For example, information on a broadcast service channel name and a broadcast service provider may be displayed in the first info box 754. In addition, the controller 170 of the second display device 100_2 may output a second info box 755 in a right black region 521 which is the black region of the second display unit 180_2. Information on weather and a current time may be displayed in the second info box 755. In addition, the controller 170 of the second display device 100_2 may display a volume window 756 indicating an output audio volume in the right black region 521 which is the black region of the second display unit 180_2.

In addition, the display devices 100 according to the present invention may adjust the size of the displayed screen and move the merged screen, when the information display window for a variety of information related to the display devices 100 is displayed.

This will be described with reference to FIG. 50.

FIG. 50 is a diagram showing channel list display operation according to an embodiment of the present invention.

Referring to FIG. 50, the controller 170 of the first display device 100_1 may display the partial image 312 of the first content 310 on the entire screen of the first display unit 180_1, and the controller 170 of the second display device 100_2 may display the remaining image 314 of the first content 310 on the entire screen of the second display unit 180_2. One or more of the first controller 170_1 and the second controller 170_2 may acquire user input for displaying a channel list. Therefore, the first display device 100_1 and the second display device 100_2 may move the merged screen for the first content 310 in a left direction. Therefore, the controller 170 of the first display device 100_1 may display the changed partial screen 315 for the first content 310 on the first display unit 180_1, and the controller 170 of the second display device 100_2 may display the changed remaining screen 316 for the first content 310 on the second display unit 180_1. In addition, the controller 170 of the second display device 100_2 may display the channel list 761 on the partial region of the screen of the second display unit 180_2. A list of a plurality of broadcast channels may be displayed in the channel list 761. The sizes of the changed partial screen 315 and remaining screen 316 may be less than that of the partial screen 312 and the remaining screen 314 before movement of the merged screen according to display of the channel list.

Meanwhile, one of the plurality of display devices operating in the twin mode may output a specific image and another display device 100 may output information related to the specific image on the screen thereof.

This will be described with reference to FIG. 51.

FIG. 51 is a flowchart illustrating operation of displaying related information according to an embodiment of the present invention.

Referring to FIG. 51, the controller 170 of the first display device 100_1 outputs a first image through the first display unit 180_1 (S501).

The controller 170 of the first display device 100_1 may output the first image for content or an application on the entire or partial screen of the first display unit 180_1.

The controller 170 of the first display device 100_1 transmits information on the output first image to the second display device 100_2 through the communication unit 195 (S503).

Here, the information on the transmitted first image may include one or more of a content name of the output first image, a content substance, an application name and substance, and user input for the output first image.

The controller 170 of the second display device 100_2 acquires information related to the first image based on the information on the transmitted first image (S505).

The controller 170 of the second display device 100_2 may acquire information on the content corresponding to the first image, if the first image is specific content.

In addition, the controller 170 of the second display device 100_2 may acquire information on an application corresponding to the first image, if the first image is an image of a specific application.

The controller 170 of the second display device 100_2 outputs the acquired information related to the first content through the second display unit 180_2 (S507).

The controller 170 of the second display device 100_2 may output information on the content corresponding to the acquired first image through the second display unit 180_2, if the first image is specific content.

In addition, the controller 170 of the second display device 100_2 may output information on an application corresponding to the acquired first image through the second display unit 180_2, if the first image is an image of a specific application.

Hereinafter, a detailed embodiment for display of the above-described related information will be described.

FIG. 52 is a diagram showing an example of EPG display according to an embodiment of the present invention.

Referring to FIG. 52, the controller 170 of the first display device 100_1 may display an Electronic Program Guide (EPG) 770 on the first display unit 180_1. Information on a broadcast schedule for one or more broadcast services may be displayed in the EPG 770 displayed on the first display unit 180_1. In addition, the controller 170 of the first display device 100_1 may acquire user input for selecting one content from the EPG 770 displayed on the first display unit 180_1. The controller 170 of the first display device 100 may display a region 775 corresponding to the first content selected from among a plurality of contents of the displayed EPG 770 to be distinguished from another region. The controller 170 of the first display device 100_1 may transmit information on the selected first content to the second display device 100_2. The controller 170 of the second display device 100_2 may acquire an image for the first content based on the transmitted information on the first content. In addition, the controller 170 of the second display device 100_2 may display the first content 310 on the second display unit 180_2. One of the first display device 100_1 and the second display device 100_2 may display the EPG and the other display device may display the image of the selected content.

Meanwhile, the first display device 100_1 and the second display device 100_2 may display the EPG on the large screen as the merged screen.

This will be described with reference to FIG. 53.

FIG. 53 is a diagram showing a merged screen for displaying an EPG according to an embodiment of the present invention.

Referring to FIG. 53, the controller 170 of the first display device 100_1 may display the partial image 722 of the enlarged EPG 771 on the first display unit 180_1, and the controller 170 of the second display device 100_2 may display the remaining image 773 of the enlarged EPG 771 on the second display unit 180_2. For example, the enlarged EPG 771 may display broadcast information after eight hours from now. Therefore, the controller 170 of the first display device 100_1 may display broadcast information until four hours from now in the partial image 772 of the enlarged EPG 771, and the controller 170 of the second display device 100_2 may display broadcast information from after four hours from now to after eight hours from now in the remaining image 773 of the enlarged EPG 771.

Meanwhile, the first display device 100_1 may output a specific image, and the second display device 100_2 may output an image obtained by enlarging the specific image output through the first display device 100_1.

This will be described with reference to FIG. 54.

FIG. 54a is a diagram showing display of an enlarged image according to an embodiment of the present invention.

Referring to FIG. 54a, the controller 170 of the first display device 100_1 may display the first content 310 on the first display unit 180_1. In addition, the controller 170 of the first display device 100_1 may display a guide box 620 for selecting an enlarged image on the first display unit 180_1 and move the location of the guide box 620 in correspondence with user input. In addition, the controller 170 of the first display device 100_1 may adjust the size of the guide box 620 in correspondence with user input. Meanwhile, the controller 170 of the first display device 100_1 may transmit information on the selected region of the first content 310 corresponding to the guide box 620 to the second display device 100_2. The controller 170 of the second display device 100_2 may display the enlarged image 318 of the first content 310 on the second display unit 180_2 based on the information on the selected region.

In addition, one or more of the plurality of display devices 100 may receive the selected region information for selecting a specific region of a specific image output from the display device from a linked terminal 800 and output the enlarged image of the selected region based on the received selected region information. The configuration of the terminal 800 linked to the display device 100 will first be described.

The terminal 800 may include a communication module 810, a display module 820, and a memory 840.

The communication module 810 may communicate with another device. For example, the communication module 810 may communicate with the communication unit 195 of the display device 100.

The display module 820 may output various images.

The control module 830 may control the overall operation of the terminal 800.

The memory 840 may store a variety of data related to operation of the terminal 800.

FIGS. 54b and 54c will be referred to.

FIG. 54b is a diagram showing selection of an enlarged region through a terminal according to an embodiment of the present invention.

FIG. 54c is a diagram showing a selection of an enlarged region through a terminal according to an embodiment of the present invention.

Referring to FIG. 54b, the controller 170 of the first display device 100_1 may display the first content 310 on the first display unit 180_1. In addition, the controller 170 of the first display device 100_1 may display a guide box 630 for selecting an enlarged image on the first display unit 180_1 and may move the location of the guide box 620 in correspondence with user input. In addition, one or more of the controller 170 of the first display device 100_1 and the controller of the second display device 100_2 may receive selection region information for selecting the enlarged image from the terminal 800 and perform control such that the second display device 100_2 displays the enlarged image 318 of the selected region on the second display unit 180_2 based on the received selection region information. Specifically, the control module 830 of the terminal 800 may display the guide box 630 on the display module 820. In addition, the control module 830 may move the location of the guide box 630 in correspondence with user input. In addition, the control module 830 may control the size of the guide box 630 in correspondence with user input. The control module 830 may or may not display an image to be enlarged on the display module 820. For example, as shown in FIG. 54b, the control module 830 may display the first content 310 on the display module 830 and display the guide box 630 for selecting the enlarged image of the first content 310. As another example, as shown in FIG. 54c, the control module 830 may not display the first content 310 on the display module 830 and may display only the guide box 630 for selecting the enlarged image. In addition, the control module 830 may transmit selection region information including the information of the selected region of the first content 310 corresponding to the guide box 630 to one or more of the first display device 100_1 and the second display device 100_2 through the communication module 810. The second display device 100_2, which has received the selection region information, may display the enlarged image 318 of the selected region on the second display unit 180_2. In addition, the first display device 100_1 may display the first content 310 and the guide box 620 on the first display unit 180_1 in correspondence with the received selection region information.

Meanwhile, each display device 100 may display an original reduced image indicating the original of the output image in a partial region of the display unit 180 and display an output guide box 610 indicating a region actually output through the display unit 180 of the original reduced image. In addition, each display device 100 may acquire user input for moving the output guide box 610 and output an image corresponding to the moved output guide box 610 on the display unit 180 of each display device 100.

This will be described in detail with reference to FIG. 55.

FIG. 55 is a diagram showing selection of an output image according to an embodiment of the present invention.

Referring to FIG. 55, the controller 170 of the first display device 100_1 may display the partial image 312 of the first content on the entire screen of the first display unit 180_1, and the controller 170 of the second display device 100_2 may display the remaining image 314 of the first content on the entire surface of the second display unit 180_2. In addition, the original reduced image 780 indicating the original image of the first content 310 may be displayed in the partial region of the second display device 100_2, and the output guide box 610 indicating the image actually output through the first display unit 180_1 and the second display unit 180_2 may be displayed. The controller 170 of one or more of the first display device 100_1 and the second display device 100_2 may acquire user input for moving the guide box 610 output in the original reduced image 780 and display the image of the first content 310 on the first display unit 180_1 and the second display unit 180_2 in correspondence with the moved output guide box 610.

Meanwhile, the plurality of display devices 100 operating in the twin mode may display a screen before inputting screen setting to one of the plurality of display devices 100 and display a screen after inputting screen setting to the other display device, upon screen setting. Here, screen setting is to control an image displayed on the display unit 180 and may mean that one or more of color, contrast, brightness, definition, color density, white balance, backlight brightness and screen mode is adjusted.

This will be described with reference to FIG. 56.

FIG. 56 is a diagram showing screen setting according to an embodiment of the present invention.

Referring to FIG. 56, the controller 170 of the first display device 100_1 may display the first content 310 before screen setting on the first display unit 180_1. In addition, the controller 170 of the second display device 100_2 may display the first content 319 changed according to screen setting on the second display unit 180_2. In addition, the controller 170 of the second display unit 180_2 may acquire user input for screen setting and display a screen corresponding to the acquired user input on the second display unit 180_2. Therefore, the user may compare screens before and after screen setting through the first display device 100_1 and the second display device 100_2.

Meanwhile, the plurality of display devices 100 operating in the twin mode may display an image of a current time on the display unit 180 of one of the plurality of display devices 100 and display an image of a past time on the display unit 180 of the other display device 100 of the plurality of display devices 100. In one embodiment, if the plurality of display devices 100 includes the first display device 100_1 and the second display device 100_2, the first display device 100_1 may output the image of the current time and the second display device 100_2 may output the image of the past time. In addition, the second display device 100_2 may receive user input for controlling the time of the output image and control the time of the output image.

Meanwhile, the plurality of display devices 100 operating in the twin mode may move the image displayed on the merged screen such that an object corresponding to a thing or a person included in the displayed image is not displayed at a location corresponding to the adhered bezel of the plurality of display devices 100, when outputting the image on the large screen as the merged screen.

This will be described with reference to FIG. 57.

FIG. 57 is a diagram showing movement of an image displayed on a merged screen according to an embodiment of the present invention.

Referring to FIG. 57, the controller 170 of the first display device 100_1 may display the partial image 391 of the first image 390 on the first display unit 180_1, and the controller 170 of the second display device 100_2 may display the remaining image 393 of the first image 390 on the second display unit 180_2. One or more of the first controller 170_1 and the second controller 170_2 may recognize an object corresponding to a person's face included in the first image 390 and determine the location of the recognized object. Therefore, one or more of the first controller 170_1 and the second controller 170_2 may recognize that the person's face included in the first image 390 is displayed at the location corresponding to the adhered bezel of the first display device 100_1 and the second display device 100_2. Therefore, the first display device 100_1 and the second display device 100_2 may move the first image 390 displayed on each display unit 180 in a left direction. Therefore, the controller 170 of the first display device 100_1 may display the partial image 392 of the first image 390 moved in the left direction on the first display unit 180_1 and the controller 170 of the second display device 100_2 may display the remaining image 394 of the first image 390 moved in the left direction on the second display unit 180_2.

In addition, the plurality of display devices 100 operating in the twin mode may receive one or more image or video from the connected terminal 800 and output the received image or video.

This will be described with reference to FIG. 58.

FIG. 58 is a diagram showing an image display screen according to an embodiment of the present invention.

Referring to FIG. 58, the first display device 100_1 and the second display device 100_2 may receive one or more images from the terminal 800. Here, one or more images received from the terminal 800 may be a preview image of the image. The first display device 100_1 may display an image list screen 760 for displaying a thumbnail image corresponding to a plurality of images received from the terminal 800. The first display device 100_1 may display the pointer 205 on the image list screen 760 and acquire user input for selecting one of a plurality of thumbnail images displayed on the image list screen 760. The controller 180 of the first display device 100_1 may transmit information on the selected thumbnail image to the second display device 100_2. Therefore, the controller 180 of the second display device 100_2 may display an image 399 corresponding to the selected thumbnail image on the second display unit 180_2. In addition, the terminal 800 may receive the information on the selected thumbnail image from the first display device 100_1 and display the image 399 corresponding to the selected thumbnail image on the display module 820.

Meanwhile, the plurality of display devices 100 operating in the twin mode may display a menu related to operation or function of the display device 100 on one or more display devices 100.

This will be described with reference to FIGS. 59 and 61.

FIG. 59 is a diagram showing a menu screen according to an embodiment of the present invention.

Referring to FIG. 59, the first display device 100_1 may display the first content 310 and the second display device 100_2 may display the second content 330. In addition, the first display device 100_1 may display a menu window 764 including a plurality of menus. The first display device 100_1 may acquire user input for selecting one menu from the displayed menu window 764 through the pointer 205. Therefore, the first display device 100_1 may perform operation corresponding to the selected menu.

FIG. 60 is a diagram showing a menu screen according to another embodiment of the present invention.

Referring to FIG. 60, the first display device 100_1 may display the first content 310 and the second display device 100_2 may display the second content 330. In addition, the first display device 100_1 and the second display device 100_2 may display a menu window 765 including a plurality of menus. One or more of the first display device 100_1 and the second display device 100_2 may acquire user input for selecting one menu from the displayed menu window 765 through the pointer 205. Therefore, one or more of the first display device 100_1 and the second display device 100_2 may perform operation corresponding to the selected menu.

In addition, one of the plurality of display devices 100 operating in the twin mode may display an input key in the partial region of the screen of the display unit 180. Here, the input key may mean a key for manipulating the display device 100. In addition, the plurality of display devices 100 may acquire user input for the displayed input key and perform operation corresponding to the acquired user input.

This will be described with reference to FIG. 61.

FIG. 61 is a diagram showing a screen for displaying an input key according to an embodiment of the present invention.

Referring to FIG. 61, the first display device 100_1 may display the first content 310 and the second display device 100_2 may display the second content 330. In addition, the controller 180 of the first display device 100_1 may display an input key 745 for manipulating the display device 100 in the partial region of the display unit 180. For example, various keys such as numeral keys, a screen capture key and a power key may be displayed in the input key 745. In addition, the controller 180 of the first display device 100_1 may acquire user input for the displayed input key 745 through the displayed pointer 205. Therefore, one or more of the first display device 100_1 and the second display device 100_2 may perform operation corresponding to the acquired user input with respect to the displayed input key 745.

The above-described input key is exemplary and the present invention is not limited thereto. Accordingly, various keys may be displayed in the input key according to selection of a user or a designer.

FIG. 62 is a diagram showing an output device for distributing content into a plurality of display devices according to an embodiment of the present invention.

In FIG. 62, a display system according to an embodiment of the present invention may include an output device 6200.

The output device 6200 may receive content from an external device.

The output device 6200 may receive content output from one or more external devices. Here, the external device may be at least one of a set-top box, a Blu-ray player, a DVD Player, a PC, a USB, and a video game console.

In addition, the output device 6200 may receive a broadcast signal from an external device through an antenna or receive a broadcast signal through a cable network.

In addition, the output device 6200 may receive content or data provided by a content provider or a network operator from a server through a wired/wireless network including the Internet.

Meanwhile, the output device 6200 may distribute the content acquired from the external device into a first display device 100_1 and a second display device 100_2.

Specifically, the output device 6200 may distribute a broadcast signal acquired from an external device into the first display device 100_1 and the second display device 100_2. For example, when the output device 6200 receives an RF signal including a broadcast signal from an external device, the output device 6200 may display the received RF signal into the first display device 100_1 and the second display device 100_2.

In addition, the output device 6200 may distribute content provided by the content provider or the network operator and received from the server through the wired/wireless network including the Internet to the first display device 100_1 and the second display device 100_2.

In addition, the output device 6200 may transmit one or more content from one or more external devices to the first display device 100_1 and the second display device 100_2.

FIG. 63 is a block diagram illustrating the configuration of the output device 6200 according to another embodiment of the present invention.

In FIG. 63, the output device 6200 according to the embodiment of the present invention may include a first interface 6210, a second interface 6220, a switching unit 6230 and a controller 3240.

The first interface 6210 may provide a connection path to one or more external devices. Specifically, one or more external devices may be connected to the first interface 6210, and the output device 6200 may receive one or more contents from one or more external devices through the first interface 6210.

The first interface 6210 may include one or more HDMI terminal or one or more USB terminals connectable to an external device.

The second interface 6220 may provide a connection path to the first display device 100_1 and the second display device 100_2.

Specifically, the second interface 6220 may include a first terminal and a second terminal, the first terminal may be connected to the first display device 100_1, and the second terminal may be connected to the second display device 100_2, thereby providing the connection path to the first display device 100_1 and the second display device 100_2. Here, each of the first terminal and the second terminal may be an HDMI terminal, the first terminal may be connected to the HDMI terminal of the first display device through an HDMI cable, and the second terminal may be connected to the HDMI terminal of the second display device through an HDMI cable.

The switching unit 6230 may change an external device for outputting content to the first display device 100_1 and the second display device 100_2.

Specifically, the switching unit 6230 changes the connection state of the first interface 6210 and the second interface 6220 under control of the controller 6240, thereby changing the output device for outputting content to the first display device 100_1 and the second display device 100_2.

For example, while the output device 6200 transmits the content received from a first external device to the first display device 100_1 and the second display device 100_2, the output device 6200 may change the connection state of the first interface 6210 and the second interface 6220 using the switching unit 6230 and transmit the content received from a second external device to the first display device 100_1 and the second display device 100_2.

The switching unit 6230 may include a plurality of switches for changing the connection state of the first interface 6210 and the second interface 6220.

The controller 6240 may receive one or more contents from at least one of one or more external devices through the first interface 6210. For example, the controller 6240 may receive one or more contents from one external device. In another example, the controller 6240 may receive one or more contents from two or more external devices.

In addition, the controller 6240 may transmit one or more contents received from at least one of one or more external devices to the first display device 100_1 and the second display device 100_2 through the second interface 6220.

For example, the controller 6240 may transmit first content received from the first external device to the first display device 100_1 and the second display device 100_2. In another example, the controller 6240 may transmit the first content from the first external device to the first display device 100_1 and transmit the second content received from the second external device to the second display device 100_2.

Meanwhile, the controller 6240 may control the switching unit 6230 to change the external device for outputting the content to the first display device 100_1 and the second display device 100_2.

Specifically, the controller 6240 may control the switching unit 6230 to change the connection state of the first interface 6210 and the second interface 6220, thereby changing the external device for outputting the content to the first display device 100_1 and the second display device 100_2.

Meanwhile, although the output device 6200 includes the switching unit 6230 in the present embodiment, the present invention is not limited thereto. For example, in the present invention, the output device 6200 may not include the switching unit 6230 and the content received from one external device connected to the first interface 6210 may be transmitted to the first display device 100_1 and the second display device 100_2.

FIG. 64 is a flowchart illustrating a content output method of an output device for outputting content to a first display device and a second display device according to another embodiment of the present invention.

In FIG. 64, the content output method according to the embodiment of the present invention may include receiving one or more contents (S6410), transmitting the received one or more contents to a first display device and a second display device (S6430), receiving a command for changing an external device for transmitting content (S6450), receiving the content from the changed external device (S6470), and transmitting the content received from the changed external device to the first display device and the second display device (S6490).

Step S6410 of receiving one or more contents and step S6430 of transmitting the received one or more contents to the first display device and the second display device will be described in detail with reference to FIGS. 65 to 67.

FIG. 65 is a diagram illustrating a process of transmitting content output from one external device.

In FIG. 65, the output device 6200 is connected to one external device 6510 through the first interface 6210. Assume that the external device 6510 connected to the output device 6200 is a set-top box.

The controller 6240 may receive first content from the first external device 6510. Specifically, the first external device 6510 may be connected to a terminal 6212 included in the first interface 6210. In addition, the controller 6240 may receive the first content output from the first external device 6510 through the first interface 6210.

In addition, the controller 6240 may transmit the received first content to the first display device 100_1 and the second display device 100_2 through the second interface 6220. Specifically, the second interface 6220 may include a first terminal 6221 connected to the first display device 100_1 and a second terminal 6222 connected to the second display device 100_2, and the controller 6240 may transmit the first content to the first display device 100_1 through the first terminal 6221 and transmit the first content to the second display device 100_2 through the second terminal 6222.

As described above, the first display device 100_1, which has received the first content, may display a first partial image of the first content on the screen thereof, and the second display device 100_2 may display a second partial image excluding the first partial image of the first content on the screen thereof.

In addition, as described above, the first display device 100_1, which has received the first content, may display the entire image of the first content on the screen thereof and the second display device 100_2 may display the entire image of the first content on the screen thereof.

Meanwhile, although only one external device 6510 is connected to the first interface 6210 in the present embodiment, the present invention is not limited thereto. For example, a plurality of external devices may be connected to the first interface 6210, and the controller 6240 may receive the first content from one of the plurality of external devices and transmit the first content to the first display device 100_1 and the second display device 100_2.

FIGS. 66 to 67 are diagrams illustrating a process of transmitting content output from a plurality of external devices.

In FIG. 66, a plurality of external devices 6510, 6520 and 6530 may be connected to the output device 6200. In addition, the output device 6200 may receive one or more contents output from the plurality of external devices 6510, 6520 and 6530 and transmit the received one or more contents to the first display device 100_1 and the second display device 100_2.

This will be described in greater detail with reference to FIG. 67.

In FIG. 67, the output device 6200 may be connected to the plurality of external devices 6510, 6520 and 6530 through the first interface 6210.

The controller 6240 may receive the first content from the first external device 6510. Specifically, the first external device 6510 may be connected to the first terminal 6211 included in the first interface 6210. In addition, the controller 6240 may receive the first content output from the first external device 6510 through the first interface 6210.

In addition, the controller 6240 may control the switching unit 6230 to transmit the received first content to the first display device 100_1 through the second interface 6220. Specifically, the switching unit 6230 may include a plurality of switches capable of changing a connection state of the plurality of terminals 6211, 6212 and 6213 included in the first interface 6210 and the plurality of terminals 6221 and 6222 included in the second interface 6220, and the controller 6240 may control the switching unit 6230 to transmit the first content received from the first external device 6510 through the first terminal 6211 of the first interface 6210 to the first display device 100_1 through the first terminal 6221 of the second interface 6221.

Meanwhile, the controller 6240 may receive second content from the second external device 6520. Specifically, the second external device 6520 may be connected to the second terminal 6212 included in the first interface 6210. In addition, the controller 6240 may receive the second content output from the second external device 6520 through the second terminal of the first interface 6210.

In addition, the controller 6240 may control the switching unit 6230 to transmit the received second content to the second display device 100_2 through the second terminal 6222 of the second interface 6220.

Meanwhile, although the output device 6200 is connected to the third external device 6530, the controller 6240 may control the switching unit 6230 not to receive the content output from the third external device 6530 or not to transmit the content to the display device.

As described above, the first display device 100_1, which has received the first content, may display the image of the first content on the screen thereof and the second display device 100_2 may display the image of the second content on the screen thereof.

Meanwhile, although the first content output from the first external device 6510 is output to the first display device 100_1 and the second content output from the second external device 6520 is output to the second display device 100_2 in the present embodiment, the present invention is not limited thereto. Specifically, the output device 6200 may receive content from one of the plurality of external devices connected to the output device 6200 and transmit the received content to the first display device 100_1 and the second display device 100_2.

For example, in a state of connecting a first external device, a second external device and a third external device, the output device 6200 may output first content output from the first external device to the first display device 100_1 and the second display device 100_2.

In addition, although the first content output from the first external device 6510 is output to the first display device 100_1 and the second content output from the second external device 6520 is output to the second display device 100_2 in the present embodiment, the present invention is not limited thereto and the controller 6240 may control the switching unit 6230 such that the first content output from the first external device 6510 is output to the second display device 100_2 and the second content output from the second external device 6520 is output to the first display device 100_1.

Meanwhile, the plurality of terminals 6211, 6212 and 6213 included in the first interface 6210 may be HDMI terminals or USB terminals, and the output device 6200 may be connected to a plurality of external devices 6510, 6520 and 6530 through the HDMI terminals or the USB terminals.

Meanwhile, the plurality of terminals 6221 and 6222 included in the second interface 6220 may be HDMI terminals and the plurality of terminals 6221 and 6222 included in the second interface 6220 may be respectively connected to the HDMI terminal of the first display device 100_1 and the HDMI terminal of the second display device 100_2. However, the present invention is not limited thereto and some of the plurality of terminals included in the second interface 6220 may be USB terminals, and the USB terminals included in the second interface 6220 may be respectively connected to the USB terminal of the first display device 100_1 and the USB terminal of the second display device 100_2.

Meanwhile, although an external device and the output device 6200 are connected through HDMI and the output device 6200 is connected to the first display device 100_1 and the second display device 100_2 through HDMI to transmit and receive content in the present embodiment, the present invention is not limited thereto. For example, the output device 6200 may be connected to various external devices such as a set-top box, a DVD player, a home theater system, a speaker system, a video player, a hard disc and a USB memory, and the first interface 6210 may include terminals with various standards such as "Composite", "Component, optical, RF, RS232", for connection with the external devices. In addition, the second interface 6220, the first display device 100_1 and the second display device 100_2 include terminals with various standards such as "Composite", "Component, optical, RF, RS232", such that the content output from the external devices is transmitted to the first display device 100_1 and the second display device 100_1 through the output device 6200.

In addition, the controller 6240 may convert an analog image signal received from an external device through a component into an HDMI format and transmit the converted image signal to the first display device 100_1 or the second display device 100_2, and the first display device 100_1 or the second display device 100_2 may reproduce the received content through the HDMI terminal.

FIG. 68 is a diagram illustrating a content output method when content is received in the form of a broadcast signal.

In FIG. 68, the output device 6200 may receive content in the form of a broadcast signal. For example, as shown in FIG. 68, the output device 6200 may receive a broadcast signal transmitted by an air channel broadcast station through an antenna. In addition, although not shown, the output device 6200 may receive a broadcast signal transmitted by a cable broadcast station through a dedicated cable.

In addition, the output device 6200 may transmit the received broadcast signal to the first display device 100_1 and the second display device 100_2.

This will be described in greater detail with reference to FIG. 69.

FIG. 69 is a block diagram illustrating the configuration of the output device 6200 according to another embodiment of the present invention.

In FIG. 69, the output device 6200 may further include a third interface 6250, a fourth interface 6260 and a second switching unit 6270, in addition to the first interface 6210, the second interface 6220, the switching unit 6230 and the controller 6240.

The third interface 6250 may receive an external broadcast signal. The third interface 6250 may include an antenna terminal for receiving a broadcast signal transmitted from the air channel broadcast station or a cable terminal for receiving a broadcast signal transmitted from the cable broadcast station.

The fourth interface 6260 may provide a connection path to the first display device and the second display device. Specifically, the controller 6240 may transmit the broadcast signal received from the third interface 6250 to the first display device and the second display device through the fourth interface 6260.

In this case, the first display device 100_1 may acquire and reproduce first content from the received broadcast signal. In addition, the second display device 100_2 may acquire and reproduce second content from the received broadcast signal. In this case, the first content and the second content may be equal or different.

Meanwhile, the controller 6240 may transmit the content and the broadcast signal from the external device to the first display device 100_1 and the second display device 100_2, respectively.

For example, the controller 6240 may control the first switching unit 6230 to transmit the content output from the first external device to the first display device 100_1 and control the second switching unit 6270 to transmit the broadcast signal to the second display device 100_2.

Meanwhile, the second switching unit 6270 may change the connection state of the third interface 6250 and the fourth interface 6260 to output the received signal to at least one of the first display device 100_1 and the second display device 100_2.

Specifically, the second switching unit 6270 may change the connection state of the third interface 6250 and the fourth interface 6240 to transmit the received broadcast signal to the first display device 100_1, under control of the controller 6240. In addition, the second switching unit 6270 may change the connection state of the third interface 6250 and the fourth interface 6260 to transmit the received broadcast to the second display device 100_2, under the control of the controller 6240. In addition, the second switching unit 6270 may change the connection state of the third interface 6250 and the fourth interface 6260 to transmit the received broadcast to the first display device 100_1 and the second display device 100_2, under the control of the controller 6240.

The switching unit 6270 may include one or more switches for changing the connection state of the first interface 6250 and the fourth interface 6260.

Meanwhile, although the second switching unit 6270 is included in the output device 6200 in the present embodiment, the present invention is not limited thereto. For example, in the present invention, the output device 6200 may not include the second switching unit 6270 and the broadcast signal received through the third interface 6250 may be transmitted to the first display device 100_1 and the second display device 100_2.

FIG. 70 is a diagram illustrating a process of transmitting content received in the form of a broadcast signal.

The controller 6240 may receive a broadcast signal through the third interface 6250. In addition, the controller 6240 may transmit the received broadcast signal to the first display device 100_1 and the second display device 100_2 through the fourth interface 6260. Specifically, the fourth interface 6260 may include a first terminal 6261 connected to the first display device 100_1 and a second terminal 6262 connected to the second display device 100_2, and the controller 6240 may transmit the broadcast signal to the first display device 100_1 through the first terminal 6261 and transmit the first content to the second display device 100_2 through the second terminal 6262.

The first display device 100_1 may receive the broadcast signal transmitted by the output device 6200 and acquire the first content through the tuner 131 provided in the first display device 100_1.

In addition, the second display device 100_2 may receive the broadcast signal transmitted by the output device 6200 and acquire second content through the tuner 131 provided in the second display device 100_2.

In this case, the first content and the second content may be the same broadcast program or different broadcast programs.

In addition, when the first content and the second content are the same broadcast program, that is, when the first display device 100_1 and the second display device 100_2 acquire the same content, the first display device 100_1 may display a first partial image of the same content on the screen thereof and the second display device 100_2 may display a second partial image excluding the first partial image of the same content on the screen thereof.

In addition, when the first content and the second content are different broadcast programs, that is, when the first display device 100_1 and the second display device 100_2 acquire different contents, the first display device, which has acquired the first content, may display the entire image of the first content 100_1 on the screen thereof and the second display device 100_2, which has acquired the second content, may display the entire image of the second content on the screen thereof.

In addition, at least one of the first display device 100_1 and the second display device 100_2, which have received the broadcast signal output by the output device 6200, may reproduce the content received through the output device 6200 from at least one of the plurality of external devices 6510, 6520 and 6530, without acquiring the content from the broadcast signal. For example, the first display device 100_1 may acquire and reproduce broadcast program content from the broadcast signal received through the output device 6200, and the second display device 100_2 may reproduce the content output from the first external device 6510 and transmitted from the output device 6200. In another example, the first display device 100_1 and the second display device 100_2 may reproduce the content output from the first external device 6510 and transmitted from the output device 6200, without acquiring the content from the broadcast signal.

Meanwhile, the output device 6200 may include a second switching unit 6270.

The second switching unit 6270 may include a plurality of switches for changing the connection state of the terminal 6251 included in the third interface 6250 and the plurality of terminals 6261 and 6262 included in the fourth interface 6260, and the controller 6240 may control the second switching unit 6270 to transmit the broadcast signal received through the third interface 6250 to at least one of the first display device 100_1 and the second display device 100_2.

The controller 6240 may control the first switching unit 6230 to receive first content from one of the plurality of external devices 6510, 6520 and 6530 and to transmit the first content to the first display device 100_1 and control the second switching unit 6270 to transmit the broadcast signal received through the third interface 6250 to the second display device 100_2.

In this case, the first display device 100_1 may reproduce the received first content. In addition, the second display device 100_2 may acquire second content through the tuner 131 provided in the second display device 100_2 from the received broadcast signal and then reproduce the acquired the second content.

Meanwhile, the terminals 6261 and 6262 included in the fourth interface 6260 may be an antenna terminal or a cable terminal for transmitting the broadcast signal.

Meanwhile, although transmission of the broadcast signal is described in the present embodiment, the present invention is not limited thereto. For example, the output device 6200 may include a fifth interface (not shown) for connection with a wired/wireless network including the Internet and receive content from a content provider or a network operator through a network connected through the fifth interface. In addition, the output device 6200 may transmit the content received through the wired/wireless network to at least one of the first display device 100_1 and the second display device 100_2 through a sixth interface (not shown).

Meanwhile, although the output device 6200 is separated from the first display device 100_1 and the second display device 100_2 in the present embodiment, the present invention is not limited thereto. For example, the output device 6200 may be mounted in the first display device 100_1 or the second display device 100_2.

Referring to FIG. 63 again, the content output method of the output device according to the embodiment of the present invention may include receiving a command for changing for an external device for transmitting content (S6450), receiving content from the changed external device (S6470) and transmitting the content received from the changed external device to the first display device and the second display device (S6490).

This will be described in detail with reference to FIGS. 71 to 72.

FIG. 71 is a block diagram illustrating an output device according to another embodiment of the present invention.

In FIG. 71, the output device according to another embodiment of the present invention may further include a communication unit 6280, in addition to the first interface 6210, the second interface 6220, the switching unit 6230 and the controller 6240.

The communication unit 6280 may communicate with at least one of the first display device 100_1 and the second display device 100_2. Specifically, the communication unit of the output device 6200 may communicate with at least one of the communication unit 195 of the first display device 100_1 and the communication unit 195 of the second display device 100_2.

The communication unit 6280 may receive a command for selecting an external device for outputting content from at least one of the first display device 100_1 and the second display device 100_2. For example, the communication unit 6280 may receive a command for outputting the content of the first external device to the first display device 100_1 and the second display device 100_2. In another example, the communication unit 6280 may receive a command for outputting the content of the first external device to the first display device 100_1 and outputting the content of the second external device to the second display device 100_1.

This will be described in detail with reference to FIG. 72.

FIG. 72 is a diagram illustrating an output device for receiving user input from a display device.

In the present embodiment, assume that the communication unit 6280 communicates with the communication unit 195 of the first display device 100_1.

A user may input a user command for selecting an external device for outputting content using a remote control device 200 and a display device for displaying content. For example, the user may input a user command for displaying the content of the first external device 6510 on the first display device 100_1 and the second display device 100_2. In another example, the user may input a user command for displaying the content of the first external device 6510 on the first display device 100_1 and displaying the content of the second external device 6520 on the second display device 100_2.

In this case, the user input interface 150 of the first display device 100_1 may receive a signal input by the user using the remote control device 150 and deliver the signal to the controller 170, and the controller 170 of the first display device 100_1 may transmit a user command for selecting an external device for outputting content and a display device for displaying content to the output device 6200 through the communication unit 195 of the first display device 100_1.

The output device 6200 may receive a user command through the communication unit 6280 of the output device 6200 and output the content of an external device selected by the user to a display device selected by the user.

For example, when a user command for outputting the content of the first external device 6510 to the first display device 100_1 and the second display device 100_2 is received, the controller 6240 may control the switching unit 6230 to receive the content of the first external device 6510 and to transmit the received content to the first display device 100_1 and the second display device 100_2.

In another example, when a user command for outputting the content of the first external device 6510 to the first display device 100_1 and outputting the content of the second external device 6520 to the second display device 100_2 is received, the controller 6240 may control the switching unit 6230 to receive and transmit the content of the first external device 6510 to the first display device 100_1 and to receive and transmit the content of the second external device 6520 to the second display device 100_2.

In addition, when a command for selecting a second external device is received through the communication unit 6280 while the first content received from the first external device 6510 is transmitted to the first display device 100_1 and the second display device 100_2, the controller 6240 may control the switching unit 6230 to receive second content from the second external device 6520 and to transmit the received second content to the first display device 100_1 and the second display device 100_2.

In another example, when user input for displaying the content of the first external device on the first display device 100_1 and displaying the content of the second external device on the second display device 100_2 is received while the first content received from the first external device 6510 is transmitted to the first display device 100_1 and the second display device 100_2, the controller 6240 may control the switching unit 6230 to receive and transmit the content of the first external device to the first display device 100_1 and to receive and transmit the content of the second external device to the second display device 100_1.

FIG. 73 is a block diagram illustrating an output device 7300 according to another embodiment of the present invention.

The output device 7300 described in the present invention may perform all functions excluding a function performed by the display unit 180 and the audio output unit 185 among the functions of the first display device 100_1 and the second display device 100_2 described with respect to FIGS. 1 to 61.

Accordingly, the elements included in the output device 7300 may correspond to the elements of the display device 100 described with reference to FIG. 1 and the elements included in the output device 7300 may perform the same functions as the elements of the display device 100 corresponding thereto.

That is, the output device 7300 of the present invention may generate and output video or audio using the method described with reference to FIGS. 1 to 61 to at least one of the first display device 100_1 and the second display device 100_2. To this end, the external device interface 7335 of the output device 7300 may be connected to the first display device 100_1 and the second display device 100_2.

The first display device 100_1 and the second display device 100_2 may display video received from the output device 7300 and output audio received from the output device 7300.

Hereinafter, a difference between the present invention implemented in the output device 7300 and the present invention implemented in the display device 100 will be focused upon.

A video signal processed by the controller 7370 of the output device 7300 is output to at least one of the first display unit 100_1 and the second display unit 100_2 to display video corresponding to the video signal on at least one of the first display unit 100_1 and the second display unit 100_2.

An audio signal processed by the controller 170 of the output device 7300 may be output to at least one of the first display unit 100_1 and the second display unit 100_2 to output audio through at least one of the first display unit 100_1 and the second display unit 100_2.

In addition, although one of the first display device 100_1 and the second display device 100_2 operates as a master device and the other device operates as a slave device and the master device controls operation of the slave device in FIG. 5, if the present invention is implemented in the output device 7300, the output device 7300 may control operation of the first display device 100_1 and the second display device 100_2.

In addition, although the controller 170 of the first display device 100_1 acquires and reproduces first content and the controller 170 of the second display device 100_2 acquires and reproduces second content in FIG. 6, the controller 7370 of the output device 7300 may acquire the first content and the second content and output the acquired first content to the first display device 100_1 and output the second content to the second display device 100_2.

For example, if the first content and the second content are broadcast programs, the first content may be received through the first tuner 7331_1 provided in the output device 7300 and the second content may be received through the second tuner 7331_2 provided in the output device 7300. In this case, the controller 7370 of the output device 7300 may output the first content to first display device 100_1 and output the second content to the second display device 100_2. Meanwhile, if the first content and the second content are broadcast programs, the first content and the second content may be the same broadcast program or different broadcast programs.

In another example, if the first content is output from a first external device and the second content is output from a second external device, the output device 7300 may output the acquired first content to the first display device 100_1 and output the acquired second content through the second display device 100_2. In addition, the controller 7340 of the output device 7300 may output one content output from one external device to the first display device 100_1 and the second display device 100_2.

In another example, the controller 7370 of the output device 7300 may output the first content received through the first tuner 7331_1 to the first display device 100_1 and output the second content received from a content provider server to the second display device 100_2.

In another embodiment, if the first content and the second content are equal, the output device 7300 may output the content to the first display device 100_1 and the second display device 100_2 through a distributor 7371.

Meanwhile, the controller 7370 of the output device 7300 may output a partial image of the entire image of specific content to the first display device 100_1 and the remaining image of the entire image of the specific content to the second display device 100_2.

In addition, the controller 7370 of the output device 7300 may output first content to the first display device 100_1 and output second content to the second display device 100_2. This will be described with reference to FIG. 74.

FIG. 74 is a diagram illustrating a method of outputting content to the first display device 100_1 and the second display device 100_2 at the output device 7300.

FIG. 74a is a diagram illustrating a method of outputting the same content to the first display device 100_1 and the second display device 100_2 at the output device 7300.

In FIG. 74a, the controller 7370 of the output device 7300 may output a partial image 7511 of the entire image 7510 of specific content to the first display device 100_1 and output the remaining image 7512 of the entire image 7510 of the specific content to the second display device 100_2. Here, the content output from the output device 7300 may be at least one of content acquired from the broadcast signal, content received from a server through a wired/wireless network and content acquired from an external device.

The controller 7370 of the output device 7300 may divide the entire image 7510 of the content into a plurality frames as described with reference to FIG. 16. In addition, the controller 7370 of the output device 7300 may cut the plurality of frames in order to output a partial image 7511 of the entire image 7510 of the specific content to the first display device 100_1 and to output the remaining image 7512 of the entire image 7510 of the specific content to the second display device 100_2.

In addition, the controller 7370 may scale the cut frames according to resolution of the first display device 100_1 and the second display device 100_2. Specifically, the controller 7370 may scale the partial image 7511 of the entire image 7510 of the specific content according to resolution of the first display device 100_1 and scale the remaining image 7512 of the entire image 7510 of the specific content according to resolution of the second display device 100_2.

Thereafter, the controller 7370 may output the partial image 7511 of the entire image 7500 of the specific content to the first display device 100_1 and output the remaining image 7512 of the entire image 7510 of the specific content to the second display device 100_2.

The first display device 100_1 may display the received partial image 7511 of the entire image 7500 of the specific content. In addition, the second display device 100_2 may display the received remaining image 7512 of the entire image 7510 of the specific content.

Meanwhile, although the partial image 7511 of the entire image 7500 of the specific content is output to the first display device 100_1 and the received remaining image 7512 of the entire image 7510 of the specific content is output to the second display device 100_2 in the present embodiment, the present invention is not limited thereto. For example, the controller 7370 may output the entire image 7510 of the specific content to the first display device 100_1 and the second display device 100_2, and the first display device 100_1 and the second display device 100_2 may display the entire image 7510 of the specific content.

FIG. 74b is a diagram illustrating a method of outputting different contents to the first display device 100_1 and the second display device 100_2 at the output device 7300.

In FIG. 74b, the controller 7370 of the output device 7300 may output the entire image 7510 of the first content to the first display device 100_1 and output the entire image 7530 of the second content to the second display device 100_2. Here, the first content and the second content output from the output device 7300 may be at least one of content acquired from a broadcast signal, content received from a server through a wired/wireless network and content acquired from an external device. In addition, methods of receiving the first content and the second content may be different from each other. For example, the first content may be acquired from a broadcast signal and the second content may be received from the server through the wired/wireless network.

The controller 7370 may scale the image 7520 of the first content according to resolution of the first display device 100_1 and scale the image 7530 of the second content according to resolution of the second display device 100_2.

Thereafter, the controller 7370 may output the image 7520 of first content to the first display device 100_1 and output the image 7530 of second content to the second display device 100_2.

The first display device 100_1 may display the received image 7520 of the first content. In addition, the second display device 100_2 may display the received image 7530 of the second content.

Meanwhile, the output device 7300 may receive user input through the user input interface 7350. In addition, as described with reference to FIG. 75a, while the partial image 7511 of the entire image 7510 of the first content is output to the first display device 100_1 and the remaining image 7512 of the entire image 7510 of the first content is output to the second display device 100_2, when the second display device 100_2 receives user input for displaying the second content through the user input interface 7350, the controller 7370 may output the entire image of the first content to the first display device 100_1 and output the entire image of the second content to the second display device 100_2.

Meanwhile, although the output device 7300 transmits the entire image of the first content to the first display device 100_1 and transmits the entire image of the second content to the second display device 100_2 in the present embodiment, the present invention is not limited thereto. For example, the output device 7300 may output a partial image of the entire image of the first content to the first display device 100_1 and output the remaining image of the entire image of the first content and the entire image of the second content to the second display device 100_2.

Accordingly, the output device 7300 may display the entire image of the first content on a merged screen obtained by merging the first screen of the first display device 100_1 and the second screen of the second display device 100_2 and may display the entire image of the second content on the second screen of the merged screen.

According to one embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, optical data storage, and a carrier wave (e.g., data transmission over the Internet).

The display device according to the present invention should not be limited to configurations and methods of the above-described embodiments, and all or some of the embodiments may be selectively combined with one another to achieve various alterations.

What is claimed is:

1. A method of operating a display device, the method comprising:
    displaying a first content on a first screen of the display device;
    receiving, from a remote controller, a screen link request for linking the first screen of the display device to a second screen of a second display device;
    determining a location of a pointer controlled by the remote controller by:
        obtaining coordinate values of a real region corresponding to the first screen and a virtual region obtained based on a size information of the second screen, wherein the coordinate values includes at least a maximum X coordinate value of the real region,
        determining that the pointer is located outside the real region,
        determining a movement distance of the remote controller,
        obtaining a virtual coordinate value of the pointer using a coordinate value corresponding to the movement distance of the remote controller, and
        obtaining a final coordinate value by subtracting the maximum X coordinate value from the obtained virtual coordinate value, wherein the location of the pointer is determined based on the obtained final coordinate value; and
    transmitting, to the second display device, a content switching request when the pointer is located on the first screen, wherein the content switching request is for switching second content displayed on the second display device to a remaining image of the first content according to the received screen link request.

2. The method according to claim 1, wherein a partial image of the first content is displayed on the first screen.

3. The method according to claim 1, further comprising:
    transmitting device information of the display device to second display device and receiving device information of the second display device from the second display device based on the display device being connected to the second display device,
    wherein the device information includes at least one of identification of each display device, specification of each display device, or channel information.

4. The method according to claim 3, wherein the device information includes resolution information of each display device, and
    the first content is output in a resolution matching a lower resolution of the display device or the second display device.

5. The method according to claim 3, wherein the device information includes size information of each display device, and the first content is output in a size matching a smaller size of the display device or the second display device.

6. A display device comprising:
a display unit configured to display a first content on a first screen of the display device; and
a controller configured to:
receive, from a remote controller, a screen link request for linking the first screen of the display unit to a second screen of a second display unit provided in a second display device;
determine a location of a pointer controlled by the remote controller by:
obtaining coordinate values of a real region corresponding to the first screen and a virtual region obtained based on a size information of the second screen, wherein the coordinate values includes at least a maximum X coordinate value of the real region,
determining that the pointer is located outside the real region,
determining a movement distance of the remote controller,
obtaining a virtual coordinate value of the pointer using a coordinate value corresponding to the movement distance of the remote controller, and
obtaining a final coordinate value by subtracting the maximum X coordinate value from the obtained virtual coordinate value, wherein the location of the pointer is determined based on the obtained final coordinate value; and
transmit, to the second display device, a content switching request when the pointer is located on the first screen, wherein the content switching request is for switching second content displayed on the second display device to a remaining image of the first content according to the received screen link request.

7. The display device according to claim 6, wherein a partial image of the first content is displayed on the first screen.

8. The display device according to claim 6, wherein the controller is further configured to transmit device information of the display device to the second display device and receive device information of the second display device from the second display device based on the display device being connected to the second display device,
wherein the device information includes at least one of identification of each display device, specification of each display device, or channel information.

9. The display device according to claim 8, wherein the device information includes resolution information of each display device, and
the first content is output in a resolution matching a lower resolution of the display device or the second display device.

10. The display device according to claim 8, wherein the device information includes size information of each display device, and
the first content is output in a size matching a lower size of the display device or the second display device.

11. A display system comprising:
a first display device configured to display a first content on a first screen of a display device; and
a second display device connected to the first display device and configured to display a second content on a second screen of a second display device,
a controller included in the first display device is configured to:
receive, from a remote controller, a screen link request for linking the first screen of the display device to a second screen of the second display device,
determine a location of a pointer controlled by the remote controller by:
obtaining coordinate values of a real region corresponding to the first screen and a virtual region obtained based on a size information of the second screen, wherein the coordinate values includes at least a maximum X coordinate value of the real region,
determining that the pointer is located outside the real region,
determining a movement distance of the remote controller,
obtaining a virtual coordinate value of the pointer using a coordinate value corresponding to the movement distance of the remote controller, and
obtaining a final coordinate value by subtracting the maximum X coordinate value from the obtained virtual coordinate value, wherein the location of the pointer is determined based on the obtained final coordinate value, and
transmit, to the second display device, a content switching request when the pointer is located on the first screen, wherein the content switching request is for switching second content displayed on the second display device to a remaining image of the first content according to the received screen link request.

12. The display system according to claim 11, wherein each of the first display device and the second display device acquires a same content through a radio frequency (RF) distributor for receiving an RF signal or a high definition interface (HDMI) distributor.

13. The display system according to claim 11, wherein the first display device receives the first content from a content provider server and transmits the first content to the first display device and the second display device in a multicast manner.

14. The display system according to claim 11,
wherein the first display device and the second display device share resolution information thereof with each other, and
wherein, when resolution of the first display device is different from that of the second display device, the first content is output in a resolution matching a resolution of the display having lower resolution.

15. The display system according to claim 14,
wherein the first display device and the second display device share size information thereof with each other, and
wherein, when a size of the first display device is different from that of the second display device, the first content is output in a size matching a resolution of the display having a smaller size.

* * * * *